United States Patent
Goldman et al.

(10) Patent No.: US 9,243,918 B2
(45) Date of Patent: Jan. 26, 2016

(54) SYSTEMS, METHODS, AND APPARATUS FOR PROVIDING INDOOR NAVIGATION USING MAGNETIC SENSORS

(71) Applicants: David Allan Goldman, Bedford, MA (US); Nirav Balkrishna Patel, Waltham, MA (US)

(72) Inventors: David Allan Goldman, Bedford, MA (US); Nirav Balkrishna Patel, Waltham, MA (US)

(73) Assignee: AppLabz, LLC, Bedford, MA (US)

( * ) Notice: Subject to any disclaimer, the term of this patent is extended or adjusted under 35 U.S.C. 154(b) by 0 days.

(21) Appl. No.: 13/839,512

(22) Filed: Mar. 15, 2013

(65) Prior Publication Data

US 2013/0261964 A1 Oct. 3, 2013

Related U.S. Application Data

(63) Continuation-in-part of application No. 13/335,124, filed on Dec. 22, 2011.

(51) Int. Cl.
| | |
|---|---|
| *G01C 21/16* | (2006.01) |
| *G01C 21/20* | (2006.01) |
| *G05D 1/02* | (2006.01) |
| *G01D 5/12* | (2006.01) |
| *G01C 21/26* | (2006.01) |
| *G01C 21/12* | (2006.01) |
| *G01C 21/00* | (2006.01) |

(52) U.S. Cl.
CPC ............. *G01C 21/206* (2013.01); *G01C 21/12* (2013.01); *G01C 21/165* (2013.01); *G01C 21/265* (2013.01); *G05D 1/0259* (2013.01); *G05D 1/0272* (2013.01); *G05D 1/0276* (2013.01); *G01C 21/005* (2013.01); *G05D 1/0268* (2013.01); *G05D 2201/0211* (2013.01); *G05D 2201/0216* (2013.01)

(58) Field of Classification Search
None
See application file for complete search history.

(56) References Cited

U.S. PATENT DOCUMENTS

| | | | |
|---|---|---|---|
| 4,855,915 A | 8/1989 | Dallaire | |
| 4,952,080 A * | 8/1990 | Boiucaner et al. | 388/811 |
| 5,287,266 A * | 2/1994 | Malec et al. | 705/323 |

(Continued)

FOREIGN PATENT DOCUMENTS

WO  WO 2008132267 A1 * 11/2008 .............. G01S 5/14

OTHER PUBLICATIONS

Machine Translation of KR 10-2006-123799; Title: Advertisement, POS, and Navigation Integrated Cart; Inventor: Gyeong-Hwan Cha; Publication Date: May 12, 2006.*

(Continued)

*Primary Examiner* — Fadey Jabr
*Assistant Examiner* — Kevin P Mahne
(74) *Attorney, Agent, or Firm* — K&L Gates LLP

(57) ABSTRACT

An indoor navigational system determines a location of a moveable object in an indoor area and displays this location to a user. The system includes an absolute position sensor coupled to a case attached to a moveable object including a motion sensor coupled to a case including a first magnetic field sensor configured to detect a polarity of a magnet as the magnet passes in proximity to the first magnetic field sensor, a code wheel having two or more magnets alternately oriented with north and south polarities facing toward the first magnetic sensor, the code wheel positioned to rotate in unison with a wheel of the moveable object, and encoder circuitry configured to determine an amount of rotation of the wheel of the moveable object based on an output of the first magnetic field sensor.

23 Claims, 39 Drawing Sheets

(56) References Cited

U.S. PATENT DOCUMENTS

| | | | |
|---|---|---|---|
| 5,423,740 A * | 6/1995 | Sullivan et al. | 604/22 |
| 6,323,807 B1 | 11/2001 | Golding et al. | |
| 6,510,396 B1 * | 1/2003 | Colosky | 702/85 |
| 6,850,844 B1 | 2/2005 | Walters et al. | |
| 7,183,910 B2 * | 2/2007 | Alvarez et al. | 340/539.13 |
| 7,250,881 B2 * | 7/2007 | Kiriyama et al. | 341/115 |
| 7,337,961 B2 * | 3/2008 | Cato | 235/383 |
| 7,706,917 B1 * | 4/2010 | Chiappetta et al. | 700/245 |
| 7,739,157 B2 | 6/2010 | Bonner et al. | |
| 7,782,194 B2 * | 8/2010 | Stawar et al. | 340/539.13 |
| 7,876,266 B2 | 1/2011 | Rhoads | |
| 7,890,262 B2 | 2/2011 | Judd et al. | |
| 8,269,624 B2 | 9/2012 | Chen et al. | |
| 8,606,501 B2 * | 12/2013 | Hannah et al. | 701/408 |
| 2003/0028323 A1 | 2/2003 | Zeitler et al. | |
| 2003/0216143 A1 | 11/2003 | Roese et al. | |
| 2004/0093274 A1 | 5/2004 | Vanska et al. | |
| 2004/0193339 A1 * | 9/2004 | Hulden | 701/23 |
| 2005/0177446 A1 | 8/2005 | Hoblit | |
| 2006/0038843 A1 * | 2/2006 | Chen | 347/14 |
| 2006/0059049 A1 | 3/2006 | Morris et al. | |
| 2006/0247847 A1 | 11/2006 | Carter et al. | |
| 2006/0289637 A1 | 12/2006 | Brice et al. | |
| 2007/0001904 A1 | 1/2007 | Mendelson | |
| 2007/0056339 A1 * | 3/2007 | Irgens et al. | 70/312 |
| 2007/0069923 A1 | 3/2007 | Mendelson | |
| 2007/0282565 A1 | 12/2007 | Bye et al. | |
| 2008/0004796 A1 | 1/2008 | Schott et al. | |
| 2008/0009965 A1 | 1/2008 | Bruemmer et al. | |
| 2008/0049217 A1 | 2/2008 | Cappelletti | |
| 2008/0077326 A1 | 3/2008 | Funk et al. | |
| 2008/0243626 A1 | 10/2008 | Stawar et al. | |
| 2008/0252527 A1 | 10/2008 | Garcia | |
| 2008/0303717 A1 | 12/2008 | Durban et al. | |
| 2008/0315540 A1 | 12/2008 | Hannah et al. | |
| 2009/0034641 A1 * | 2/2009 | Jansson | 375/261 |
| 2009/0179753 A1 * | 7/2009 | Bonner et al. | 340/539.32 |
| 2009/0213828 A1 | 8/2009 | Brundage et al. | |
| 2009/0313370 A1 | 12/2009 | Rhoads | |
| 2010/0057344 A1 | 3/2010 | Nezu et al. | |
| 2010/0106602 A1 | 4/2010 | Fuzell-Casey et al. | |
| 2010/0121567 A1 | 5/2010 | Mendelson | |
| 2010/0131162 A1 * | 5/2010 | Ding et al. | 701/58 |
| 2010/0202300 A1 | 8/2010 | Rhoads et al. | |
| 2010/0286905 A1 | 11/2010 | Goncalves et al. | |
| 2011/0029241 A1 | 2/2011 | Miller et al. | |
| 2011/0106624 A1 | 5/2011 | Bonner et al. | |
| 2011/0108713 A1 * | 5/2011 | Momtahan et al. | 250/216 |
| 2011/0121068 A1 | 5/2011 | Emanuel et al. | |
| 2011/0128384 A1 | 6/2011 | Tiscareno et al. | |
| 2011/0187355 A1 * | 8/2011 | Dixon et al. | 324/207.25 |
| 2012/0035823 A1 * | 2/2012 | Carter et al. | 701/70 |
| 2012/0108272 A1 * | 5/2012 | Miyamoto et al. | 455/456.6 |
| 2012/0121161 A1 | 5/2012 | Eade et al. | |
| 2012/0130762 A1 | 5/2012 | Gale et al. | |
| 2013/0006420 A1 | 1/2013 | Karlsson et al. | |
| 2013/0030700 A1 | 1/2013 | Miller et al. | |
| 2013/0076523 A1 * | 3/2013 | Kwan et al. | 340/686.6 |

OTHER PUBLICATIONS

J. Borenstein et al; Mobile Robot Positioning-Sensors and Techniques; 1997; Journal of Robotic Systems, Special Issue on Mobile Robots; vol. 14, No. 4, pp. 231-244.*

Nguyen, "Nokia Indoor Navigation: Next Level of Location-Based Apps", published Apr. 20, 2011 (2 pages).

Fischer et al., "Ultrasound-aided pedestrian dead reckoning for indoor navigation", Proc. of the first ACM International workshop on Mobile entity localization and tracking in GPS-less environments, published in 2008 (1 page).

"Locate and Engage the In-Store Shopper", pages from www.zulutimecorp.com (1 page)—accessed from the Internet on Dec. 29, 2011, available before Dec. 22, 2011.

Empson, "Zulu Time Issued Patent for Location Aware Wireless Networks", published Apr. 11, 2011 (4 pages).

"Zulu-Time LiveFind is a software solution leveraging in-store Wi-Fi for smartphone geolocation", pages from www.zulutimecorp.com/livefind (2 pages)—accessed from the Internet on Dec. 29, 2011, available before Dec. 22, 2011.

"News" from www.polestar.eu/en (1 page)—accessed from the Internet on Dec. 29, 2011, available before Dec. 22, 2011.

Sayerse et al., "NAO Campus on ANDROID: The First Indoor Location Solution that the Market Expected", published Jul. 29, 2010 (2 pages).

"Shop, Scan, Save, Share, Splurge. Pay", pages from www.modivmedia.com/index.html (2 pages)—accessed from the Internet on Dec. 29, 2011, available before Dec. 22, 2011.

"Introducing . . . Scan It Mobile", pages from www.stopandshop.com/our_stores/tools/scan_it_mobile.htm (1 page)—accessed from the Internet on Dec. 29, 2011, available before Dec. 22, 2011.

International Search Report and Written Opinion issued Feb. 20, 2013 for related International Appln. No. PCT/US2012/070148.

Office Action issued May 13, 2013 for related U.S. Appl. No. 13/335,124.

International Preliminary Report on Patentability issued Dec. 12, 2013 for Intl. Appln. PCT/US12/70148.

* cited by examiner

SYSTEMS, METHODS, AND APPARATUS FOR PROVIDING INDOOR NAVIGATION USING MAGNETIC SENSORS

PRIORITY CLAIM

The present application is a continuation-in-part of, claims priority to and the benefit of U.S. patent application Ser. No. 13/335,124, filed on Dec. 22, 2011, the entirety of which is incorporated herein by reference.

BACKGROUND

Various known navigation and positioning systems enable people in cars, boats, aircraft, and other moveable objects to efficiently travel between given locations. Knowing a precise current geographic location or starting location and a desired destination or ending location enables navigation systems to provide customized directions that indicate which direction that moveable object should travel to reach the destination or ending location. Various known navigation systems use path-planning algorithms that combine knowledge of conduits (such as streets, bridges, or traffic rules), obstacles (such as freeway congestion), and current real-time positioning information to determine and output detailed directions.

Various known navigation systems are enhanced through graphical user interfaces that visually depict the surroundings of a current position, identify points of interest, and provide a highlight of a path of travel to reach a destination. In one known example, vehicular navigation systems use the Global Positioning System (widely known as GPS). GPS is a space-based global navigation satellite system (GNSS) that provides reliable location and time information to anyone on or near the Earth.

One known limitation of existing navigation systems that employ GPS is that they typically need an unobstructed line of sight to multiple (such as four or more) GPS satellites to receive and calculate a geographic position of an object. For this reason, GPS typically does not effectively operate in indoor areas or spaces such as in buildings or other covered structures. Thus, while GPS has become a valued system for outdoor navigation, GPS is generally unsuited for indoor navigation.

Various existing indoor navigation systems use radio or sound waves to determine a current position of a moveable object in an indoor area. One known indoor navigation system determines a location using Received Signal Strength Indicator ("RSSI") values of multiple Wi-Fi beacons (i.e., IEEE 802.11 access points or radios). This system is configured to use location fingerprinting, which stores samples of RSSI values of received Wi-Fi signals transmitted by a number of locations in a mapped area. In this location fingerprinting system, a processor computes a current location of a moveable object by sampling the RSSI values and performing a look-up within a database.

Another known indoor navigation system determines a location of a moveable object using triangulation of RSSI values of multiple Wi-Fi beacons. This system uses triangulation to compute expected signal strengths at a given location using signal propagation equations that estimate effects of known obstructions and multipath errors.

One known problem of using location fingerprinting or triangulation in indoor areas is that both of these methods are limited in accuracy to within a few meters, and tend to worsen with dynamic changes in signal obstructions resulting from human movement or physical obstructions including, for example, walls, shelves, signs, etc. Similar methods using Bluetooth or Near Field Communication ("NFC") signals also experience the same challenges in indoor areas.

Since all of these indoor navigation systems have various known issues or problems, the overall need for indoor navigation systems remains an issue largely unaddressed by currently known commercially available navigation systems. Accordingly, a need exists for better indoor navigation systems.

SUMMARY

Various embodiments of the present disclosure solve the above problems by providing a precise and accurate indoor navigation system that combines dead-reckoning with absolute position detection. The navigation system simultaneously or sequentially uses a combination of dead-reckoning signals and absolute positioning signals to determine a specific location, orientation, and movement of a moveable object within an indoor area or space. Generally, the indoor navigation system includes one or more processors that are configured to receive communications from, communicate with, or are communicatively coupled to: (a) one or more dead-reckoning sensors, and (b) one or more absolute positioning systems. The absolute positioning system includes components attached to or in proximity to a moveable object. The processors are also configured to communicate with a user device (including in various embodiments a display device and an input device) which are part of or function in conjunction with the indoor navigation system. The display device displays a location of a moveable object in relation to an indoor area and the input device enables a user to interact with the displayed location.

More specifically, the indoor navigation system of the present disclosure uses an absolute position system to determine a reference location (such as a starting point) of a moveable object in an indoor area. In certain embodiments, the absolute position system includes proximity sensors positioned within the indoor area that detect the moveable object when the movable object is relatively nearby those sensors. After detecting a presence of the moveable object in the indoor area, the proximity sensors transmit an absolute positioning signal to the processor(s) of the indoor navigation system. The processor(s) uses this information to determine at a point in time a fixed location of the moveable object in the indoor area based on which proximity sensors transmitted the signal at that point in time.

The indoor navigation system of the present disclosure further uses dead-reckoning sensors to detect movement of the moveable object in the indoor area when the object moves between sensors of the absolute position system. The dead-reckoning sensors are generally located on or attached to the moveable object to detect movement and orientation of the moveable object. The processor(s) of the indoor navigation system receive this movement information from the dead-reckoning sensors and based on this information determine how much and in which direction the moveable object has moved at a point in time from a previously detected reference location. The indoor navigation continues to use dead-reckoning movement information until the moveable object moves into a detection range of one or more other proximity sensors of the absolute position system. In this manner, the indoor navigation system oscillates between the use of absolute positioning signals and dead-reckoning signals such that the dead-reckoning signals are used to determine a location of the moveable object when absolute positioning signals are unavailable.

In various embodiments, the dead-reckoning signals are generated by one or more magnetic rotary encoder(s) attached to wheel(s) of the moveable object. Each rotary encoder detects direction and magnitude of a rotation of the wheel to which an encoder is attached by sensing polarity changes between adjacent magnets. In certain embodiments, the indoor navigation system uses dead-reckoning signals generated by two rotary encoders on the moveable object to determine orientation of the object based on differences in rotations between the wheels. In various other embodiments, the dead-reckoning signals are generated by other sensors such as, but not limited to, inertial sensors, accelerometers, and magnetometers.

The present disclosure provides various different embodiments of absolute position systems. These different absolute position systems may each be used alone or in various combinations with each other. It should be appreciated that the indoor navigation system described herein can also or alternatively use additional types of absolute position systems.

Additionally, the present disclosure primarily describes the indoor navigation system in conjunction with a single moveable object. It should be appreciated that the indoor navigation system can be, and will likely be configured to be used to determine locations of multiple moveable objects in the indoor area (such as multiple grocery carts in a grocery store).

In one of these embodiments, the absolute position system includes Radio Frequency Identifier ("RFID") detector(s) located on the moveable object and RFID tags embedded throughout the indoor area. The RFID detectors sense when the moveable object passes in proximity to one or more of the RFID tags. Each RFID tag is assigned a unique identifier, which is read by the RFID detector on the moveable object. In this embodiment, the RFID detector transmits the unique identifier of the RFID tag to a processor as an absolute positioning signal. The processor determines a location on a map corresponding to the identifier to identify a current location of the moveable object at a point in time.

In another of these embodiments, the absolute position system includes an RFID detector attached to the moveable object and RFID transmitters located throughout the indoor area. The RFID detector detects RFID beacons emitted from the RFID transmitters. In this embodiment, each RFID transmitter transmits an identifier though a unique RFID beacon. The RFID detector on the moveable object receives the RFID beacons, determines corresponding identifiers, and transmits the identifiers to a processor as an absolute positioning signal. In some examples, the RFID detector may also determine signal strength for each RFID beacon. The processor uses the identifiers and corresponding signal strength in triangulation calculations to determine a current location of the moveable object at a point in time.

In another of these embodiments, the absolute position system includes a light sensor attached to the moveable object and laser light emitting diodes ("LEDs") positioned throughout the indoor area. The light sensor detects timed light pulses from the LEDs when the moveable object travels in proximity to the LEDs. In this embodiment, each LED transmits an identifier by pulsing light at different time intervals. The light sensor on the moveable object transmits the detected identifier to the processor of the indoor navigation system as an absolute position signal.

In another of these embodiments, the absolute position system includes an LED or other light source attached to the moveable object and cameras positioned within the indoor area. The light source on the moveable object pulses a uniquely timed pattern of light corresponding to an identifier. In this embodiment, the cameras detect the emitted light and send video images to a processor. The processor processes a sequence of the video images to determine a position of the light within each received video image and an identifier associated with the pulsed pattern. The processor uses this information as an absolute positioning signal to then determine a current location of the moveable object at a point in time.

The indoor navigation system of the present disclosure can be employed in multiple different manners and for multiple different purposes. In one embodiment, the indoor navigation system uses location information of a moveable object to provide displayable directions to products or items of interest in an indoor area. In another embodiment, the indoor navigation system uses a location of a moveable object to provide displayable information regarding products or items of interest in proximity to the moveable object. In another embodiment, the indoor navigation system uses a location of a moveable object to enable a user to search for a location of a product or item of interest in an indoor area. It should thus be appreciated from the above and the following that the indoor navigation system can use location information of a moveable object in these and various other applications.

In an example implementation of the indoor navigation system disclosed herein, a grocery cart in a grocery store is the moveable object with dead-reckoning rotary encoders attached to rear wheels. The rotary encoders are included within a position sensing apparatus that also includes a light sensor. The light sensor is part of an absolute position system, which also includes infrared laser LEDs positioned adjacent to or near floor level throughout the grocery store. A user device including a display device and a touchscreen input device are attached to or used in conjunction with the grocery cart. The navigation system causes the display device to display a pictorial or graphical map of the indoor area which in this example is a grocery store. In this example, one, multiple, or all of the grocery carts in the grocery store may be so equipped.

When a consumer selects the grocery cart in the grocery store or a designated area in the grocery store, the indoor navigation system is alerted to the movement of the cart via the rotary encoders. Upon the grocery cart passing in proximity to an LED, the light sensor on the cart detects the light and an identifier coded within the light. The identifier corresponds to the particular LED transmitting the light. The light sensor transmits an absolute positioning signal including the identifier to a processor, which then determines which location is associated with the detected identifier. The processor transmits a message indicative of this reference location to the user device to display to a user where the grocery cart is located within the grocery store.

After the user moves the grocery cart from the detected reference location, the rotary encoders send dead-reckoning signals to the processor indicating a change in one or both of distance and direction. The processor applies the detected travel to the reference location to determine how far and in which direction the cart has traveled. The processor then sends one or more messages indicative of this new location to the user device and thus the display device, which then displays the new location of the grocery cart in relation to a map of the store. In this manner, the indoor navigation system accurately displays to a user the current location of the grocery cart in the grocery store.

The user may use the input device of the user device for different navigation applications. For example, the user may enter a grocery list. The processor receives the grocery list, determines locations of the groceries in the store, and calculates a desired route through the store to each of the groceries.

In one embodiment, the desired route may be a shortest route to each of the groceries. In another embodiment, the desired route may be specified by an operator of the indoor area or a manufacturer of certain products such that the route causes the user to pass in proximity to the products. For example, a food producer may specify that the route is to pass in proximity to a new beverage. In another embodiment, the desired route may include special sale items specified by the operator of the indoor area or a product manufacturer. While the user is moving through the store, the processor uses the current location of the cart to cause the user device to display advertisements or coupons that are in proximity to the user. The processor may also show product packaging of a nearby product to help the user locate the product on the grocery shelves.

While the following detailed disclosure uses a grocery store as an example embodiment, it should be appreciated that the grocery store is just an example environment and that other objects, features and advantages of the present invention will be apparent, taken in conjunction with the accompanying sheets of drawings, wherein like reference numerals refer to like parts.

DETAILED DESCRIPTION

The present disclosure relates to indoor navigation systems, method, and apparatus which employ absolute position systems and dead-reckoning sensors to provide navigation for moveable objects in indoor areas.

Indoor Navigation System

Figure 1:
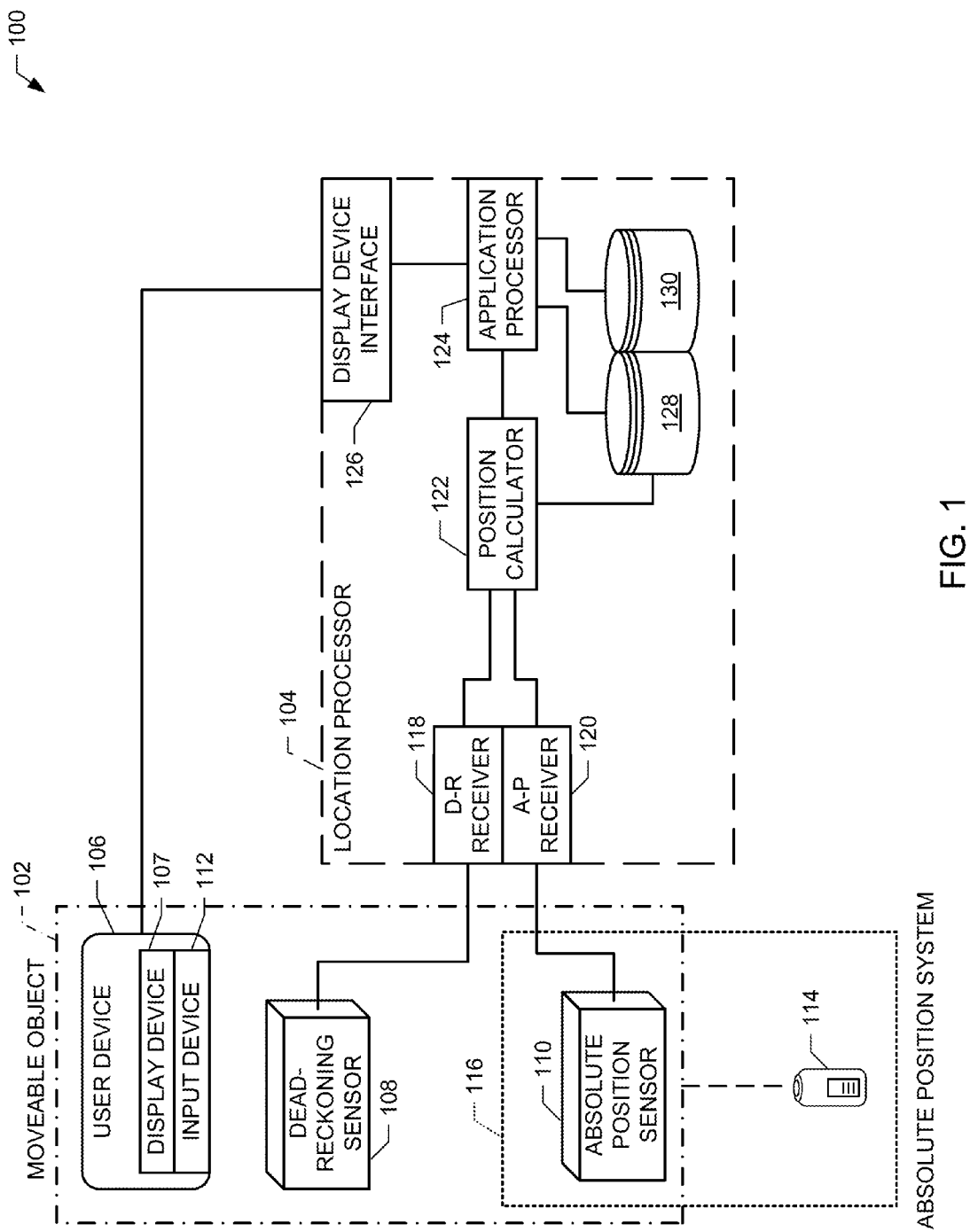
FIG. 1 is a functional schematic diagram of an indoor navigation system of one example embodiment of the present disclosure.

Turning now to the drawing, FIG. 1 shows a functional schematic diagram of one embodiment of an indoor navigation system 100 of the present disclosure that accurately and precisely determines a current location of a moveable object 102 in an indoor area (not shown in FIG. 1). The indoor area can be any suitable indoor area such as, but not limited to, a retail or wholesale store (such as a grocery store), a megastore, a shopping mall, a museum, a school, a hospital, an office building, a residential building, an indoor amusement park, and a storage warehouse.

For instance, in a hospital environment, the indoor navigation system 100 can be used for restocking or re-supplying medical items. In this embodiment, the moveable object 102 could include a cart with medical supplies. The indoor navigation system 100 displays to a user an indoor location where the supplies are needed (such as a supply closet for linens and bandages). The indoor navigation system 100 can also show a navigation route or turn-by-turn directions to areas of the hospital where supplies are needed (such as in a room of a patient). The indoor navigation system 100 can also track when the user removes medical items from the cart at a location and update the navigation route or directions.

In another embodiment, the indoor navigation system 100 could be used to guide users through a museum. In this embodiment, the indoor navigation system 100 displays a navigation route or turn-by-turn directions to different exhibits in a museum. The indoor navigation system 100 can also enable a user to search for a particular exhibit and display a navigation route or directions to reach the exhibit. The indoor navigation system 100 can also display more information about the exhibit when it detects the user is in proximity to an exhibit.

In this illustrated embodiment, the indoor navigation system 100 generally includes: (a) one or more dead-reckoning sensors 108 configured to detect movement of the moveable object 102 in the indoor area; (b) an absolute position system 116 configured to detect when the moveable object 102 moves in proximity to a known location in the indoor area; (c) one or more location processors 104 configured to determine a current location of the moveable object 102 at a point in time in the indoor area based on signals provided by the dead-reckoning sensors 108 and the absolute position system 116, and (d) a user device 106 including a display device 107 configured to show a current location of the moveable object 102 in reference to a pictorial or graphical representation of the indoor area.

The absolute position system 116 includes one or more absolute position sensors 110 and one or more absolute position transmitters 114. The absolute position sensor 110 detects when the moveable object 102 is in proximity to the absolute position transmitter 114 by sensing a signal transmitted by the transmitter 114. In FIG. 1, the absolute position sensor 110 is included or coupled to the moveable device 102 and the absolute position transmitter 114 is positioned within an indoor area.

Figure 1A:
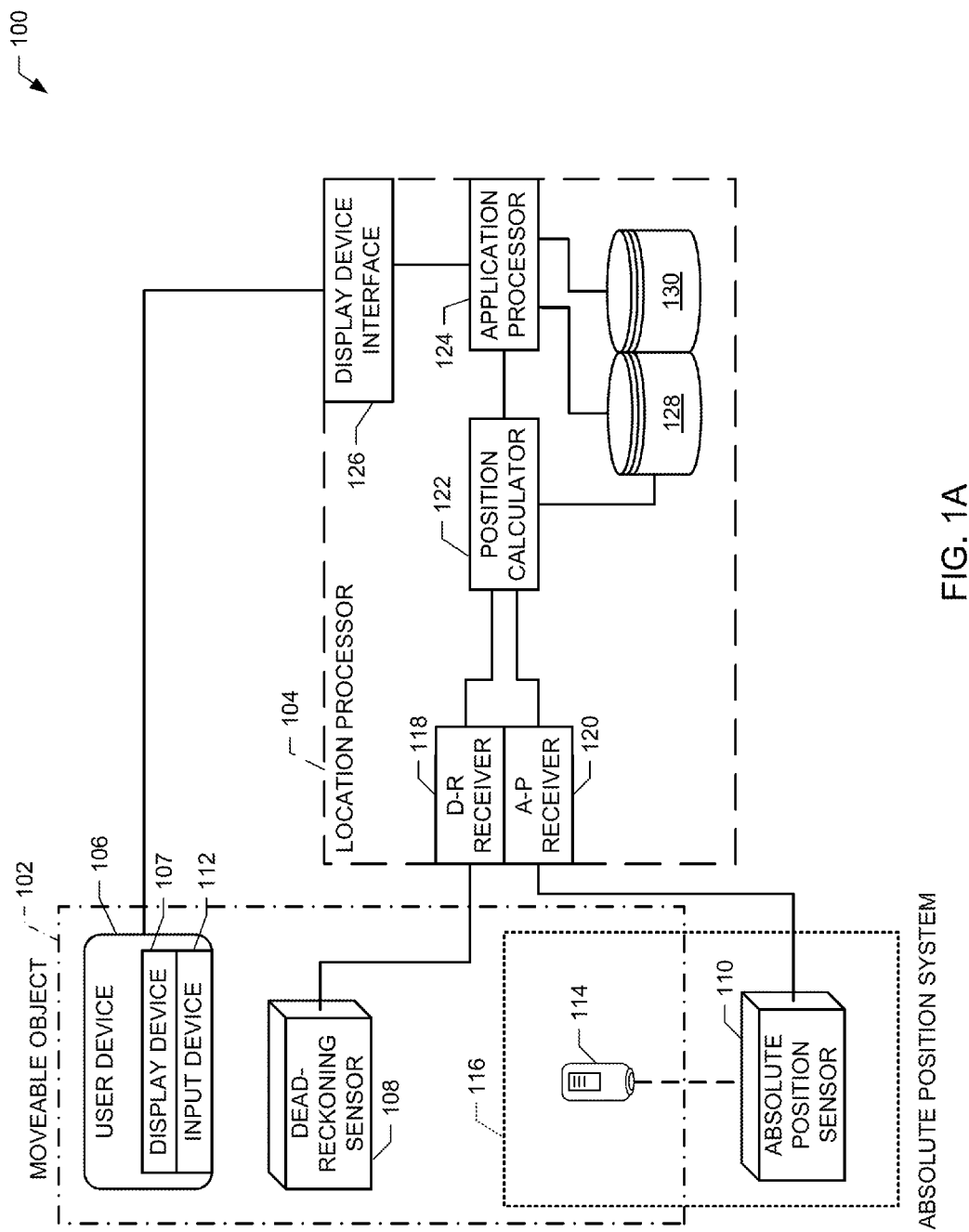
FIG. 1A is a functional schematic diagram of the indoor navigation system of another embodiment of the present disclosure.

FIG. 1A shows an absolute position system 116 including an absolute position transmitter 114 attached to or being included with the moveable object 102. In this embodiment, the absolute position sensors 110 are located throughout an indoor area and are separate from the moveable object 102. The sensors 110 detect or record light or signals emitted by each of the absolute position transmitters 114 attached to respective moveable objects 102. Each transmitter 114 transmits a light with a uniquely timed pattern that corresponds to an identifier of the transmitter 114 of the moveable object 102.

In an embodiment, the indoor navigation system 100 of FIG. 1 includes a dead-reckoning system and an RFID tag-based absolute position system 116. In this embodiment, the dead-reckoning system includes rotary encoder dead-reckoning sensors 108, the absolute position sensors 110 include RFID detectors, and the absolute position transmitters 114 include RFID tags.

In another embodiment, the indoor navigation system 100 of FIG. 1 includes a dead-reckoning system and an RFID transmitter-based absolute position system 116. In this embodiment, the dead-reckoning system includes rotary encoder dead-reckoning sensors 108, the absolute position sensors 110 include RFID detectors, and the absolute position transmitters 114 include RFID transmitters.

In another embodiment, the indoor navigation system 100 of FIG. 1 includes a dead-reckoning system and an infrared LED-based absolute position system 116. In this embodiment, the dead-reckoning system includes rotary encoder dead-reckoning sensors 108, the absolute position sensors 110 include light sensors, and the absolute position transmitters 114 include LEDs.

In another embodiment, the indoor navigation system 100 of FIG. 1A includes a dead-reckoning system and a camera-based absolute position system 116. In this embodiment, the dead-reckoning system includes rotary encoder dead-reckoning sensors 108, the absolute position sensors 110 include cameras located throughout an indoor area, and the absolute position transmitters 114 include one or more LEDs attached to moveable objects 102.

In some embodiments, the dead-reckoning system shown in FIGS. 1 and 1A can be used in conjunction with two or more different types of absolute position systems 116 described above.

Returning to FIG. 1, the user device 106 is attached to or includes an input device 112 that enables a user to interface or interact with information displayed by the display device 107. In various embodiments, the display device 107 and the input device 112 are one unit or one user device 106. In various embodiments, the user device 106 of present disclosure is a touchscreen mobile or tablet computer or computing device such as: (i) the APPLE I-PAD, (ii) the SAMSUNG GALAXY TAB, (iii) the BLACKBERRY PLAYBOOK, (iv) the HP TOUCHPAD, and (v) the MOTOROLA XOOM; however, it should be appreciated that other suitable user devices may be employed in accordance with the present disclosure. For example the user device 106 may be a smart phone or a personal digital assistant. It should thus be appreciated that the user device 106 may include one or more processors, one or more memory devices, one or more display devices, and one or more input devices, and will be able to communicate over one or more wired or wireless networks.

More specifically, it should be appreciated that: (a) the processor(s) of the user device 106 can be any suitable type of processor(s) such as but not limited to one or more microprocessor(s) from the INTEL® family of microprocessors; (b) the memory or data storage device(s) of the user device can be any suitable type of memory or data storage device such as storage devices which include volatile memory and non-volatile memory such as but not limited to: random access memory (RAM), non-volatile RAM (NVRAM), magnetic RAM (MRAM), ferroelectric RAM (FeRAM), read only memory (ROM), flash memory, and/or EEPROM (electrically erasable programmable read only memory), other suitable magnetic memory devices, any optical memory device, or any semiconductor based memory devices); (c) the memory or data storage device(s) can be configured in any suitable manner to store part or all of the program code and/or operating data for performing the functions described herein for the user device; (d) the user device may also include a hard drive, CD drive, DVD drive, and/or other storage devices suitably connected to the processor(s) of the user device; (e) the memory or data storage device(s) store one or more software programs or applications executable by the processor(s) to enable the user device 106 to perform the functions described herein; (f) the input device 112 of the user device 106 can be a touchscreen or any other suitable type of input device besides a touchscreen such as but not limited to: (i) a keyboard; (ii) a mouse; (iii) a track pad; (iv) a track ball; (v) a bar-code reader; (vi) a camera/charged-coupled device ("CCD") sensor; and (vii) a voice recognizer; (g) the display device(s) of the user device can be any suitable type of display devices such as but not limited to a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image; (h) the user device can include or be connectable wirelessly to one or more printers for printing any of the data displayed by the user device; and (i) the user device can include an audio output (such as for providing audio turn-by-turn directions).

In various embodiments, the user device 106 of the present disclosure will have one or more software applications (commonly referred to as "apps") or computer programs of the system loaded on the user device 106 to provide the user interfaces and functionality of the system of the present disclosure and to facilitate communication between the user device 106 and the location processor 104 of the system of the present disclosure. It should be appreciated that such applications or programs can be loaded or downloaded on the user device in any suitable manner. It should also be appreciated that the present disclosure includes the software applications or software programs on one or more memory or data storage devices separate from the user device or on the user device.

Turing back to FIG. 1, in the embodiment of FIG. 1, the moveable object 102 includes any device capable of being tracked within an indoor area. For example, the moveable object 102 can be a shopping cart, a shopping basket, or any other apparatus that can be pushed or moved by a user. It should be appreciate that the user device 106 may be detachable or may not be detachable from the moveable object. In other words, the user device 106 may be integrated in the movable object 102 or may just be removably attachable to the moving object 102.

FIG. 1 generally shows that the user device 106 including the display device 107 and the input device 112 are attached to the moveable object 102. The display device 107 displays a current location of the moveable object 102 at a point in time within an indoor area based on message(s) received from the location processor 104. The display device 107 shows the current location at a point in time as a point in a graphical representation of the indoor area (such as a point or icon in a store layout). The display device 107 may also show a route or path through an indoor area and provide turn-by-turn directions to reach desired products or items of interest in the indoor area. It should be appreciated that all of this information can be displayed in many different suitable manners.

The example user device 106 of FIG. 1 is communicatively coupled to the input device 112, which enables a user to interact with the user device 106. The input device 112 can include keys, buttons, or a touchscreen as mentioned above. In an example, the input device 112 may include a keypad that enables a user to input a product (or item of interest) name to search for the product's location within an indoor area. In other examples, the input device 112 enables a user to interact with the graphical representation of an indoor area displayed by the display device. This interaction may include browsing a layout of the indoor area, entering a destination in the indoor area, or specifying a route through the indoor area. The input device 112 also may include ports to enable a user to enter a list of products or provide other information such as credit card payment or shopper club membership information. Further, the input device 112 may also include a scanner to scan product bar codes selected by a user.

The example dead-reckoning sensor 108 detects movement of the moveable object 102. In various embodiments, the dead-reckoning sensor 108 is coupled or attached to the moveable object 102 so that the dead-reckoning sensor 108 does not become dislodged or misplaced during use of the moveable object 102. In certain embodiments, the dead-reckoning sensor 108 is included within and/or integrated with the user device. While the moveable object 102 is shown with the single dead-reckoning sensor 108, it should be appreciated that in other embodiments, multiple dead-reckoning sensors are employed with the moveable object.

The dead-reckoning sensor 108 includes one or more sensors to sense movement of the moveable object 102. The sensors can include inertial sensors, magnetometers, accelerometers, velocity sensors, rotation sensors, rotary encoder sensors, or other suitable sensors. The dead-reckoning sensor 108 converts the detected movement of the moveable object 102 into a corresponding digital or analog signal representative of the movement. The sensor 108 then transmits the signal to the location processor 104 as a dead-reckoning signal. For example, a rotary encoder dead-reckoning sensor may be one of either a mechanical or optical quadrature encoder that detects a direction and magnitude of wheel movement. Additionally, rotary encoder dead-reckoning sensors on multiple wheels of the moveable object 102 may be used as quadrature encoders to determine an orientation of the moveable object 102 based on differences in rotation of the different wheels.

The example absolute position sensor 110 of FIG. 1 detects a presence of an absolute position transmitter 114. The absolute position sensor 110 includes any sensor that can detect RF, light, sound or any other signals generated by the absolute position transmitter 114. While FIG. 1 shows the moveable object 102 as having the single absolute position sensor 110, in other embodiments the moveable object 102 can have multiple absolute position sensors.

In the embodiment of FIG. 1, the absolute position sensor 110 transmits absolute positioning signals that are used by the location processor 104 to determine a reference location of the moveable object 102 at a point in time. In particular, the absolute position sensor 110 detects signals generated by the transmitter 114 and determines an identifier associated with the signal. For example, the transmitter 114 encodes a signal with an identifier that is unique only to that particular transmitter 114. The absolute position sensor 110 decodes the signal to determine the identifier. The absolute position sensor 110 then transmits the identifier within an absolute positioning signal to the location processor 104.

In certain embodiments, the absolute position sensor 110 may also detect an intensity or strength of a signal transmitted by the absolute position transmitter 114. In these embodiments, the absolute position sensor 110 includes the intensity or signal strength with the identifier in an absolute positioning signal. The location processor 104 then uses the intensity or signal strength information to determine a distance between the absolute position transmitter 114 and the moveable object 102.

In other embodiments, the absolute position sensor 110 only converts the RF or light signal from the transmitter 114 into an electronic signal. In these alternative embodiments, the location processor 104 decodes the absolute positioning signal from the sensor 110 to determine the identifier associated with the transmitter 114. In another embodiment, the absolute position sensor 110 may transmit RF or light request signals that are received by the transmitter 114. In these embodiments, the transmitter 114 generates a response signal including an identifier after receiving a request signal.

The example transmitter 114 of FIG. 1 includes any device capable of transmitting an identifier via light, RF, or sound signals. Together, the absolute position sensor 110 and the absolute position transmitter(s) 114 provide an absolute position system 116. The absolute position system 116 includes a configuration of sensors 110 and transmitters 114 to detect reference locations of the moveable object 102 at a point in time in an indoor environment. An absolute position system 116 may include tens, hundreds, or thousands of the transmitters 114 or sensors 110 that enable the detection and position of multiple moveable objects in an indoor area.

The indoor navigation system 100 includes the location processor 104 to determine a current location of the moveable object 102 at a point in time based on dead-reckoning and absolute positioning signals. The location processor 104 is shown in FIG. 1 being separate from the moveable object 102. In certain embodiments, the location processor 104 is located within the indoor area (such as within a computer or server central to the indoor area). In other embodiments, the location processor 104 is external to the indoor area (such as within a computer or server central to multiple indoor areas). Alternatively, the location processor 104 may be attached to the moveable object 102 (such as being included within the user device).

Additionally, while the location processor 104 is shown as one device, in other examples, portions of the location processor 104 may be included within different devices. For example, receivers 118 and 120 and a position calculator 122 may be included within the user device while an application processor 124, display device interface 126, and databases 128 and 130 are located within a server or computer for the indoor area. Further, while the location processor 104 is shown as including the functional components 118 to 130, the processor 104 may include additional components based on functions and applications implemented by the indoor navigation system 100.

In the embodiment of FIG. 1, the location processor 104 includes the dead-reckoning (D-R) receiver 118 and the absolute position (A-P) receiver 120. The D-R receiver 118 receives dead-reckoning signals from the dead-reckoning sensor 108. After receiving a signal, the D-R receiver 118 parses the signal for movement and orientation information. The D-R receiver 118 then transmits this information to the position calculator 122. In certain embodiments, the D-R receiver 118 buffers received dead-reckoning signals until the position calculator 122 is available.

The A-P receiver 120 of FIG. 1 receives absolute positioning signals from the absolute position sensor 110. After receiving a signal, the A-P receiver 120 parses the signal for an identifier associated with the transmitter 114. The A-P receiver 120 may also parse the signal for signal intensity or signal strength information. The A-P receiver 120 then transmits this information to the position calculator 122. In certain embodiments, the A-P receiver 120 buffers absolute positioning signals until the position calculator 122 is available.

The example location processor 104 includes the position calculator 122 to calculate a location of the moveable object 102 in the indoor area. The example position calculator 122 uses dead-reckoning signals and absolute positioning signals to determine a location of the moveable object in reference to an indoor area. The position calculator 122 applies a position computation algorithm (PCA) to received signals to determine a location of the moveable object 102. The PCA uses the absolute positioning signals to determine a reference location of the moveable object 102 and uses the dead-reckoning signals to determine a direction and distance of travel of the moveable object 102 from a reference location. In some embodiments, the PCA uses dead-reckoning signals or previously received dead-reckoning signals in conjunction with absolute positioning signals to determine an orientation of the moveable object 102 at a reference location at a point in time.

Thus, the PCA uses the dead-reckoning and absolute positioning signals in combination or sequentially so that the location of the moveable object 102 in the indoor area is always known.

Figure 2A:
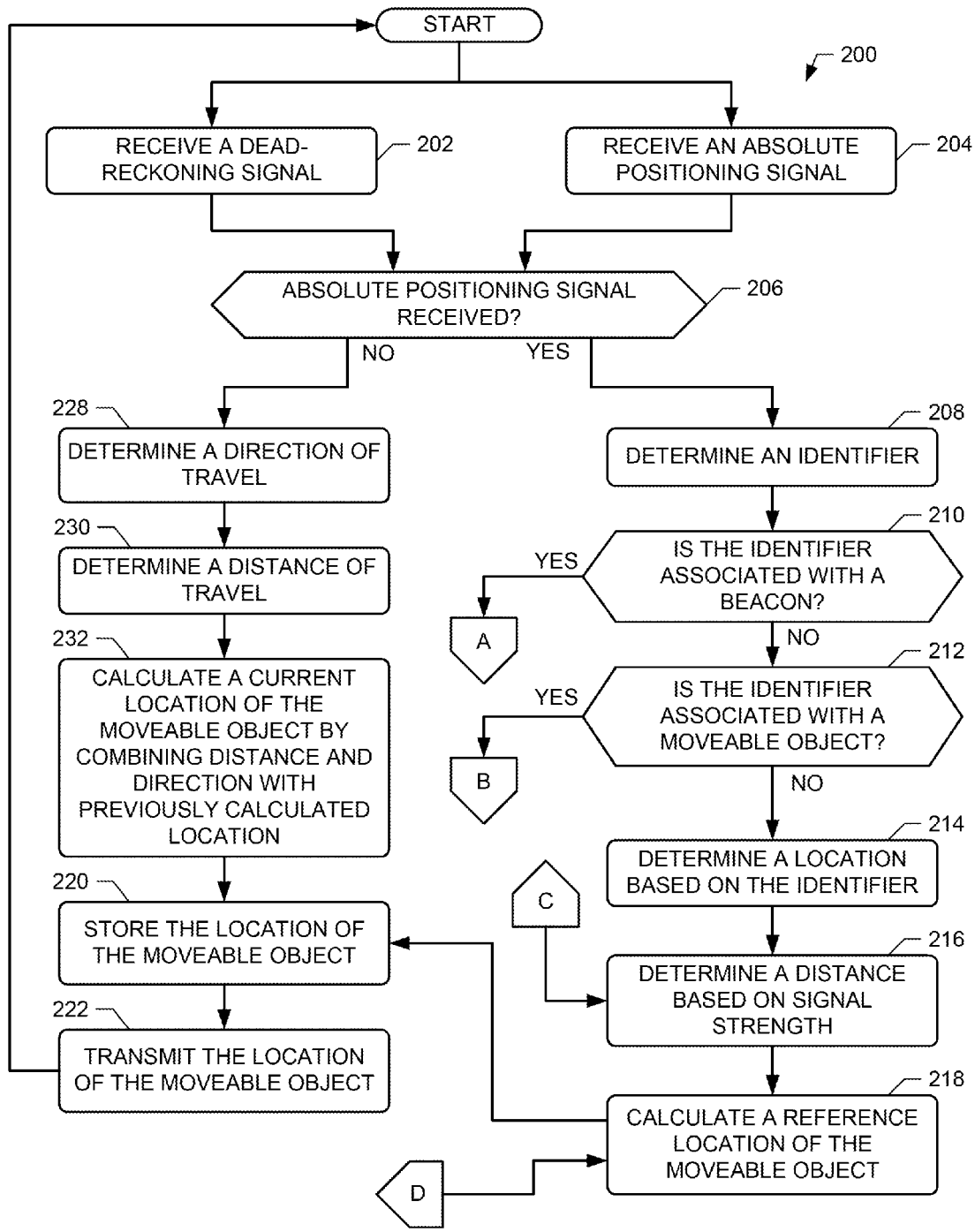
FIGS. 2A and 2B are flowcharts representative of example machine-accessible instructions, which may be executed to determine a location of a moveable object using the indoor navigation system of FIG. 1.
Figure 2B:
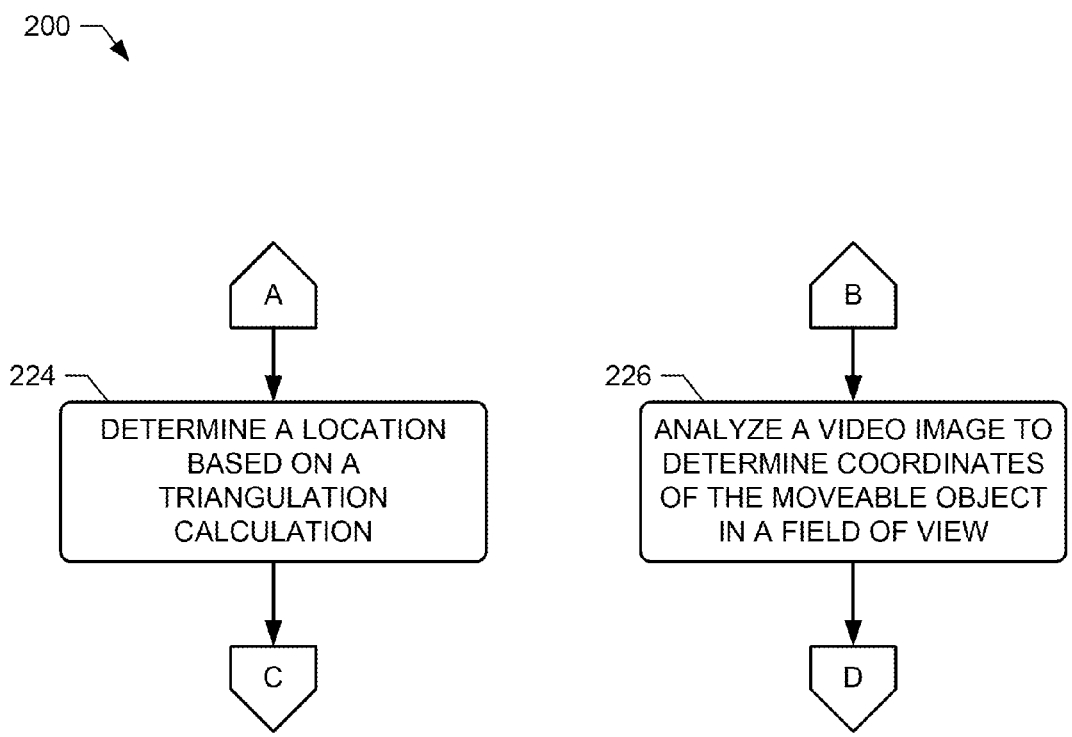

FIGS. 2A and 2B show a flowchart of an example process 200 that can be used by the PCA of the position calculator 122 to determine a current location of the moveable object 102. The process 200 begins by the position calculator receiving dead-reckoning signals and/or absolute position signals as indicated by blocks 202 and 204. The position calculator 122 then determines if an absolute position signal was received as indicated by block 206.

If the absolute positioning signal is available, the position calculator 122 determines a location of the moveable object 102 at a point in time based on this signal because it provides a known reference location (such as being adjacent to the transmitter 114) at this point in time. However, if an absolute positioning signal is not available, indicating the moveable object 102 is not in proximity of the transmitter 114, the position calculator 122 uses the dead-reckoning signal to determine movement of the moveable object 102 from a previously known location. In this manner, the position calculator 122 oscillates between the use of absolute positioning and dead-reckoning signals based on the availability of absolute positioning signals.

In the embodiment of FIGS. 2A and 2B, if the absolute positioning signal is received, the position calculator 122 determines an identifier within the signal as indicated by block 208. The position calculator 122 uses the identifier to determine which type of absolute position system 116 is being used by the indoor navigation system 100 by determining if the identifier is associated with a beacon, the moveable object 102, or the transmitter 114 as indicated by blocks 210 and 212. In embodiments where only one type of absolute position system 116 is implemented, the position calculator 122 may forgo this determination.

If the identifier is associated with the transmitter 114, the position calculator 122 matches the identifier to a location within an indoor area as indicated by block 214. To make this match, the position calculator 122 accesses the indoor area database 128, which includes a list of identifiers of transmitters 114 used throughout the indoor area and the corresponding location of each of the transmitters 114. The position calculator 122 associates a location corresponding to the transmitter 114 as an input to determine at a point in time the location of the moveable object 102. In instances when absolute positioning signals are received from multiple absolute position sensors 110, the position calculator 122 determines a reference location of the moveable object 102 by determining a common point associated with all of the corresponding transmitters 114.

The position calculator 122 may also use signal intensity or signal strength information to determine a distance between the transmitter 114 and the absolute position sensor 110 as indicated by block 216. The position calculator 122 determines the distance based on known signal intensities or signal strengths correlated or calibrated to known distances. For example, a signal intensity normalized to 0.5 may correspond to a distance of 1 meter. The position calculator 122 uses this distance information in conjunction with the known location of the transmitter 114 to calculate the reference location of the moveable object 102 as indicated by block 218.

The position calculator 122 stores the reference location of the moveable object 102 for subsequent determinations of its location as indicated by block 220. The position calculator 122 next transmits a message indicative of the reference location to, for example, the user device 106 as indicated by block 222. The position calculator 122 then returns to receiving dead-reckoning and absolute positioning signals as indicated by blocks 202 and 204. In certain embodiments, the position calculator 122 receives and processes signals while at some substantially same time determining and transmitting messages indicative of the location of the moveable object 102.

In embodiments where an identifier is associated with a beacon or an RF transmitter (such as the transmitter 114) as indicated by block 210, the position calculator 122 determines a location of the moveable object 102 using a triangulation calculator as indicated by block 224. In these embodiments, the position calculator 122 receives absolute positioning signals associated with at least three different RF transmitters. The position calculator 122 may also use detected signal strength to calculate a distance between the moveable object 102 and the RF transmitters as indicated by block 216 before storing and transmitting messages indicative of the calculated reference location as indicated by blocks 220 and 222.

In embodiments where the identifier is associated with the moveable object 102 as indicated by block 212, the position calculator 122 analyzes a video image captured by a camera as indicated by block 226. In these embodiments, the transmitter 114 may function as an infrared light transmitter (such as a pulse emitter) and is attached to the moveable object 102. Also, the absolute position sensor 110 is implemented by a camera that is located within an indoor area and not attached to the moveable object 102. The location processor 122 determines a location of the moveable object 102 by knowing a position and orientation of the camera, determining coordinates in a video image where the infrared light is located, and determining a reference location based on the coordinates as indicated by block 218. In this embodiment, the indoor area database 128 stores a list that associates reference locations with video image coordinates associated with a specific camera. After determining the reference location of the moveable object 102, the position calculator 122 stores the reference location and transmits a message indicative of the reference location as indicated by blocks 220 and 222.

To determine a location of the moveable object 102 based on a dead-reckoning signal as indicated by block 206, the position calculator 122 uses the PCA to calculate an orientation and distance as indicated by blocks 228 and 230. The position calculator 122 then adds the orientation and distance to the previously known stored location of the moveable object 102 as indicated by block 232. For example, if the previously known location was a reference location, the position calculator 122 adds the calculated distance and direction to determine a current location. The position calculator 122 then stores the current location to an application processor 124 and transmits a message indicative of the current location as indicated by blocks 220 and 222.

Returning to FIG. 1, after the position calculator 122 has determined the location of the moveable device at a point in time, the application processor 124 processes the location in conjunction with navigational-based applications. For example, the application processor 124 determines which point on a map or pictorial or graphical representation of the indoor area corresponds to the current location of the moveable object 102 at a point in time. In another embodiment, the application processor 124 calculates a route through an indoor area based on the current location at a point in time and products of interest specified by a user. In other example embodiments, the application processor 124 determines which products are in proximity to the current location of the moveable object 102 so as to cause the display device 107 to display a corresponding coupon or advertisement.

The application processor 124 accesses the application database 130 and the indoor area database 128 to determine when the current location is to be displayed in reference to an indoor area or relevant products. The application database 130 includes applications and corresponding data used by the application processor 124. A user or operator of the indoor navigation system 100 updates the database 130 based on applications to be available to a user of the moveable object 102 or based on requests of product manufacturers. For example, a product manufacturer may have the application database 130 updated with an advertisement for a product when a moveable object is in proximity of the product. The databases 128 and 130 may be implemented by Electronically Erasable Programmable Read-Only Memory (EEPROM), Random Access Memory (RAM), Read-Only Memory (ROM), and/or any other type of memory.

The example location processor 104 includes the display device interface 126 to maintain communication sessions with one or more of the user devices 106. The example display device interface 126 formats and transmits messages indicative of a current location of the moveable object 102 to the user device 106, thereby causing the display device 107 to display the location. The display device interface 126 also transmits application data (such as product information, a map of an indoor area, a route though an indoor area, turn-by-turn directions to a product, an advertisement, etc.), which is displayed by the display device 107 in conjunction with the current location of the moveable object 102.

The example display device interface 126 also receives inputs provided by the input device 112. The inputs can include a name of a product or a scanned bar code of a product. After receiving an input, the display device interface 126 forwards this data to the application processor 124. Additionally, in instances where the location processor 104 is communicating with multiple user devices, the display device interface 126 manages connectivity sessions between the user devices and the corresponding applications being operated in the application processor 124.

While the location processor 104 has been shown in FIG. 1, one or more of the servers, platforms, interfaces, data structures, elements, processes and/or devices illustrated in FIG. 1 may be combined, divided, re-arranged, omitted, eliminated and/or implemented in any way. Further, the user device 106, the display device 107, the dead-reckoning sensor 108, the absolute position sensor 110, the receivers 118 and 120, the position calculator 122, the application processor 124, the display device interface 126, the databases 128 and 130, and more generally, the location processor 104 may be implemented by hardware, software, firmware and/or any combination of hardware, software and/or firmware. Thus, for example, any of the user device 106, the display device 107, the dead-reckoning sensor 108, the absolute position sensor 110, the receivers 118 and 120, the position calculator 122, the application processor 124, the display device interface 126, the databases 128 and 130, and/or more generally, the location processor 104 could be implemented by one or more circuit(s), programmable processor(s), application specific integrated circuit(s) (ASIC(s)), programmable logic device(s) (PLD(s)) and/or field programmable logic device(s) (FPLD(s)), etc. At least one of the user device 106, the display device 107, the dead-reckoning sensor 108, the absolute position sensor 110, the receivers 118 and 120, the position calculator 122, the application processor 124, the display device interface 126, or the databases 128 and 130 can include or be implemented by a computer readable medium such as a memory, DVD, CD, etc. storing the software and/or firmware.

Figure 3:
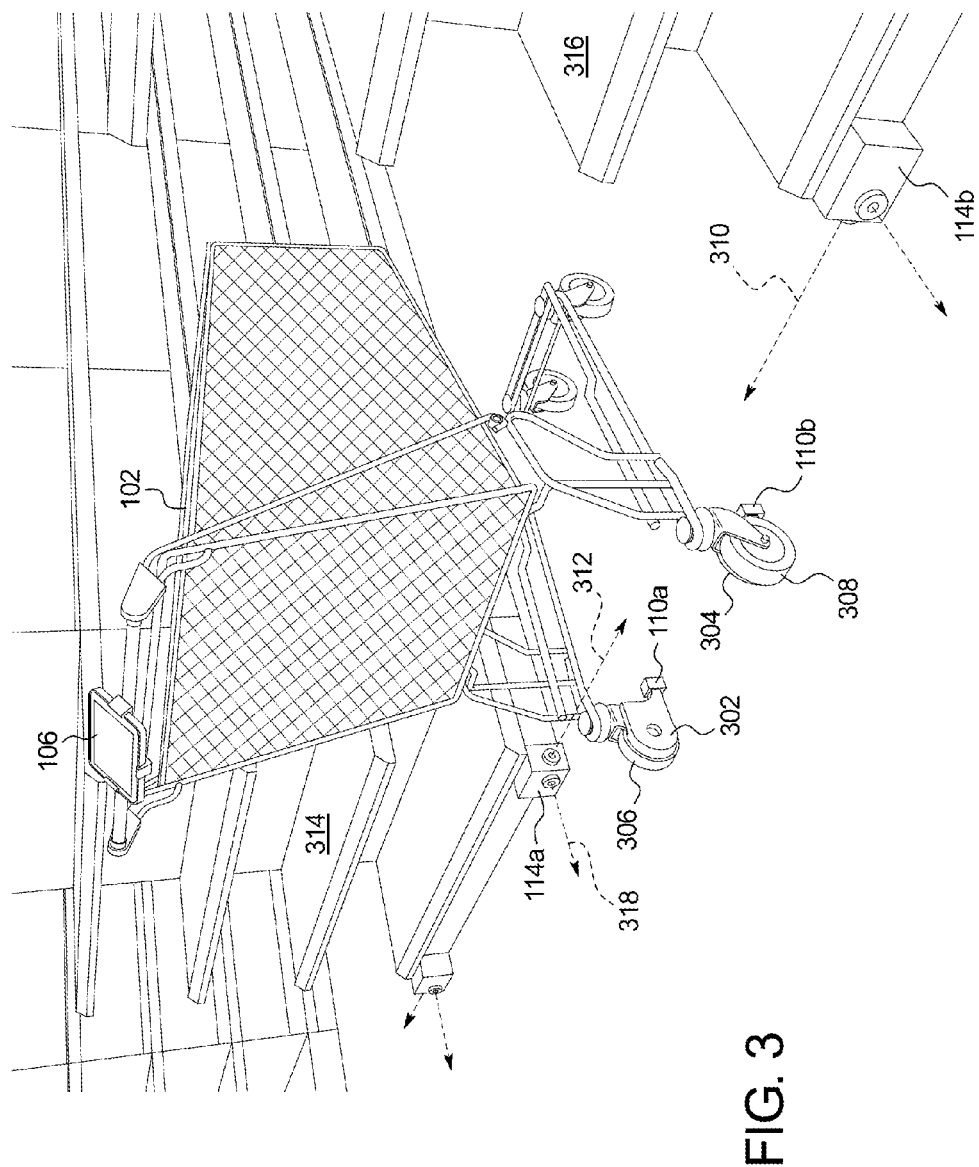
FIG. 3 is a perspective view of an example moveable object in the form of a grocery cart including dead-reckoning sensors and absolute position sensors that sense LED emitters for absolute positioning in an indoor store.

FIG. 3 shows an example implementation of the indoor navigation system 100 of FIG. 1 where the absolute position system 116 includes LED-based transmitters 114a and 114b emitting infrared laser light and light sensing absolute position sensors 110a and 110b. In this embodiment, the indoor area includes a grocery store and the moveable object 102 includes a grocery cart. The dead-reckoning sensor 108 and the absolute position sensor 110 described in FIG. 1 are included within position sensing apparatus 302 and 304. Additionally, the user device 106 is shown attached to the moveable object 102. While the embodiment shows the transmitters 114a and 114b, other indoor areas can include additional transmitters 114 located throughout the indoor area.

In this embodiment, the absolute position sensors 110a and 110b are infrared light sensors that are located by rear wheels 306 and 308 of the moveable object 102 to detect infrared light transmitted by the transmitters 114a and 114b. The transmitters 114a and 114b are laser LEDs that transmit uniquely timed pulses of light 310 and 312 corresponding to assigned identifiers. In this embodiment, the transmitter 114a could be assigned identifier 'a1a' and the transmitter 114b could be assigned identifier 'a2a.' The transmitters 114a and 114b are aligned such that the absolute position sensors 110a and 110b detect the transmitted pulses of light when the moveable object 102 passes in proximity to the transmitters 114a and 114b.

When the moveable object 102 passes through the pulses of light 310 and 312, the absolute position sensor 110a detects the light pulse 312 and the absolute position sensor 110b detects the light pulse 310. The sensor 110a determines that the timing of the light pulse 312 corresponds to the identifier 'a1a' and transmits this identifier to the location processor 104 as an absolute positioning signal. The processor 104 then cross-references the 'a1a' identifier to the location of the transmitter 114a at the corner of aisle 314 to determine a first reference location of the moveable object 102. In a similar manner, the sensor 110b determines the light pulse 310 corresponds to the identifier 'a2a.' The location processor 104 cross-references the 'a2a' identifier to a corner location of aisle 316 to determine a second reference location of the moveable object 102. In certain instances, the location processor 104 resolves the first and second reference locations by determining that the reference location of the moveable object 102 should be located between the two transmitters 114a and 114b. In this manner, the indoor navigation system 100 is able to accurately and precisely determine a reference location of the moveable object 102 in an indoor area.

In certain embodiments, the transmitters 114a and 114b have differently timed light pulses for different directions of the transmitted light. For example, the transmitter 114a includes two directions of light transmission shown by light pulses 312 and 318. The light pulse 312 can be timed to represent the 'a1a' identifier and the light pulse 318 can be timed to represent the 'a1b' identifier. The location processor 104 then uses the identifier to determine that not only is the transmitter 114a in proximity to the moveable object 102 but also which side of the transmitter 114a the moveable object 102 is located.

Figure 4A:
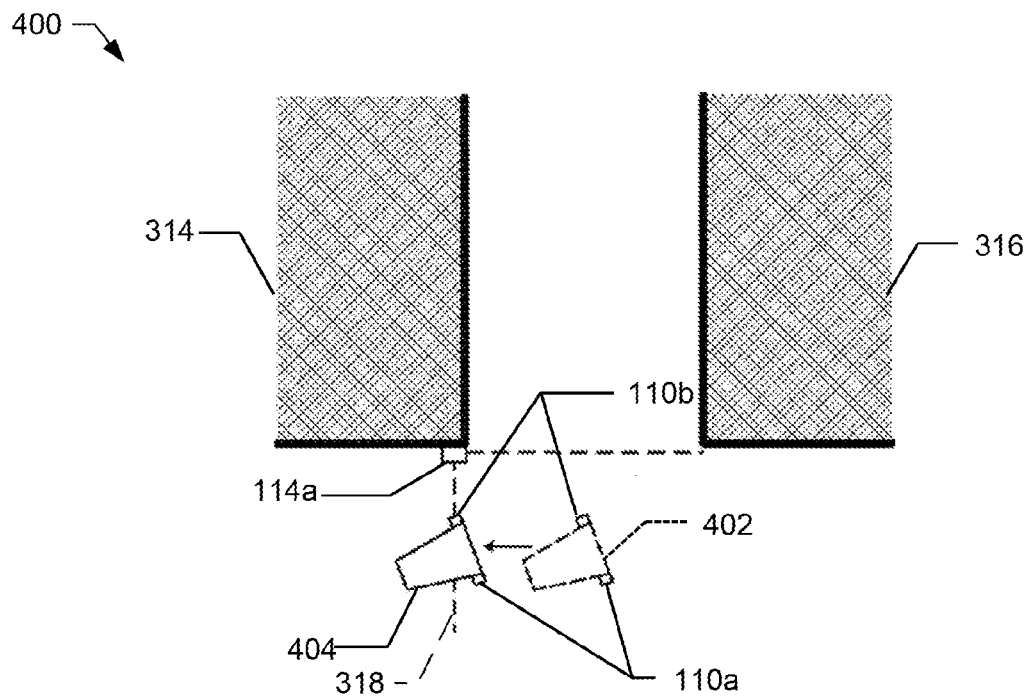
FIGS. 4A and 4B are diagrammatic views showing the absolute position system of FIG. 3 operating in conjunction with dead-reckoning sensors.
Figure 4B:
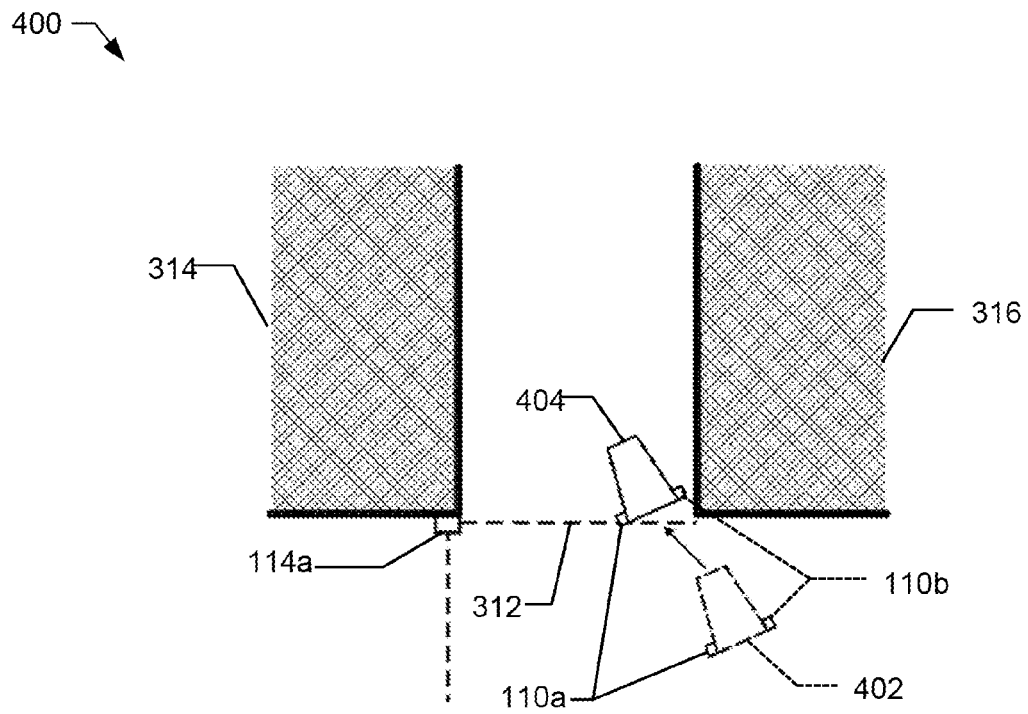

FIGS. 4A and 4B generally show an example of how the absolute position system 116 operates in conjunction with the dead-reckoning sensor 108. The location processor 104 uses dead-reckoning signals to determine the moveable object 102 is located at accumulated error location 402. However, the moveable object 102 is actually located at reference location 404. The difference between the accumulated error location 402 and the reference location 404 may result from accumulating errors of the dead-reckoning sensor 108. The accumulating errors can result from physical anomalies such as wheels of the shopping cart slipping on a floor, drift in solid state micro sensors, or interference from RF events. The accumulating errors can also result from repeated mathematical rounding by the position calculator 122.

In this example, the indoor navigation system 100 uses absolute positioning signals to correct for any accumulating error. For instance, in FIG. 4A, the transmitter 114a emits the light pulse 318, which is detected by the absolute position sensor 110b of the moveable object 102. The location processor 104 determines that an identifier encoded in the light pulse 318 corresponds to the transmitter 114a and that the moveable object 102 is positioned somewhere along a line segment that coincides with the pulsed light 318.

The location processor 104 determines where the moveable object 102 is located along the line segment by extrapolating the accumulated error of the accumulated error location 402 to the location of the pulsed light 318. The location processor 104 extrapolates the current location 102 by minimizing the adjustment of the location of the moveable object 102. Thus, the location processor 104 adjusts the location of the moveable object 102 to the point along the light pulse 318 that is closest to the location 402. The location processor 104 then changes the displayed location of the moveable object from the accumulated error location 402 to the reference location 404.

FIG. 4B shows an example where the location processor 104 has calculated the moveable object 102 is at the location 402. However, in this example, the moveable object 102 passes through the pulsed light 312. The location processor 104 uses a unique identifier associated with the pulsed light 312 to determine the moveable object 102 is actually located at the reference location 404. In this manner, the absolute position system 116 provides error correction for accumulating errors resulting from extended reliance of dead-reckoning signals.

In this embodiment, the location processor 104 uses map imposed restrictions to ensure a calculated location of the moveable object 102 does not violate location rules. For instance, the location processor 104 may determine based on accumulating errors that the calculated location 402 coincides with the aisle 316. A location rule may specify that the moveable object 102 cannot be located on aisles. As a result, the location processor 104 recalculates the location of the moveable object to be adjacent to the aisle 316 at the nearest point to the accumulated error location 402.

Furthermore, it should also be appreciated that such map imposed restrictions are not only considered at points where an absolute positioning process is executed, but at any time when the location of the moveable object 102 is updated. For example, if a location is updated as a result of dead-reckoning processes where accumulated errors should cause a violation of location rules (such as when the cart's location overlaps with a physical shelving unit), the location is again updated such that the move object 102 is displayed as being closest to the calculated position without violating such rules (e.g. adjacent rather than overlapped to the physical shelving unit).

Figure 5:
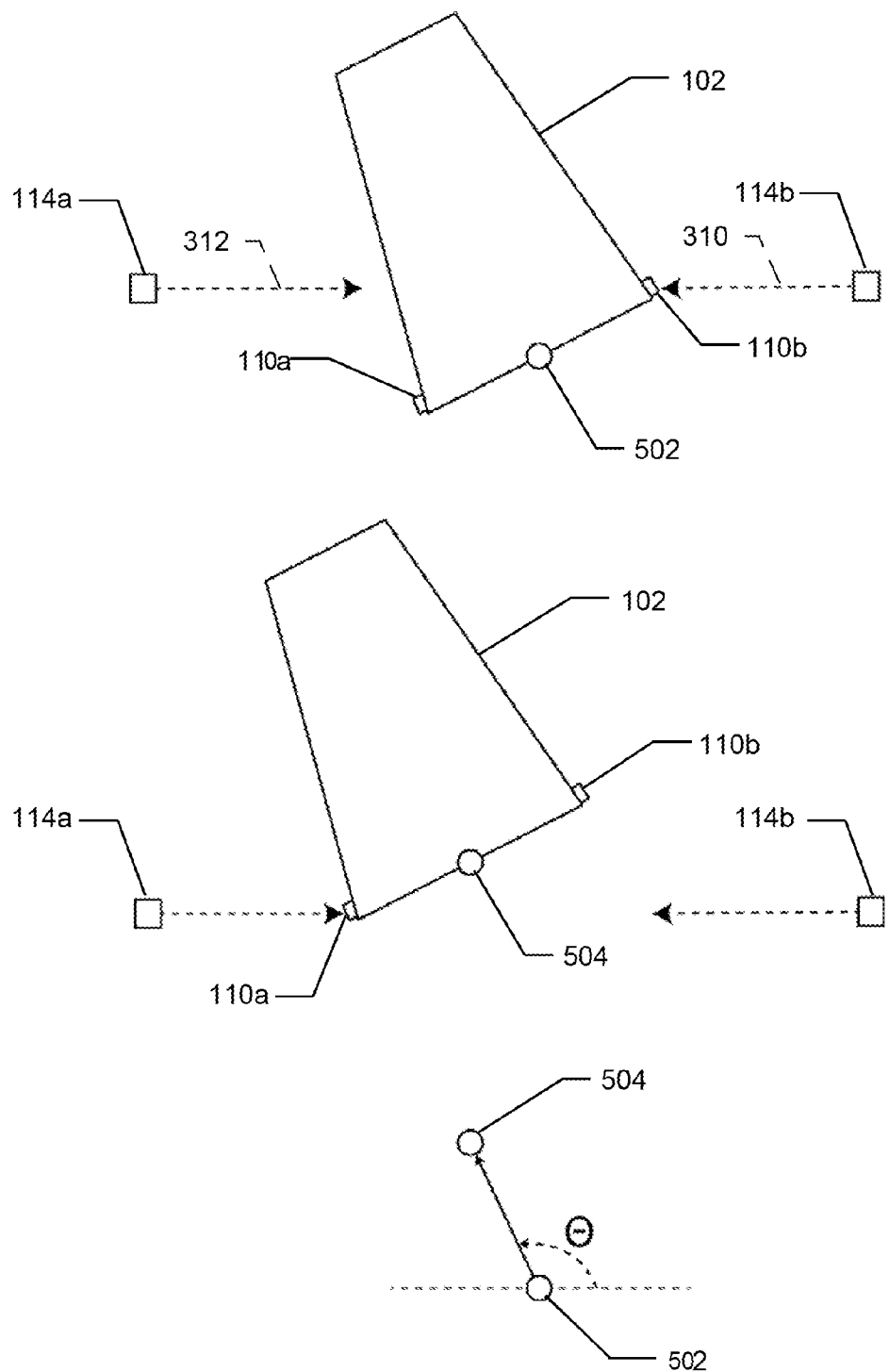
FIG. 5 is a diagrammatic view showing the absolute position system of FIG. 3 determining an orientation of a moveable object.

FIG. 5 generally shows how the absolute position system 116 of FIG. 1 determines an orientation of the moveable object 102. In this example, the location processor 104 uses dead-reckoning signals and timing of absolute positioning signals to determine an orientation of the moveable object 102. In this instance, the absolute position sensor 110b detects the pulsed light 310 at time A and the absolute position sensor 110a detects the pulsed light 312 at a time B. Using the computed location derived at time A and time B (which make use of the dead-reckoning signals as described previously) enables a vector to be computed connecting computed locations 502 and 504. The location processor 104 uses this information to determine that the moveable object at time B is located at the reference location 504 at an angle equal to theta (θ) such that only the absolute position sensor 110a is aligned with the transmitter 114a.

The difference between computed locations 502 and 504 at times A and B is relatively small, meaning that any accumulated error introduced through the dead-reckoning process between these two times is also relatively small (possibly equal or very near a zero error value). Based on the relatively small accumulated error, the location processor 104 considers the dead-reckoning signals as being accurate to provide an accurate calculation of both orientation and position. Again, this is significant because the location processor 104 calculates subsequent future dead-reckoning based-positions using a starting or absolute location and orientation. It should also be appreciated that while this description has pertained to the embodiment where pulsed light is detected, equivalent assumptions and calculation can be performed when RFID tags have been detected to enable accurate determination of absolute location and orientation.

The location processor 104 then causes the display device 107 of the user device 106 to display movement of the moveable object 102 by showing the moveable object 102 has moved from reference location 502 to reference location 504. In this manner, the location processor 104 uses a combination of absolute positioning signals and dead-reckoning signals to calculate an orientation and position of the moveable object 102.

Figure 6:
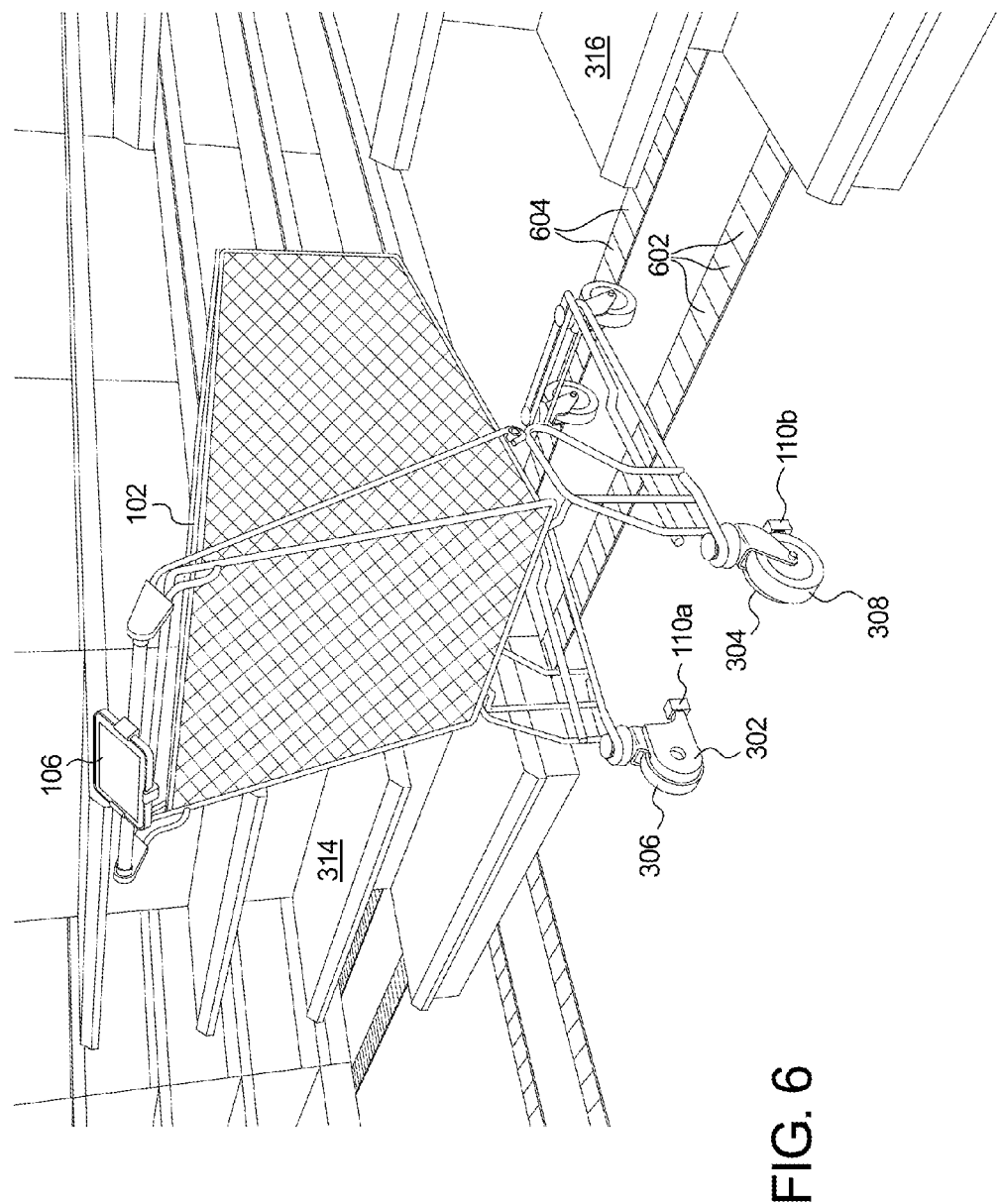
FIG. 6 is a perspective view of the moveable object of FIG. 3 that uses RFID tags for absolute positioning in an indoor area.

FIG. 6 shows the example moveable object 102 of FIG. 3 in an indoor area that uses rows of RFID tags 602 and 604 as transmitters 114 for absolute positioning. The rows of RFID tags 602 and 604 are shown as being parallel with each other and located between the aisles 314 and 316. In other embodiments, the rows of RFID tags 602 and 604 are placed on a floor in different patterns or designs (such as in next to and positioned in parallel to the aisle 314). Additionally, while the rows of RFID tags 602 and 604 are shown attached or embedded within the floor of an indoor area, other embodiments could have rows of RFID tags located in shelving of the aisles 314 and 316.

In this illustrated embodiment, the position sensing apparatus 302 and 304 includes absolute position sensors 110a and 110b that are downward facing RFID readers. The absolute position sensors 110a and 110b transmit RF read request signals. After receiving a read request signal, the rows of RFID tags 602 and 604 transmit a response signal that includes a unique identifier. The identifier corresponds to the entire row of RFID tags 602 and 604. Alternatively, each RFID tag within the rows 602 and 604 may be assigned a unique identifier assisting the location processor 104 to more accurately determine a reference location of the moveable object 102. It should be appreciated that the location processor 104 can accurately determine an absolute location of the moveable object 102 based only on absolute position signals from one downward facing RFID reader.

After receiving an identifier of either of the rows of RFID tags 602 and 604, the absolute position sensors 110a and 110b transmit absolute positioning signals to the location processor 104. The location processor 104 then cross-references the identifiers to a reference location within an indoor area. The location processor 104 next transmits messages indicative of this reference location to the user device 106 for display to a user. In this manner, the indoor navigation system 100 is able to accurately and precisely determine a reference location of the moveable object 102.

In other embodiments, the rows of RFID tags 602 and 604 are replaced by RFID transmitters in the absolute position system 116. These RFID transmitters emit a unique RFID beacon that is detected by the RF readers or receivers of the absolute position sensors 110a and 110b. The absolute position sensors 110a and 110b detect one or more beacons and determine identifiers associated with the beacons. The absolute position sensors 110a and 110b may also determine signal strength of the beacons. The absolute position sensors 110a and 110b next transmit the identifiers and signal strength to the location processor 104, which references the identifiers to the known locations of the beacons. The location processor 104 then uses the signal strength and the locations of each beacon to triangulate a reference location of the moveable object 102.

Figure 7:
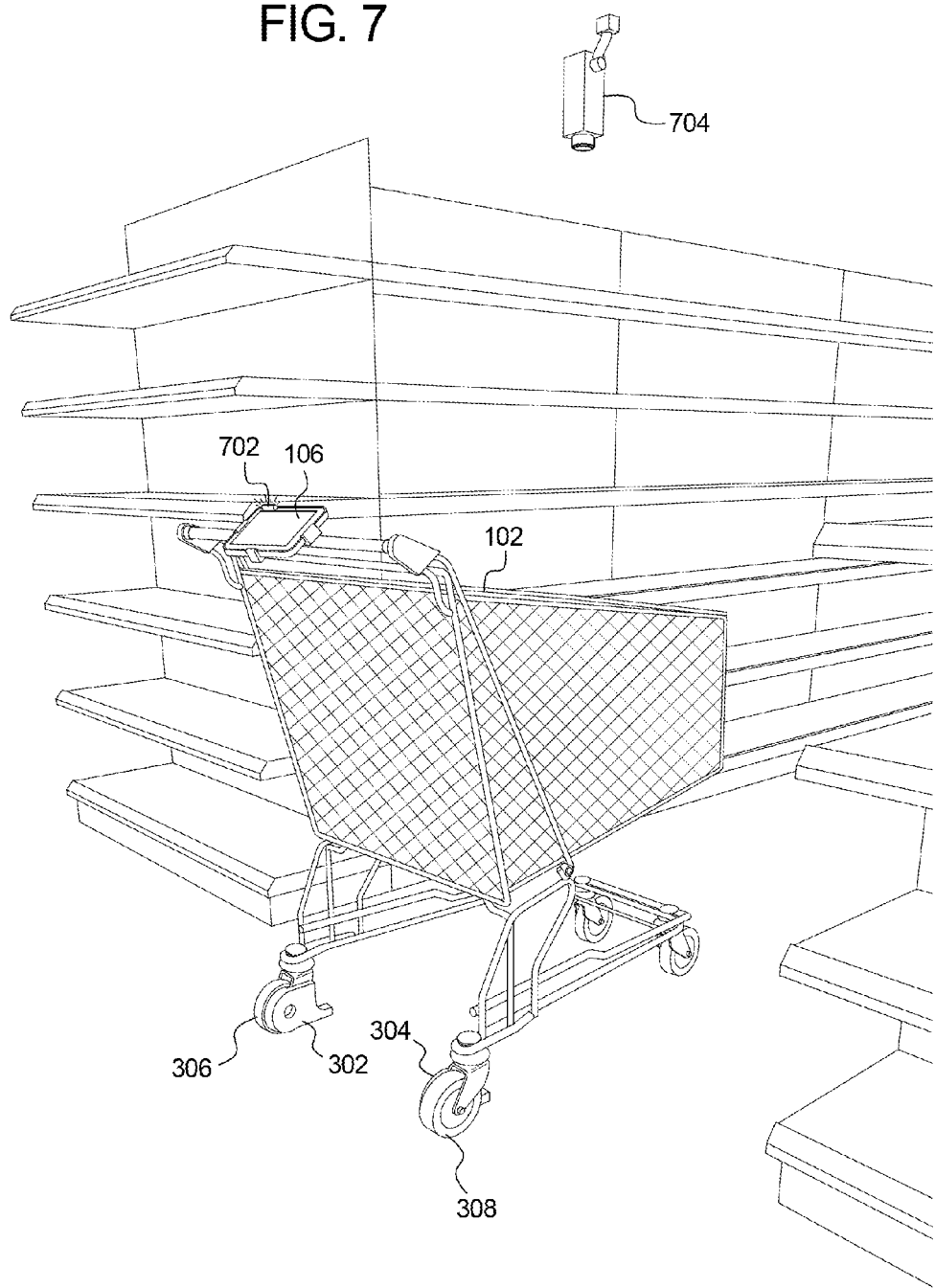
FIG. 7 is a perspective view of the example moveable object of FIG. 3 with an infrared light pulse emitter that uses one or more camera(s) to detect the light pulses in an indoor area.

FIG. 7 shows the example moveable object 102 of FIGS. 3 and 6 with an infrared light pulse emitter 702. In this embodiment, the pulse emitter 702 is the transmitter 114 of FIG. 1A and emits a uniquely timed pattern of light that represents an identifier corresponding to the moveable object 102. The pulsed light is detected by a camera 704 positioned within an indoor area. In this embodiment, the camera 704 is the absolute position sensor 110 of FIG. 1A. While FIG. 7 shows the single camera 704, other embodiments can include additional cameras spaced throughout an indoor area.

In the embodiment of FIG. 7, the camera 704 detects the pulsed light transmitted by the pulse emitter 702 when the moveable object 102 passes within a field of view of the camera 704. The camera 704 records the detected pulse light in video, which is then transmitted to the location processor 104. The location processor 104 analyzes the video to determine an identifier from the pulsed light pattern. The location processor 104 also determines a reference location of the moveable object 102 by determining where in a video image the pulsed light is located.

For example, the field of view of the camera 704 corresponds to known locations in the indoor area. The field of view is associated with a coordinate system that corresponds directly to reference locations. The location processor 104 determines where the pulsed light is located in the field of view then cross-references the corresponding coordinates to a reference location within the indoor area. The location processor 104 then uses the pulse light pattern to identify the moveable object 102. The location processor 104 subsequently designates this location as the reference location of the moveable object 102.

In embodiments where the indoor area includes multiple cameras 704 that have overlapping fields of view, the location processor 104 resolves multiple determined locations into a single reference location. In these examples, the cameras 704 may be communicably coupled to the location processor 104 via any wired or wireless communication medium. Additionally, it should be appreciated that the camera 704 can record movement of the moveable object 102 as long as the moveable object 102 is within a field of view of the camera 704 and has a line of sight to the pulse emitter 702. In these instances, the location processor 104 may only use dead-reckoning signals when the moveable object 102 is out of view of the cameras 704. Thus, the cameras 704, in some instances, may provide more precise location accuracy than the systems described in conjunction with FIGS. 3 and 6.

Position Sensing Apparatus

Figure 8:
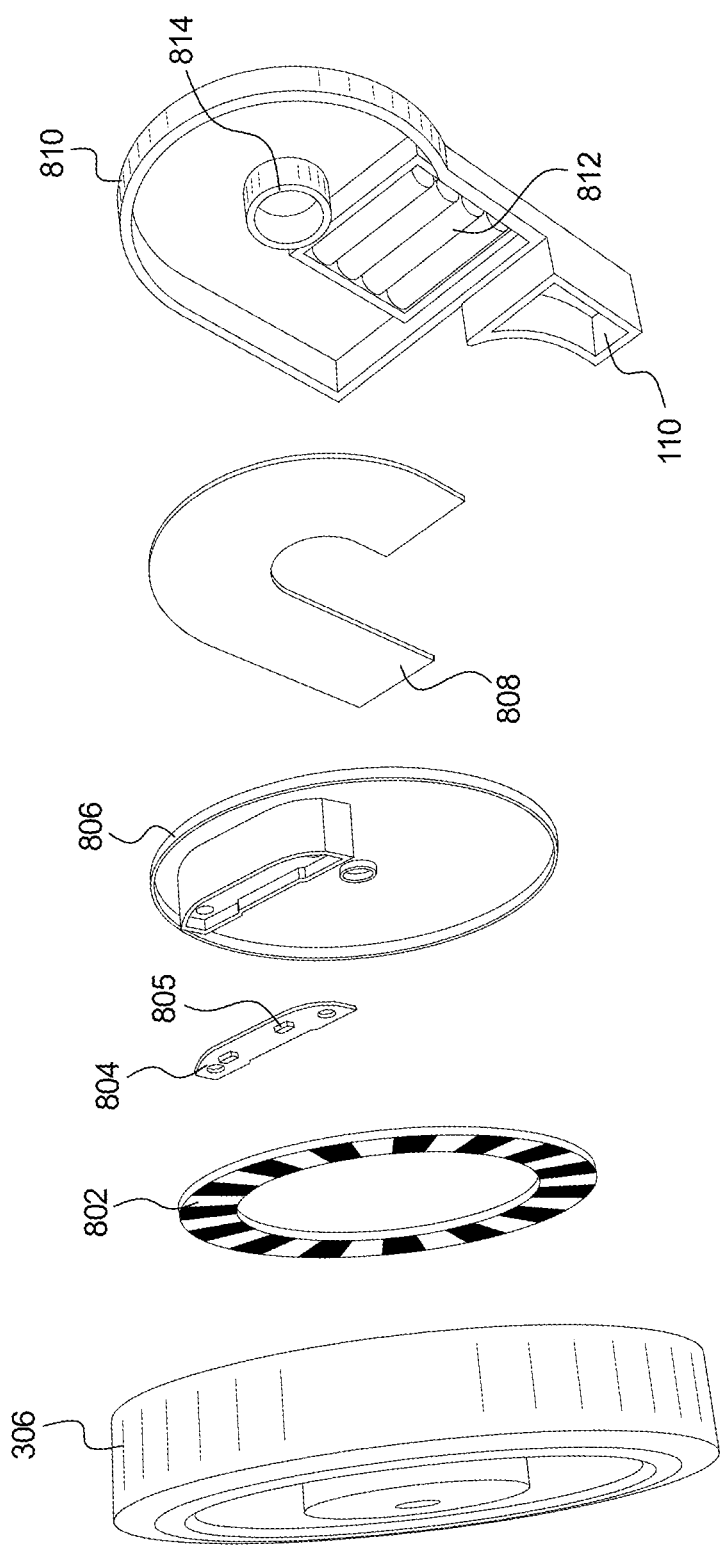
FIG. 8 is an exploded perspective view of a position sensing apparatus attachable to a moveable object including a rotary encoder and an absolute position sensor.

FIG. 8 shows one embodiment of the position sensing apparatus 302 of FIGS. 3, 6, and 7. In this embodiment, the position sensing apparatus 302 is configured (i.e., sized and shaped) to fit around the wheel 306 of the moveable object 102 to detect rotation of the wheel 306. It should be appreciated that the position sensing apparatus 302 can be configured differently in other embodiments to attach to differently shaped parts of the moveable object 102. Additionally, the position sensing apparatus 302 can include additional or fewer components based on a type of the absolute position system 116 or a type of the dead-reckoning sensor 108 used in the indoor navigation system 100.

The position sensing apparatus 302 includes a code wheel 802 and encoder circuitry 804 coupled to a first cover 806. The code wheel 802 and encoder circuitry 804 comprise the dead-reckoning sensor 108 of FIG. 1. The code wheel 802 and the encoder circuitry 804 implement what is commonly known as a quadrature encoder. The code wheel 802 is attached to the wheel 306 so that it rotates at a same speed and direction as the wheel 306 rotates. The first cover 806 secures the encoder circuitry 804 in close proximity to the code wheel 802, which is attached to the 306. The first cover 806 does not prevent the wheel 306 or the attached code wheel 802 from freely rotating. The first cover 806 enables the encoder circuitry 804 to detect rotation of the wheel 306 as the code wheel 802 rotates in proximity to the dead-reckoning sensors 805.

Figure 9:
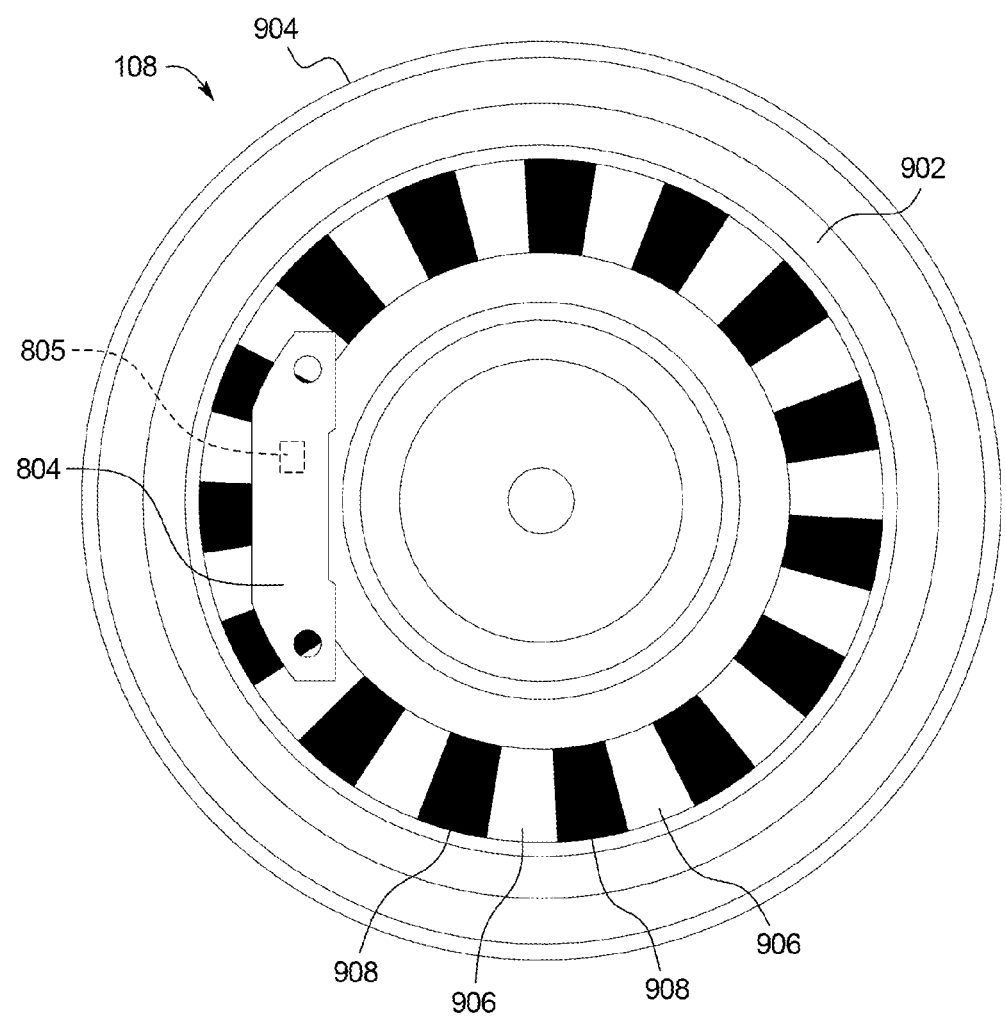
FIG. 9 is a front perspective view of the rotary encoder of FIG. 8.

FIG. 9 shows the code wheel 802 attached to the wheel 306 to form a rotary encoder. This type of encoder accurately detects forward or reverse rotation of the wheel 306. In this embodiment, the code wheel 802 fits within or is attached to a wheel hub 902 of the wheel 306. The wheel hub 902 connects the wheel 306 to a leg or appendage of the moveable object 102. The wheel hub 902 also functions as a rim for a wheel tread 904. The wheel tread 904 and the wheel hub 902 can be formed from any suitable material such as a rubber, a plastic, a composite material, and a metal, or suitable combinations thereof. The wheel tread 904 makes contact with a floor of an indoor area and provides traction to move the moveable object 102.

The code wheel 802 includes one or more reflective light sections 906 and one or more non-reflective light sections 908. The sections 906 and 908 are alternatively spaced so that sensors 805 located on the encoder circuitry 804 can detect transitions between the differently colored sections 906 and 908. While the sections 906 and 908 are shown as being somewhat rectangular in shape, it should be appreciated that the sections 906 and 908 could include different shapes (such as squares or triangles).

In this illustrated embodiment, the sensor 805 includes a stationary photodiode that detects whether light reflects off of the reflective light section 906 or whether light is absorbed by the non-reflective light section 908. The sensor 805 also includes a light source (such as an infrared LED). The sensor 805 detects rotation of the code wheel 802 when it either detects it has stopped receiving reflected light (indicating a transition to the non-reflective section 908) or detects it has begun receiving reflected light (indicating a transition to the reflective section 906). The timing between transitions indicates how quickly the code wheel 802 is rotating. The mechanism used to detect the differently attributed sections 906 and 908 of the code wheel 802 is often known as an optical quadrature encoder based on its use of reflective light and lack of any need to make physical contact between the sensors 805 and the code wheel 802.

In this illustrated embodiment, the encoder circuitry 804 includes the two sensors 805. The dual sensors enable a rotation direction to be determined. For example, the sensors 805 are spaced apart so that they align with different portions of the sections 906 and 908. Each direction of rotation can be determined based on a timing of transitions detected by each of the sensors 805.

In another embodiment, the sections 906 include electrically conductive material, the sections 908 include electrically non-conductive material, and the sensors 805 of the encoder circuitry 804 include resistive switches. In this embodiment, the code wheel 802 includes a printed circuit board ("PCB"). The sections 906 can be comprised of tin, copper, or gold coated on the PCB, and the sections 908 include non-coated sections of the PCB. The resistive switches include at least two or more thin metal contact electrodes that press against the code wheel 802 with sufficient pressure to contact the sections 906 and 908. This embodiment is commonly known as a mechanical encoder based on the physical contact made between the electrodes and the surface of the code wheel 802.

In other embodiments, the code wheel 802 and the encoder circuitry 804 can be replaced with force sensors. In these embodiments, accelerometers, inertial sensors, magnetometers, detect movement of the moveable object 102 without having to detect a rotation of the wheel 306. These sensors can include MEMS-based sensors controlled by application specific integrated circuits (ASICs) or microprocessors.

Returning to FIG. 8, in addition to the code wheel 802, the position sensing apparatus 302 includes a tab 814 to attach or connect the position sensing apparatus 302 to the wheel 306. The tab 814 is sized and shaped to engage the wheel hub 902 of FIG. 9. In other embodiments the tab 814 can be sized and shaped differently to engage other parts of the wheel 306. Alternatively, the tab 814 can be sized and shaped to engage or attach the position sensing apparatus 302 to other portions of the moveable object 102.

The position sensing apparatus 302 also includes processing circuitry 808 to decode signals generated by the sensors 805 and decode signals generated by the absolute position sensor 110. The processing circuitry 808 is housed between the first cover 806 and the second cover 810. The processing circuitry 808 receives power from a power supply 812 (such as one or more batteries) that is integrated with the second cover 810. Additionally, in this embodiment, the absolute position sensor 110 is integrated with or attached to the second cover 810. In instances where the absolute position transmitter 114 is attached to the moveable object 102, the absolute position transmitter 114 may be integrated with or attached to the second cover 810.

Figure 10:
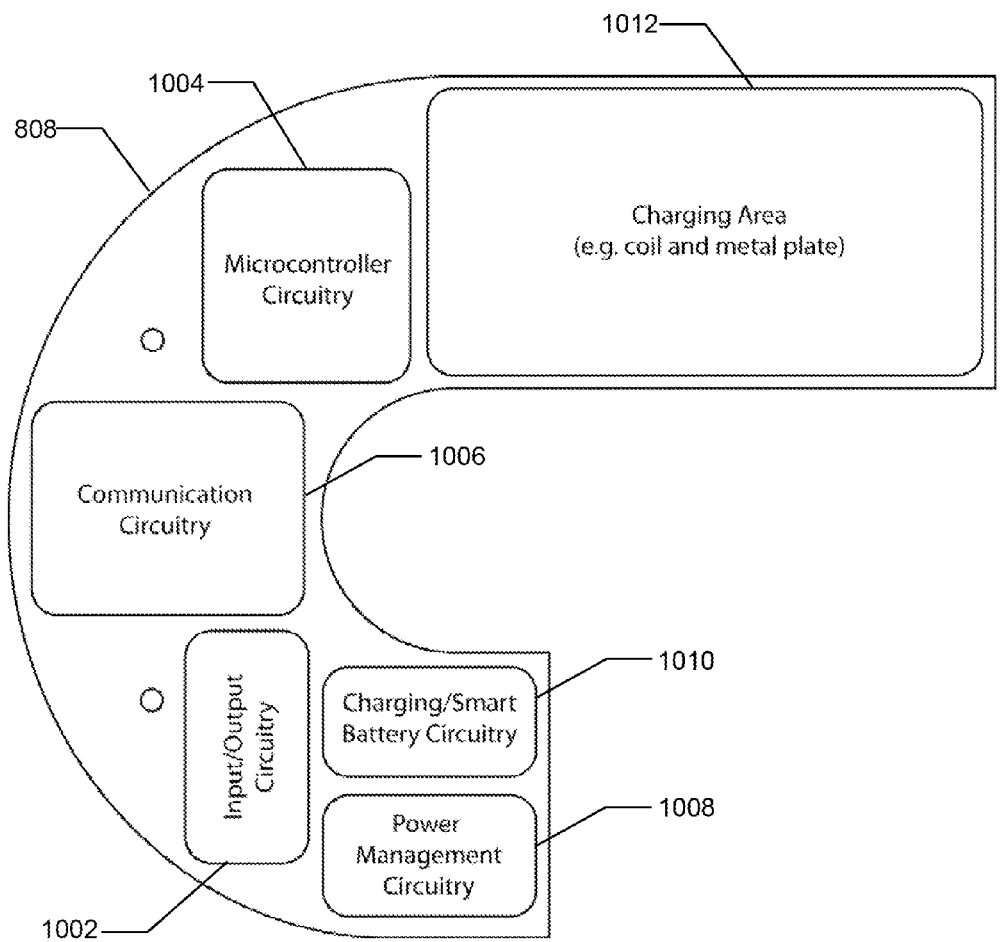
FIG. 10 is a schematic diagram of circuitry components of the position sensing apparatus of FIG. 8.

FIG. 10 generally shows a schematic of different circuitry components of the processing circuitry 808. The processing circuitry 808 includes input/output circuitry 1002, microcontroller circuitry 1004, and communication circuitry 1006 to receive outputs from the sensors 805 and the absolute position sensors 110, process the outputs into dead-reckoning and absolute positioning signals, and transmit the signals to the location processor 104. More specifically, the input/output circuitry 1002 routes output signals from the sensors 805 and output signals from the absolute position sensor 110 to the microcontroller circuitry 1004. The input/output circuitry 1002 also routes dead-reckoning and absolute positioning signals from the microcontroller circuitry 1004 to the communication circuitry 1006. The input/output circuitry 1002 may include one or more suitable buffers or filters to remove noise from the received signals.

The communication circuitry 1006 transmits dead-reckoning and absolute positioning signals to the location processor 104 via any wired or wireless medium and protocol. The communication circuitry 1006 may also transmit diagnostic or status information regarding the sensors 108 and 110. The communication circuitry 1006 may also receive information from the location processor 104 to calibrate or configure the sensors 108 and 110.

The microcontroller circuitry 1004 uses signals (such as quadrature outputs from the sensors 805) to determine a movement of the moveable object 102, which is included in a dead-reckoning signal. The microcontroller circuitry 1004 also uses signals from the absolute position sensor 110 to determine an identifier of an absolute position transmitter, which is included in an absolute positioning signal. In other embodiments, the microcontroller circuitry 1004 transforms outputs from the absolute position sensor 110 into a format for transmission to the location processor 104 as an absolute positioning signal. In these embodiments, the location processor 104 determines the identifier detected by the absolute position sensor 110. The microcontroller circuitry 1004 may also de-bounce signals from the dead-reckoning sensor 108 in instances where resistive switches are used.

In various embodiments, the microcontroller circuitry 1004 transforms signals received from the rotary encoder dead-reckoning sensor 108 into a dead-reckoning signal that specifies the rotation of the wheel 306 as a number of 'ticks' in a forward or reverse direction (such as +1 tick to indicate the wheel 306 rotated by one transition of the sections 906 and 908 or −5 ticks to indicate the wheel 306 rotated in reverse by five transitions of the sections 906 and 908). In these embodiments, the microcontroller circuitry 1004 counts a number of transitions reported by the sensors 805 in some time period. The location processor 104 receives the dead-reckoning signals and uses the direction and number of 'ticks' to calculate a movement of the moveable object.

In these embodiments, a first dead-reckoning sensor 108 is attached to a left rear wheel and a second dead-reckoning sensor 108 is attached to a right rear wheel of the moveable object 102. The location processor 104 uses dead-reckoning signals from the sensors 108 to calculate a change in position and orientation of the moveable object 102 using equations 1 to 3 below. In these equations, Δx is a change in a left-to-right position of the moveable object 102 and Δy is a change in a forward-to-back position of the moveable object 102. Also, r is a radius of the wheel 306, $\Delta w_l$ is a movement of the left wheel represented as a number of 'ticks,' and $\Delta w_r$ is a movement the right wheel represented as a number of 'ticks.' Additionally, α is a current orientation (an angle relative to the x and y axes) of the moveable object 102, T is a number of 'ticks' (or sections 906 and 908) in the code wheel 802, and d is a distance between the left and right wheels.

$$\Delta x = r*(\Delta w_l + \Delta w_r)*\cos(\alpha)*\frac{\pi}{T} \quad (1)$$

$$\Delta y = r*(\Delta w_l + \Delta w_r)*\sin(\alpha)*\frac{\pi}{T} \quad (2)$$

$$\alpha = \frac{2*\pi*r*\frac{(w_r - w_l)}{T}}{d} \quad (3)$$

Returning to FIG. 10, the processing circuitry 808 includes circuitry 1008 1010, and 1012 to manage power consumption and charging of the power supply 812. The power management circuitry 1008 manages power consumption of the position sensing apparatus 302. The power management circuitry 1008 may detect (through monitoring of communication circuitry 1006) that the moveable object 102 is not in use and that power to the encoder circuitry 804 and other portions of the position sensing apparatus 302 can be disabled. In this example, the power management circuitry 1008 provides power to the encoder circuitry 804 when the communication circuitry 1006 infers the moveable object 102 is being used. In some instances, the communication circuitry 1006 infers the moveable object 102 is being used based on messages indicating that a user is using the user device 106.

The battery circuitry 1010 includes components for measuring a power level of the power supply 812. The battery circuitry 1010 may also monitor charging of the power supply 812 to ensure the power supply 812 is not overcharged and damaged. For example, the battery circuitry 1010 disconnects the power supply 812 from the charging area 1012 (such as an induction coil for induction charging) when the power supply 812 is fully charged. The battery circuitry 1010 may also include components for transforming alternating current signals from wireless charging into a direct current to charge the power supply 812.

Figure 11:
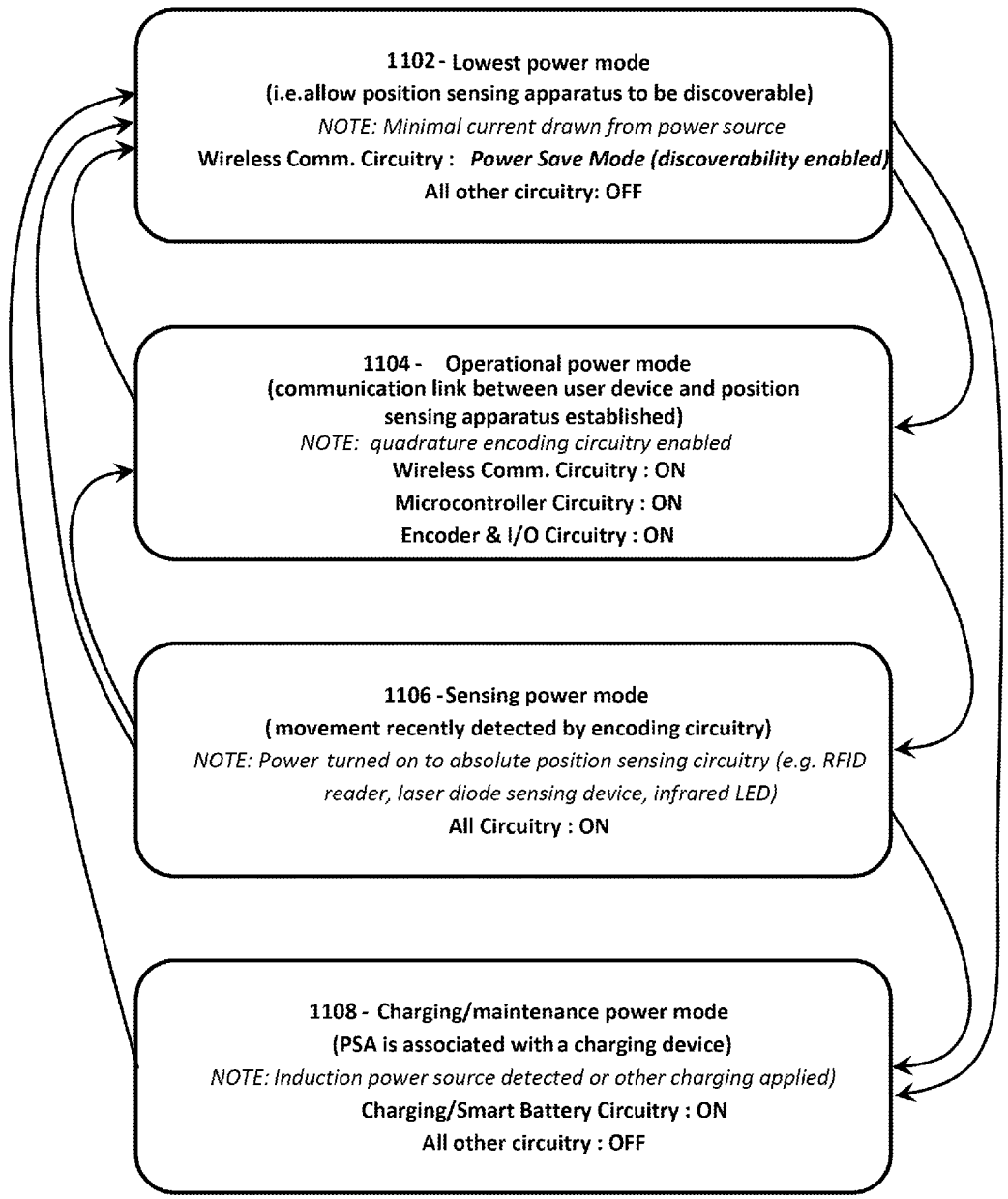
FIG. 11 is a state diagram of different power states of the position sensing apparatus of FIGS. 8 to 10.

FIG. 11 generally shows a diagram of various power states 1102, 1104, 1106, and 1108 managed by the power management circuitry 1008 of FIG. 10. The power states 1102 to 1108 correspond to different power consumption levels of the position sensing apparatus 302. In other embodiments, the circuitry 1008 may include additional or fewer power states.

The position sensing apparatus 302 is typically only in a single power state at any given time. The arrows shown in FIG. 11 indicate transitions that the position sensing apparatus 302 will execute, via the power management circuitry 1008, to move between power states. The benefit of managing power consumption of the position sensing apparatus 302 is to keep the apparatus in the lowest possible power (consumption) state at all times, while preserving the desired functionality of the apparatus 302. This ensures any internal power source remains viable for as long as possible without requiring recharging or replacement.

In this embodiment, the power state 1102 represents a lowest power mode of the position sensing apparatus 302. In this power state 1102, the moveable object 102 is not being actively used. For example, in the case of a shopping cart, the moveable object 102 may be sitting in an outdoor parking lot with no customers attempting to interact with it via the user device 106. However, there is still a minimal amount of power flowing to limited circuitry in the position sensing apparatus 302 such that logic can execute to detect if a customer does begin an interaction with the moveable object 102. The position sensing apparatus 302 then transitions to a different power state. In such an example, this start of interaction can be detected when the customer causes the user device 106 to power up and connect wirelessly with the position sensing apparatus 302 (such as by starting a particular "App" on the user device 106).

The power state 1104 represents a power mode where a user has indicated a desire to interact with the user device 106 or the moveable object 102 and make use of its location-aware functionality. Even in this state 1104 there is no need to power all circuitry or sensors within the position sensing apparatus 302. Specifically, even if the user has initiated interaction with the moveable object 102, they may not actually be moving the object. In this mode, dead-reckoning related circuitry is powered on to enable the dead-reckoning sensors 108 to detect movement. However, circuitry related to absolute position sensing (such as the absolute positioning sensors 110) can remain powered off. Without movement, it is unnecessary for the location processor 104 to determine a reference location of the movable object 102, hence making it wasteful to have such absolute position sensing circuitry powered. Again, keeping such peripheral circuitry turned off will reduce the power consumed in this state 1104, enabling any contained power source to remain viable for a longer period of time.

The power state 1106 corresponds to a power consumption mode where all circuitry is powered and operational. Of all modes described in conjunction with FIG. 11, this mode will typically consume the greatest amount of power. As such, dead-reckoning related circuitry will continue to be monitored to determine if any movement is detected and, if no movement occurs for some predetermined amount of time, the position sensing apparatus 302 will transition back to state 1104.

The power state 1108 corresponds to a power mode where the power supply 812 is being charged. In this power mode, the battery circuitry 1010 detects a power source is being applied to the charging area 1012. As a result, the power management circuitry 1008 disables the functionality of the processing circuitry 808 except for the charging circuitry 1010.

Power Source for the Position Sensing Apparatus

Figure 12:
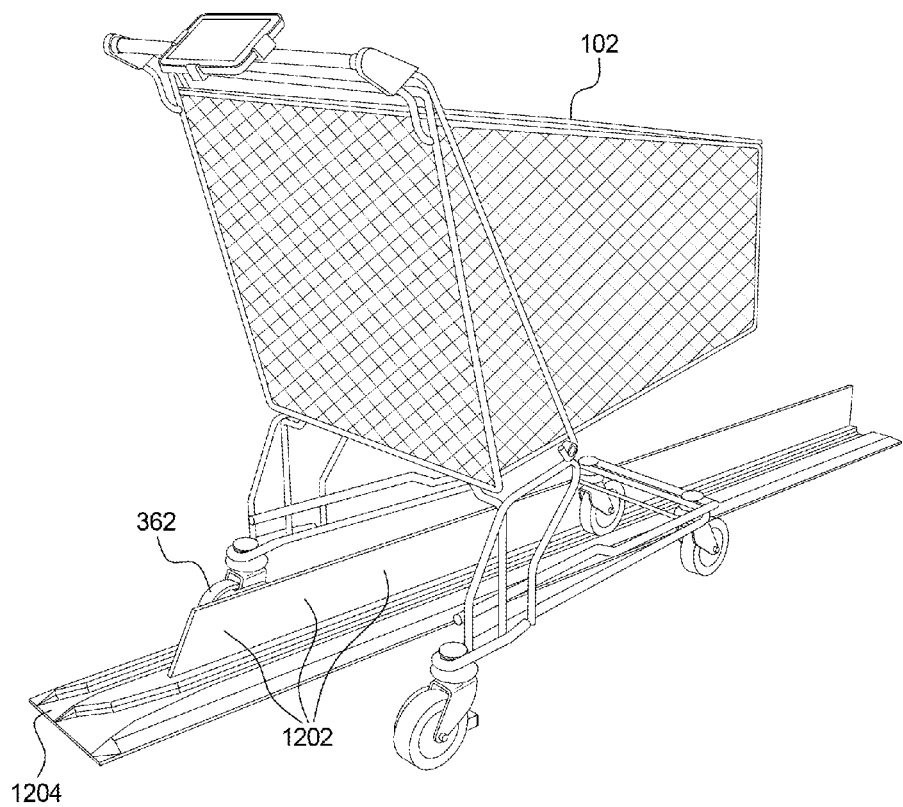
FIG. 12 is a diagrammatic view showing the position sensing apparatus of FIGS. 8 to 10 being charged in an induction power charging track.

FIG. 12 generally shows the power supply 812 of the position sensing apparatus 302 being charged by a power source 1202. In this embodiment, the power source 1202 includes charged induction coils that are aligned with the charging area 1012 to wirelessly charge the power supply 812 of the position sensing apparatus 302. In this embodiment, the power source 1202 includes a track 1204 that aligns the position sensing apparatus 302 with the charged coils. The power source 1202 is configured to charge multiple stacked moveable objects 102. The power source 1202 may be connected to an alternating current supply (such as an electrical outlet) or a direct current supply (such as a battery) to provide power to the embedded coils.

In other embodiments, the power source 1202 includes a direct wired connection to the power supply 812 (such as an electrical plug). In other embodiments, the power supply 812 is removed from the position sensing apparatus 302 and charged at a charging station or replaced. In other embodiments the power supply 812 is charged using force transducers, light sensors, or regenerative actuators.

User Device Embodiments

Figure 13:
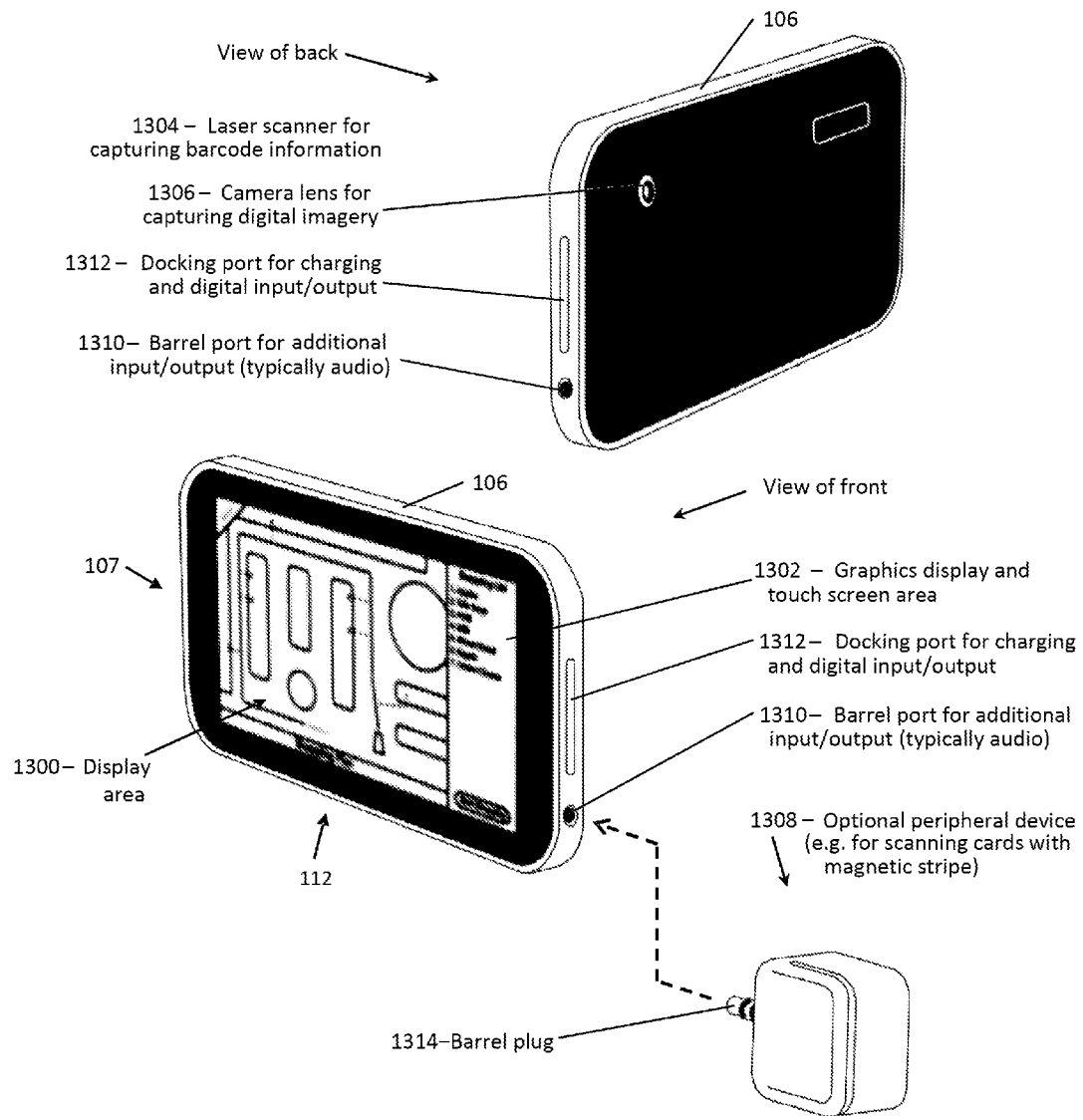
FIG. 13 are perspective views of a user device including a display device and an input device configured to display a current location of the moveable object of FIG. 1.

Turning now to FIG. 13, after the location processor 104 has determined a location of the moveable object 102 based on dead-reckoning signals and absolute positioning signals received from the position sensing apparatus 302, the location processor transmits messages indicative of the current location of the moveable object to the user device 106. The display device 107 included within the user device 106 displays the current location in a display area 1300 in conjunction with any two-dimensional or three dimensional graphical representations of an indoor area or product information. As mentioned above, the user device 106 could include a tablet computer configured to operate with the indoor navigation system 100 for use with the moveable object 102. As also mentioned above, in other embodiments, the user device 106 could include a smartphone or other portable computing device. Further, it should be appreciated that the user device 106 can be coupled or attached to the moveable object 102 via a bracket or other secure coupling device. In various embodiments, the user device 106 can be owned by a user and operate an application that works in conjunction with the indoor navigation system 100.

In certain embodiments where the location processor 104 is separate from the user device 106, the user device 106 functions as a router between the location processor 104 and the absolute sensing apparatus 302. In these embodiments, the user device 106 receives dead-reckoning and absolute positioning signals from the absolute sensing apparatus 302 via any wired or wireless communication medium and transmits these signals to the location processor 104. In these examples, the user device 106 may have a longer transmission range than the absolute sensing apparatus 302 to reach the remote location processor 104.

In one example implementation, the user device 106 includes a smartphone containing Bluetooth 4.0 wireless communication functionality and the communication circuitry 1006 of the absolute sensing apparatus 302 includes Bluetooth Low Energy (BLE) functionality. The absolute sensing apparatus 302 transmits dead-reckoning signals and absolute positioning signals to the user device 106 via Bluetooth packets. The user device 106 receives the packets and transforms the signals into a Wi-Fi format for wireless transmission to the location processor 104.

The user device 106 includes four input devices 112: (1) a touchscreen 1302, (2) a laser scanner 1304, (3) a camera 1306, and (4) a peripheral device 1308. In other embodiments, the user device 106 includes additional or fewer input devices 112 (such as a keyboard, a trackball, a mouse, a motion sensor). Additionally, in other embodiments, the user device 106 may be communicatively coupled to the input devices 112.

Figure 14:
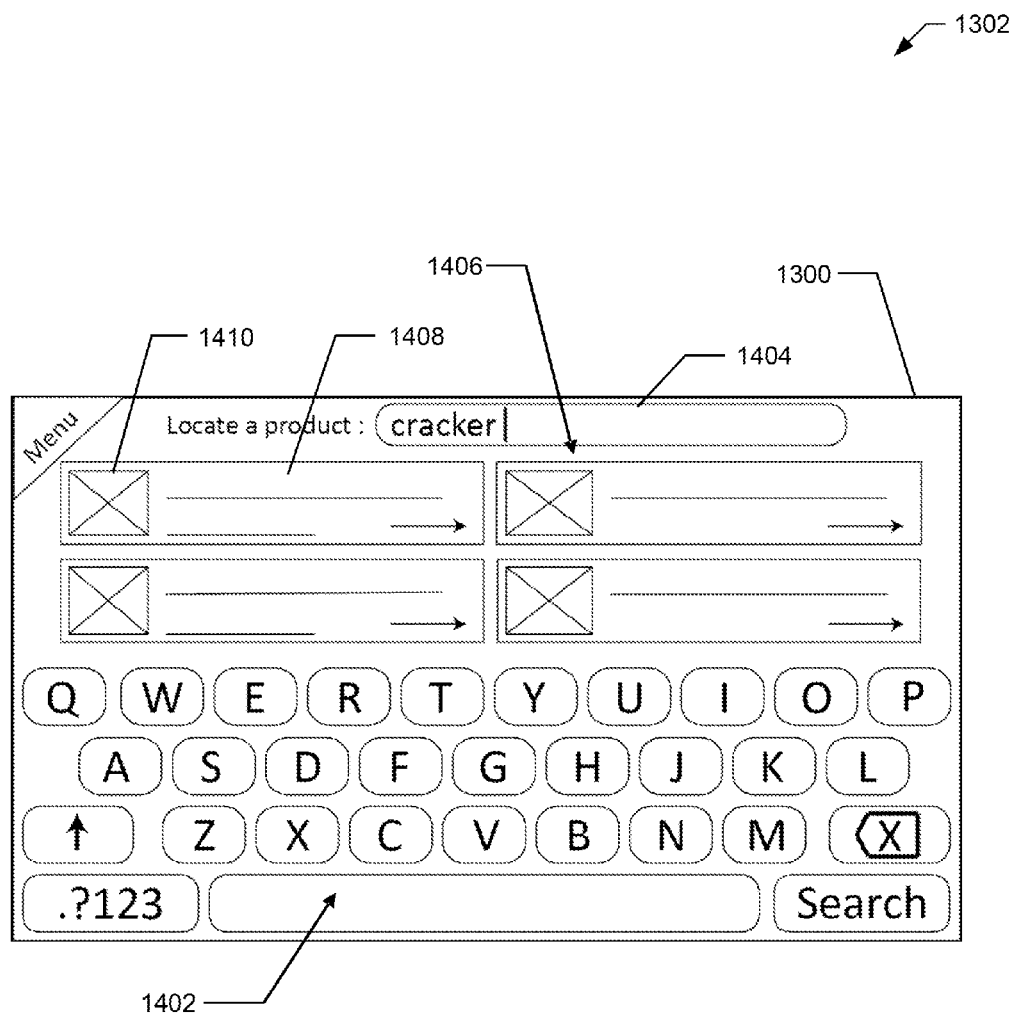
FIGS. 14, 15 and 16 are schematic diagrams of example functions performed by or provided by the user device including the display device and the input device of FIG. 13.

The touchscreen 1302 receives inputs by a user contacting a portion of a screen of the display device 107. FIG. 14 shows the touchscreen 1302 enabling a user to enter text by contacting portions of the screen that correspond to keys of a virtual keyboard 1402 displayed in the display area 1300 by the display device 107. In this embodiment, the touchscreen 1302 also includes a partitioned search box 1404 that enables a user to use the virtual keyboard 1402 to enter product search terms, which are displayed in a search results grid 1406. Each area in the grid 1406 includes a product name 1408 and a product photo 1410 that is selectable by a user via the touchscreen 1302 to view more information about the selected product.

Returning to FIG. 13, the laser scanner 1304 transmits laser light that is sensed as it reflects off of barcodes. The laser scanner is used by a user to scan barcodes causing the display device 107 to add the product to a running list of products to be purchased by the user or display product information (such as nutritional information, recipes that incorporate the product, a location of the product in an indoor area, a history of the product, or packaging of the product) associated with the scanned code. The user device 106 or the location processor 104 references the scanned code to the appropriate product or information stored in the application database 130 of FIG. 1.

The camera 1306 records images and sends these images to the user device 106 or the location processor 104. The user device 106 or the location processor 104 processes the information to identify information (such as Quick response (QR) codes or text). The user device 106 or location processor 104 then references the identified information to corresponding displayable information. In instances where the location processor 104 processes the images, the location processor 104 sends the displayable image to the user device 106. The display device 107 then displays the appropriate product information in the display area 1300.

In certain embodiments, the scanner 1304 or the camera 1306 may scan or record codes or images of products in proximity of the moveable object 102. In these embodiments, the user device 106 uses the scanned or recorded information to determine a corresponding advertisement or coupon to display in the display area 1300. In another embodiment, the user device 106 uses the scanned or recorded information to display types of products in proximity to the moveable object 102.

Figure 15:

FIG. 15 shows an example implementation using the scanner 1304 or camera 1306. In this embodiment, the display area 1300 of the display device 107 displays a product search menu 1502 that enables a user to search for a product by selecting a first area 1504 or a second area 1506 on the touchscreen 1302. If the user selects the first area 1504, the display device 107 displays the onscreen keyboard 1402 of FIG. 14 to enable a user to type a name of a product or an associated keyword into the search box 1404. If the user selects the second area 1506, the user device 106 activates the scanner 1304 or the camera 1306. A user then uses the scanner 1304 or the camera 1306 to scan or record a bar code 1508 or a product name 1510 of a coupon 1512, which is then used to display the location of associated product(s).

Figure 16:
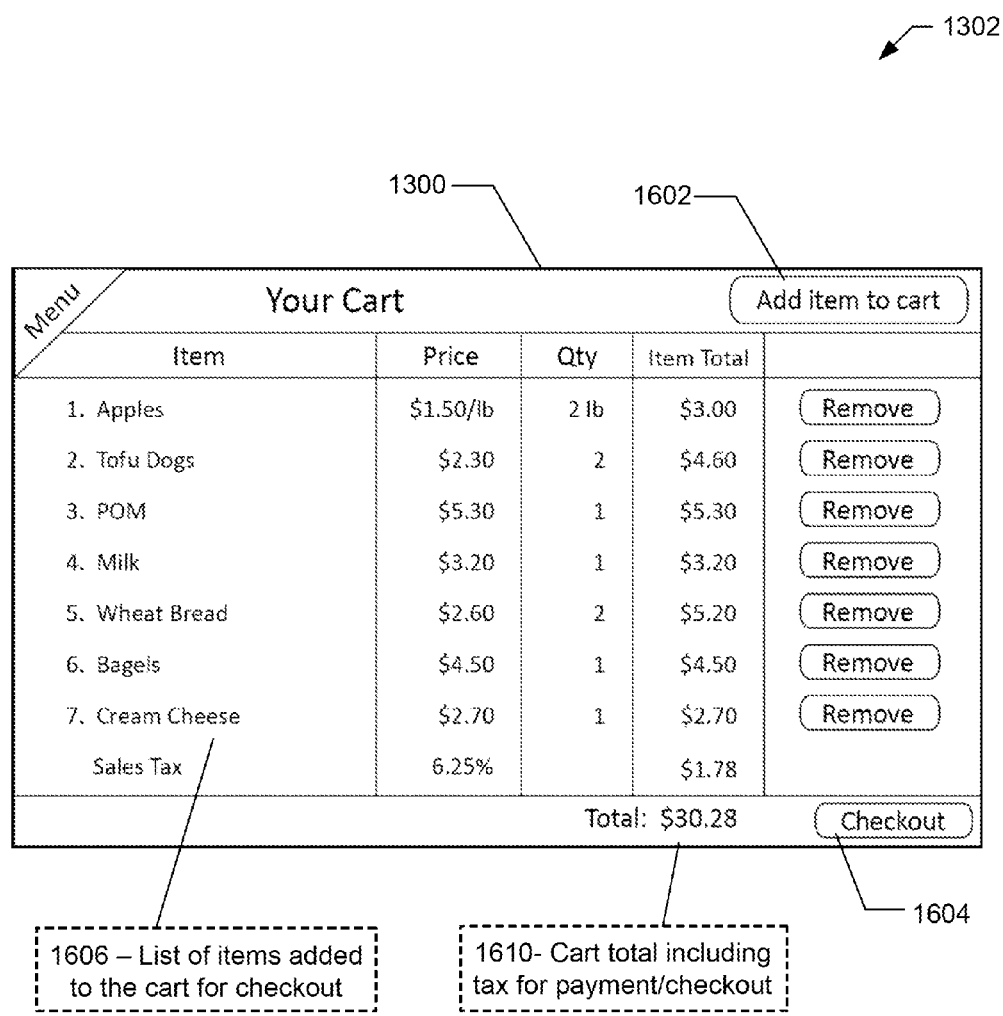

FIG. 16 shows another example implementation using the scanner 1304 or the camera 1306. In this embodiment, the display area 1300 displays a list 1606 of items that a user has placed into the moveable object 102. A user can select area 1602 of the touchscreen 1302 to type names of items added to the moveable object 102. A user can also select the area 1602 to activate the camera 1306 or the scanner 1304 to record an image of an item or its related barcode before the item is placed into the moveable object 102, which is processed by the user device 106 and added for display on the list shown in FIG. 16. Alternatively, the camera 1306 or the scanner 1304 may scan or record a bar code or other product identifier of a coupon or item that corresponds to an item placed in the moveable object 102 to locate the item on the list. Such items may also be easily removed from the list by a user touching associated remove areas of the touchscreen 1302 and removing the items from the moveable object 102 so they are not included in a purchase.

The embodiment of FIG. 16 also includes an area 1604 of the touchscreen 1302 that a user can select to pay for the listed items. An area 1610 of the touchscreen 1302 shows a total amount of the items in the list 1606. The scanner 1304, camera 1306, or peripheral device 1308 can process a payment by scanning or recording a credit card, check, or membership card. In other embodiments, the user device 106 may transmit the list to a check-out register or cashier after a user selects the area 1604.

Returning to FIG. 13, the peripheral device 1308 attaches to a 1310 port of the user device 106. The peripheral device 1308 includes a magnetic reader for reading magnetic strips on credit cards, membership rewards cards, or product packaging. The peripheral device 1308 could also include an RFID reader for reading RFID tags on products or RFID tags in the absolute position system 116. Alternatively, the peripheral device 1308 could include the absolute position transmitter 114 to transmit a unique identifier by transmitting pulsed infrared light via an LED included within the peripheral device 1308, which is detected by absolute position sensors 110 in an indoor area (such the camera 704 of FIG. 7).

The example user device 106 of FIG. 13 also includes a docking port 1312. The docking port 1312 may be connected to a power supply to periodically charge the user device 106. The docking port 1312 may also be connected to a processor (such as the location processor 104) to receive updated indoor area information (such as maps, product information, etc.). The docking port 1312 may also be used to communicatively couple the user device 106 to devices such as those described above including, for example, the position sensing apparatus 302.

Figure 17:
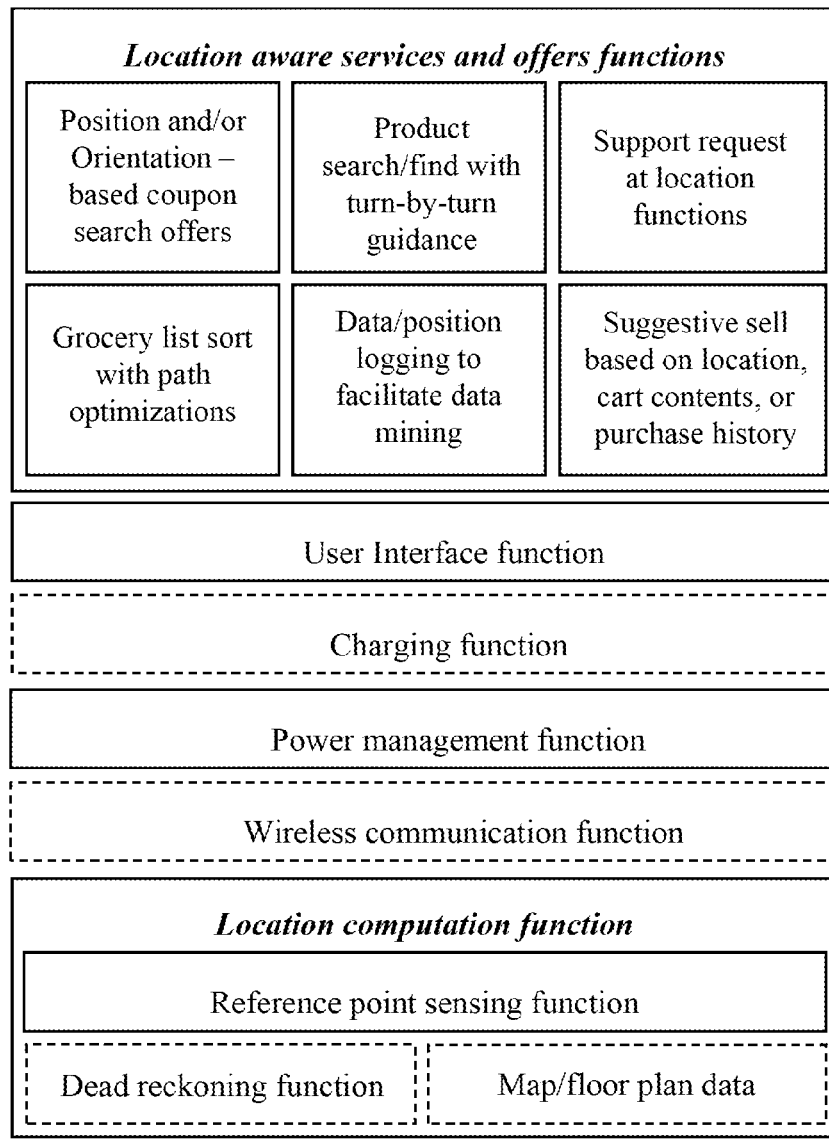
FIG. 17 is a functional schematic diagram of various example functions that can be performed by or provided by the user device including the display device and the input device of FIG. 13.

FIG. 17 shows a summary of various example functions that indoor navigation system 100 of FIG. 1 can perform in conjunction with the user device 106 of FIG. 13 by knowing a location of the moveable object 102. Many of these example functions have been described above such as calculating a location of the moveable object 102 based on dead-reckoning and absolute positioning signals, displaying coupons or advertisements based on the moveable object 102 being in proximity to certain products, and searching for locations of products in an indoor area. Additionally, the user device 106 may use a location of the moveable object 102 to provide turn-by-turn directions to find a requested product or to travel an optimized path based on locations of products specified in a grocery list.

The user device 106 can log where the moveable object 102 has traveled and which products were selected. This logged data can be used by advertisers, product marketers, or other third parties to determine how consumers shop or move in an indoor area. Additionally, the user device 106 can use this logged data to provide product suggestions based on purchase history.

The user device 106 further includes a support request function. This function may request personnel in an indoor area to travel to the moveable object 102. The personnel can use the current location of the moveable object 102 to locate the moveable object, thereby enabling the user to continue moving the moveable object 102 to continue shopping. In other embodiments, the support request function can cause the display device 107 to display locations of personnel able to assist a user where such locations may be updated based on tracked movable object(s) 102 that are associated with or being used by such personnel.

Figure 18:
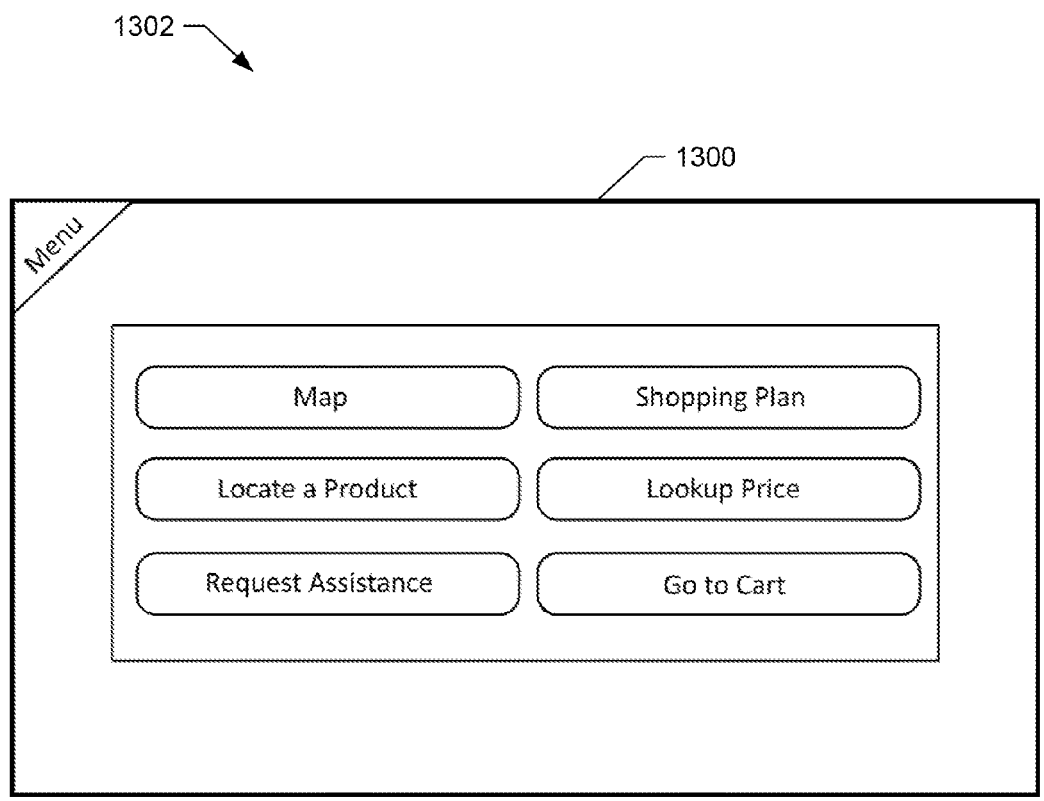
FIG. 18 is a schematic diagram of an example menu of operations capable of being performed by or provided by the user device including the display device and the input device of FIG. 13.

FIG. 18 shows the display area 1300 of the display device 107 displaying some of the functions described in conjunction with FIG. 17 as selectable options. Each area corresponds to a portion of the touchscreen 1302 that causes the display device 107 to display functionality associated with a selected area. For example, a user can select the Map area of the display area 1300 to view a current location of the moveable object 102 in a graphical representation of an indoor area. In another example, a user can select the Locate a Product area of the display area 1300 to view the product search onscreen keyboard 1402 described in conjunction with FIG. 14 or select the Shopping Plan area to view a shopping list with a recommended planned route.

Figure 19:
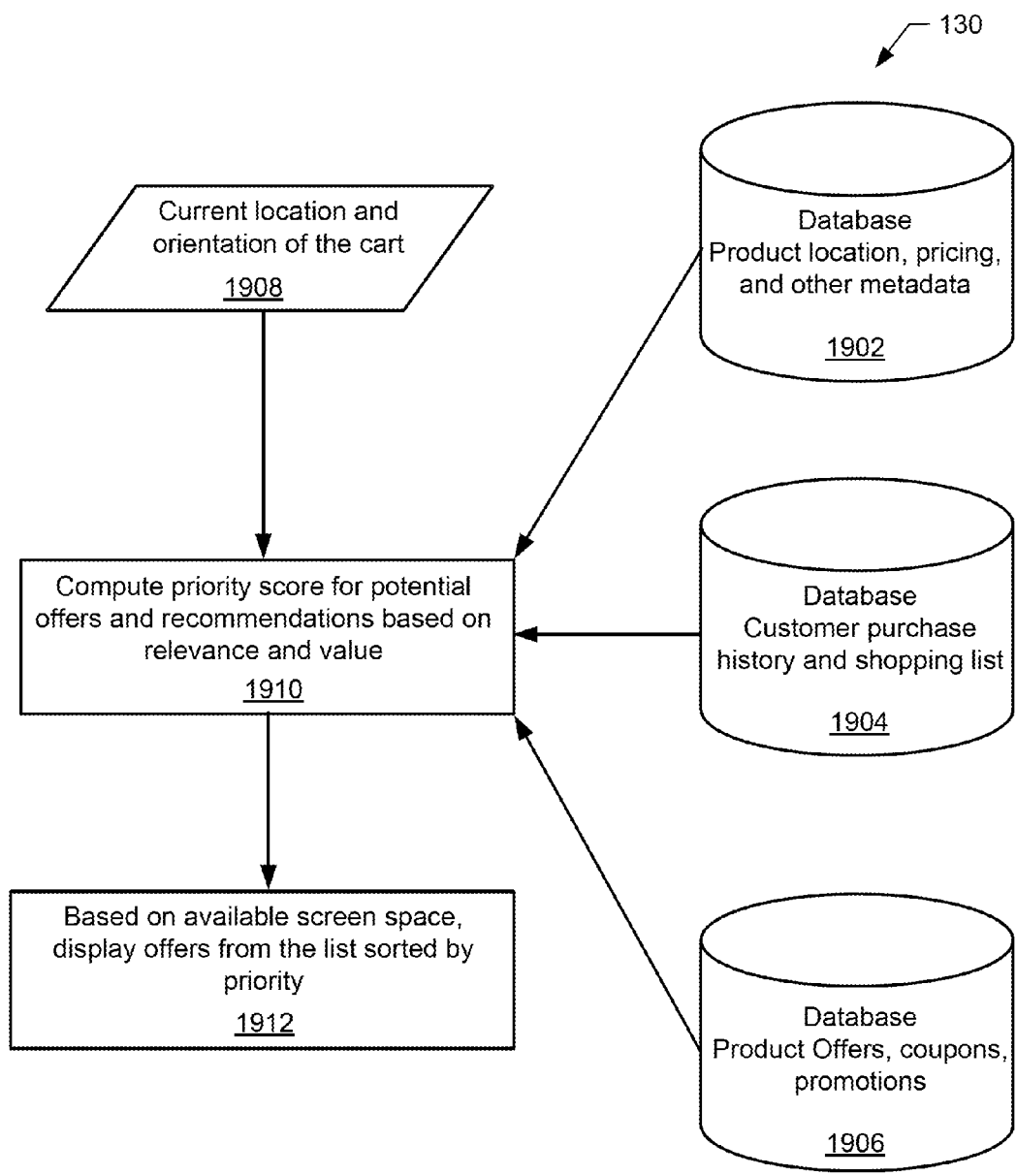
FIG. 19 is a functional schematic diagram of information that is used in conjunction with a current location of a moveable object and displayed via the display device of the user device of FIG. 13.

FIG. 19 generally shows a functional schematic diagram of application data used in conjunction with a location of the moveable object 102 by the user device 106 or the application processor 124 of FIG. 1. These databases 1902, 1904, and 1906 may alternatively be implemented on the user device 106 and be periodically updated via the location processor 104 or a remote server. In this embodiment, the application database 130 includes databases 1902, 1904, and 1906 containing different application information. The database 1902 includes product location and pricing information, the database 1904 includes consumer purchase history and shopping lists, and the database 1906 includes information regarding product offers, coupons, and promotions.

In an example implementation, the location processor 104 determines a current location of the moveable object and transmits a message that specifies this location as indicated by block 1908. The user device 106 or the application processor 124 uses the location combined with input from the databases 1902 to 1906 to calculate priority scores for potential offers (such as discount coupons, product promotions, suggestive sells) and selects offers with the highest scores as indicated by block 1910. The user device 106 then determines which offers to display or a sequence in which to display the offers in the display area 1300 of the display device 107 as indicated by block 1912.

In an example of FIG. 19, the moveable object 102 is at a location in an indoor area and facing or oriented to face a particular product at that location (as determined using database 1902), which is a product that has been purchased by the customer in the past (as indicated by database 1904). In this instance, the location processor 104 calculates a relatively high priority score for advertising or an available offer related to that product, if such an offer exists in database 1906. The display device 107 then displays the offer.

Figure 20:
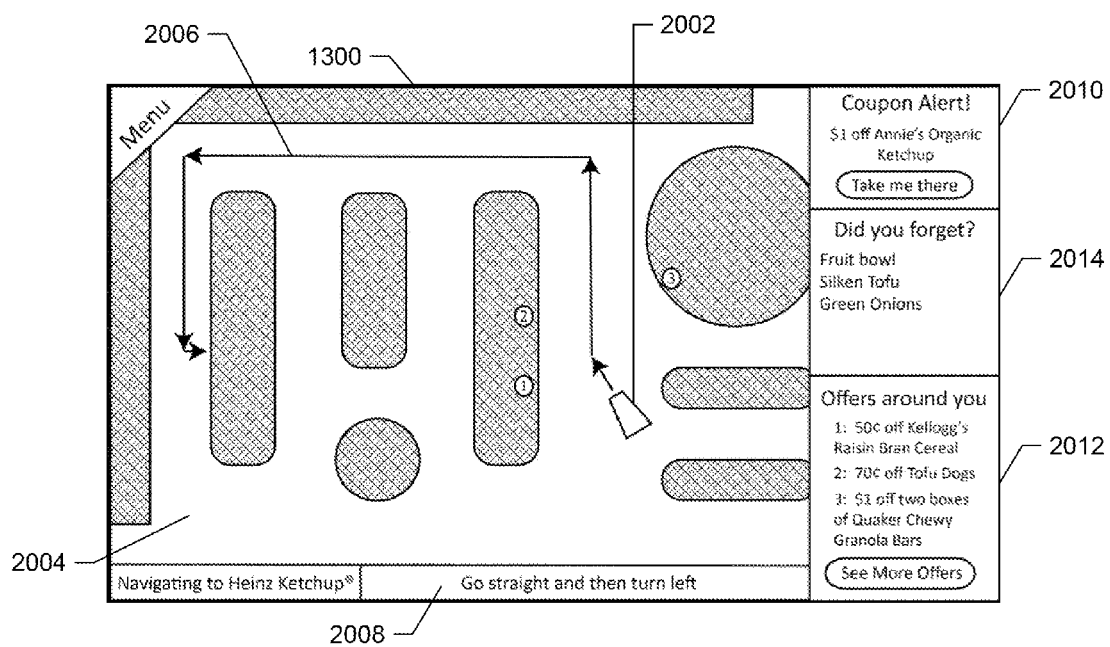
FIGS. 20, 21, and 22 are schematic diagrams of information that can be displayed via the display device of the user device based on a known location of the moveable object.

FIG. 20 shows the display area 1300 of the display device 107 displaying a current location 2002 of the moveable object 102 in a graphical representation 2004 of an indoor area (such as a map). In this embodiment, the user device 106 receives a message from the location processor 104 indicative of a location of the moveable object 102. The message may include coordinates of the graphical representation 2004 that the display device 107 uses to display the current location 2002 of the moveable object 102. The display device 107 displays an icon at the current location 2002 representing the moveable object 102 at a point on the graphical representation 2004 that corresponds to the actual location of the moveable object 102 in the indoor area. The icon may be positioned in the display area 1300 to show an orientation of the moveable object 102 in relation to objects (such as shelves) in the graphical representation 2004.

In addition to displaying the current location 2002 of the moveable object 102 via the display device 107, the user device 106 accesses the databases 1902 to 1906 described in conjunction with FIG. 19 to display application information including: (a) a navigational route 2006, (b) turn-by-turn directions 2008, (c) a coupon alert 2010, (d) a list of offers of products 2012 in proximity to the moveable object 102, and (e) a list of suggested products 2014. The display device 107 also displays icons (such as '1', '2,' and '3') corresponding to each of the offers 2012 on the graphical representation 2004 showing actual locations of those products in the indoor area.

In this embodiment, the user device 106 updates the current location 2002 of the moveable object 102 based on messages received from the location processor 104. Additionally, the user device 106 updates the turn-by-turn directions 2008 and the navigation route 2006 based on the current location 2002. Further, the user device 106 updates the list of offers of products 2012 based on the current location 2002 of the moveable object 102 in the indoor area.

In some embodiments, the user device 106 prompts a user for an identifier of an indoor area prior to displaying the moveable object 102 in the graphical representation 2004. In these embodiments, a user may specify a name, an address, or a term associated with the indoor area, causing the user device 106 (such as a smartphone of the user operating an indoor navigation application) to select the appropriate graphical representation 2004. Alternatively, the user device 106 may use GPS prior to entering the indoor area to determine the appropriate graphical representation 2004.

Figure 21:
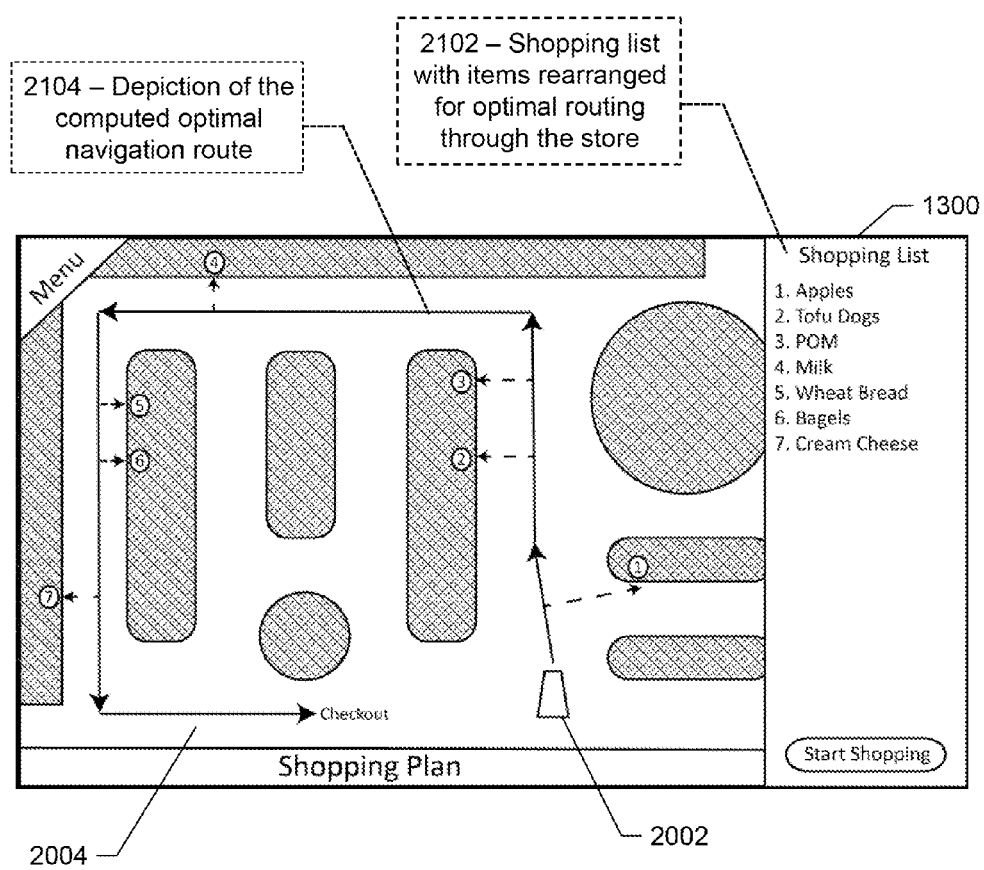

FIG. 21 shows another embodiment of the graphical representation 2004. In this embodiment, the display area 1300 includes a shopping list 2102. The products listed in the shopping list 2102 are re-sequenced based on an optimal navigation route 2104 through the indoor area. The optimal navigation route 2104 can be determined based on different navigation strategies. For example, the user device 106 can determine a shortest route, a route avoiding congested areas (by knowing locations of other moveable objects), or a route that includes the locations of designated products specified by an advertiser or personnel of the indoor area.

The display device 107 displays this calculated route as the navigational route 2104 with numerical references corresponding to locations of the products in the shopping list 2102. The user device 106 updates the navigational route 2104 as the moveable object 102 moves along the route. Additionally, as the products are placed into the moveable object 102, the user device 106 may remove the corresponding product from the shopping list 2102.

Figure 22:
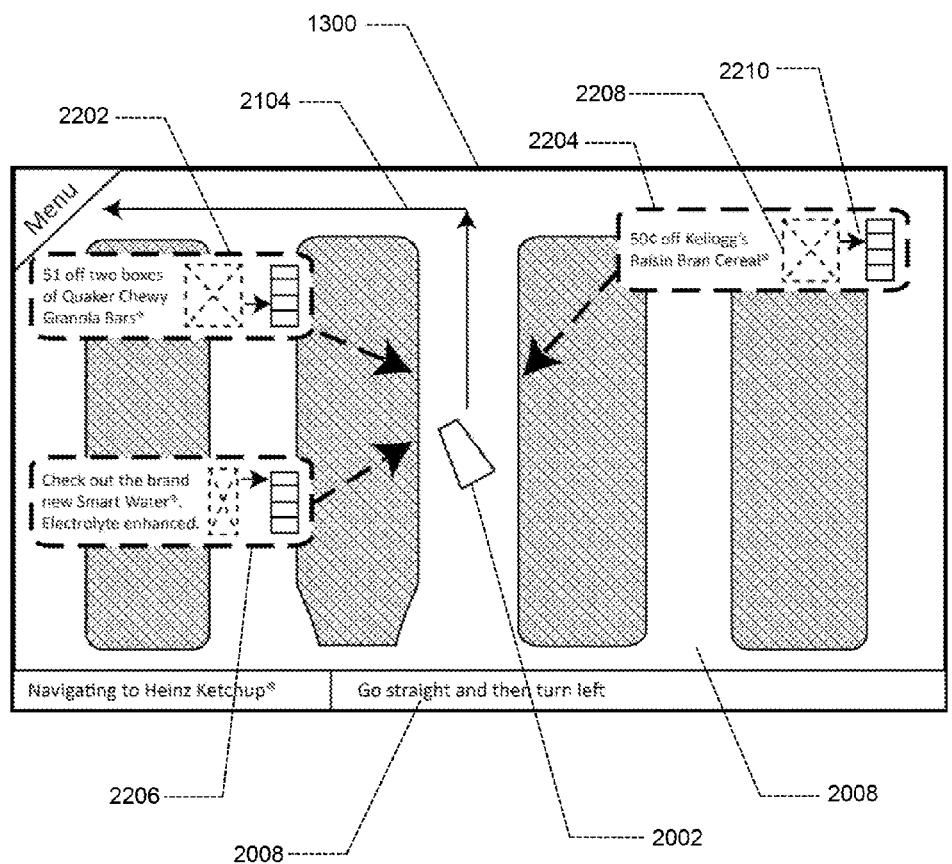

FIG. 22 shows another example embodiment of the graphical representation 2004 displayed in the display area 1300 of the display device 107. In this example embodiment, the current location 2002 of the moveable object 102 is displayed in addition to the navigational route 2104 and the turn-by-turn directions 2008. Additionally, the display device 107 displays product offers 2202 and 2204 corresponding to products in proximity to the current location 2002. The offers 2202 and 2204 include a description of the offer, a picture of the product 2208, and the product's vertical location on a shelf 2210. The display device 107 also displays a product advertisement 2206 that includes a product slogan, a picture of the product, and the product's location on a shelf. In certain embodiments, the advertisement 2206 includes a video showing a commercial associated with the product. In other embodiments, the advertisement 2206 includes a suitable interactive game.

In another embodiment, the offers 2202 and 2204 may be displayed by the user device 106 at periodic times or at a time specified by an operator of the indoor area or a manufacturer of a product. The offers 2202 and 2204 may include an advertisement or a sale for a product that may not be in proximity to the moveable object 102. The offers 2202 and 2204 could include a prompt asking if the user is interested in the product. If the user is interested, the user device 106 displays the directions 2008 or the navigational route 2104 to the product in the graphical representation 2004. The user device 106 could also display more information about the product (such as nutritional information).

In another embodiment, the offers 2202 and 2204 include specials (such as blue light specials). In this embodiment, the user device 106 displays the offers 2202 and 2204 at predetermined times. In some instances, an operator of the indoor area or a manufacturer of a product specifies when the offers 2202 and 2204 are to be displayed.

Additionally, the offers 2202 and 2204 could be based on a profile or history of a user. In these instances, the user device 106 prompts a user for an identifier to retrieve a shopping history. The user device 106 then selects the offers 2202 and 2204 that match or correspond to previous purchases by the user. Alternatively, in instances where a user is anonymous, the user device 106 displays the offers 2202 and 2204 specified for anonymous users.

Figure 23:
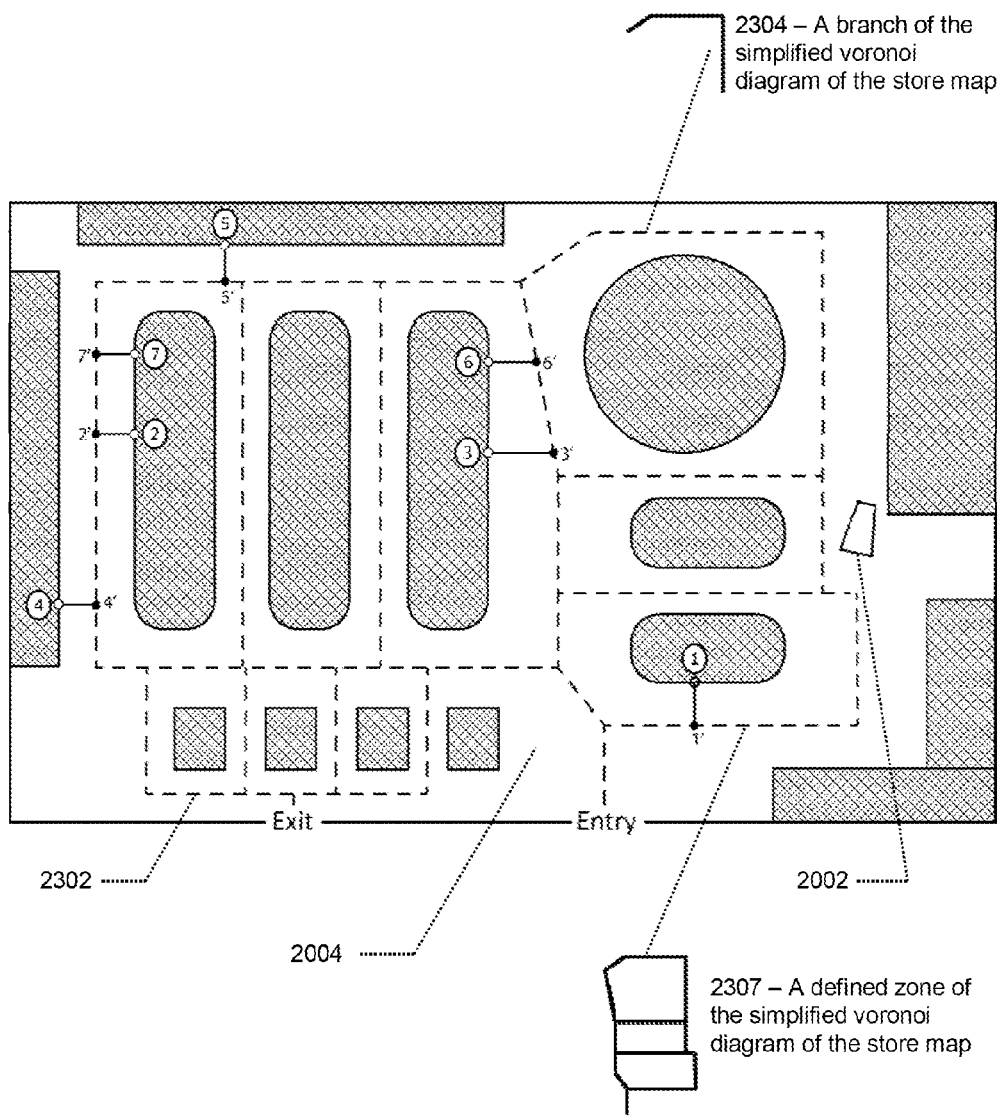
FIG. 23 is a schematic diagram showing a determination of a navigational route through an indoor area based on a known location of the moveable object.
Figure 24:
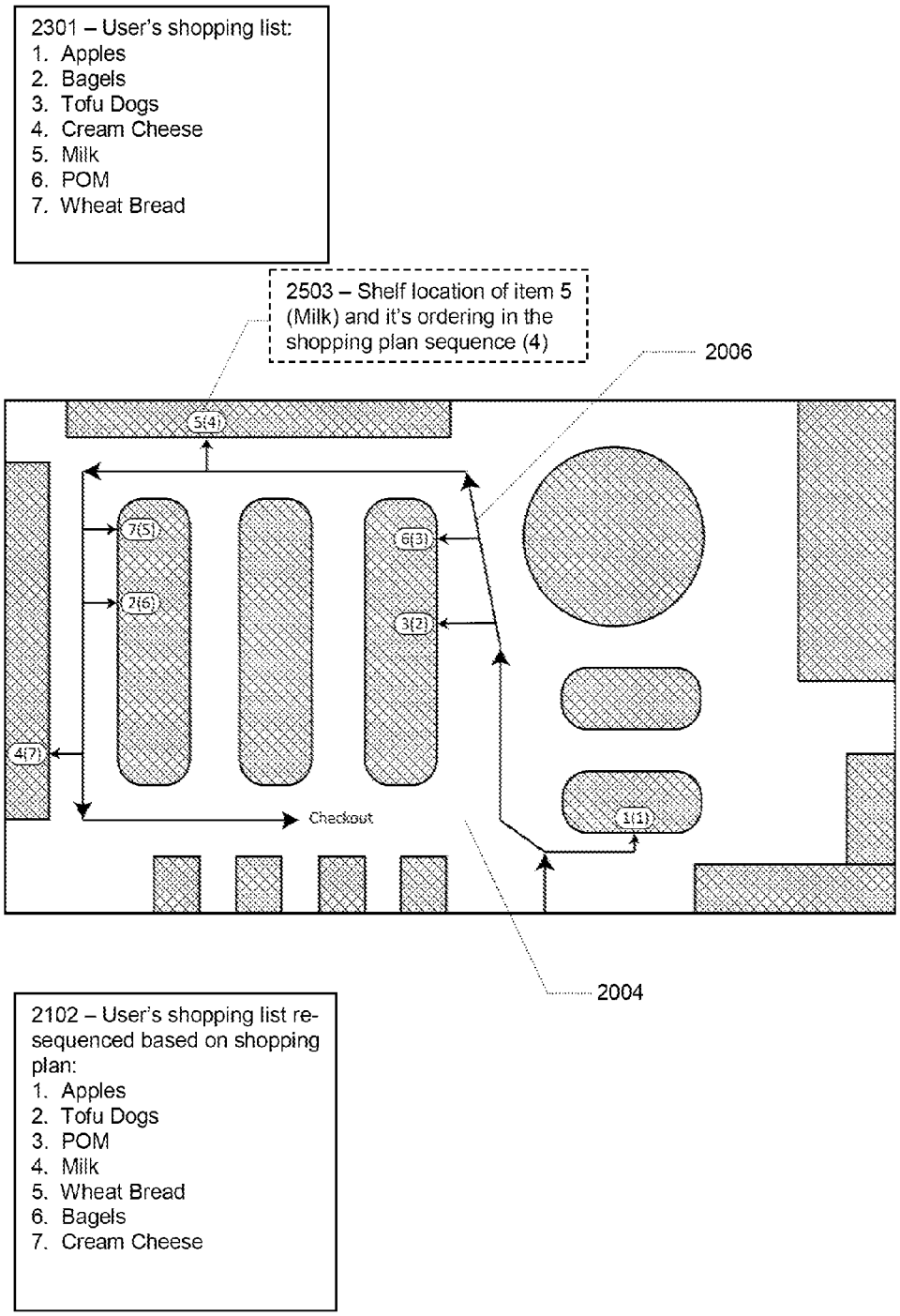
FIG. 24 is a schematic diagram of the navigational route of FIG. 23 displayed via the display device of the user device based on a known location of the moveable object.

FIGS. 23 and 24 generally depict how route planning may be performed in one embodiment. In this example embodiment, a simplified Voronoi diagram or approximate medial-axis transform is first computed using all of the boundaries of the moveable areas within an indoor space, which creates a connected graph that generalizes all potential moving routes 2302 within that indoor area based on a topology of an indoor area. These routes may then be segmented into different branches 2304 and zones 2307 based on, for example, the closeness or adjacency of isles and walkways throughout an indoor area. Hence, the Voronoi diagram is used to calculate potential moving routes 2302 which are composed of branches 2304 of which one or more branches may comprise a zone 2307. If the indoor area is sufficiently small, it may be quite reasonable for it to have just a single zone that is comprised of all of the calculated branches of the moving routes implied by the space's associated Voronoi diagram. The main purpose for segmenting groups of branches into separate zones is to ensure the computational efficiency and practicality of calculating routes within large, complex indoor spaces.

Figure 25:
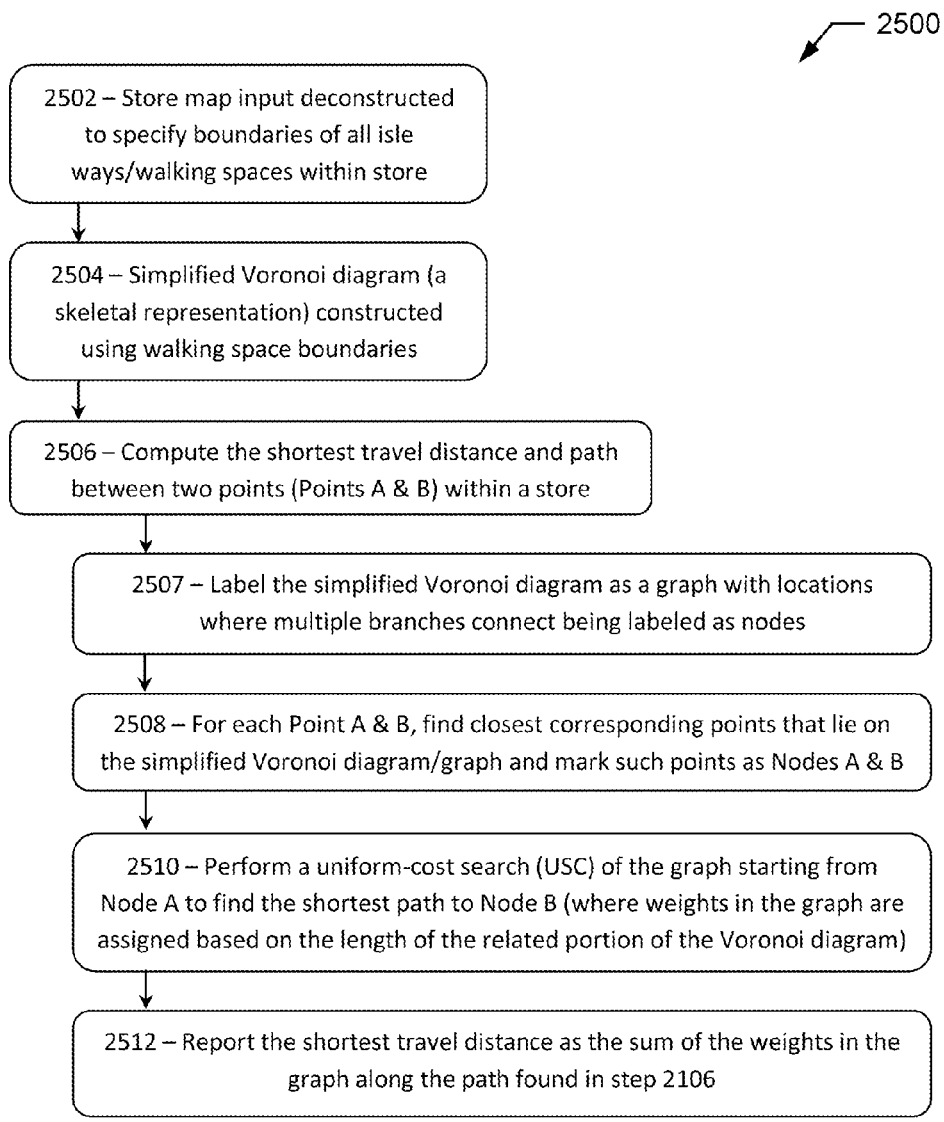
FIGS. 25, 26, and 27 are flowcharts representative of example machine-accessible instructions, which may be executed to calculate routes through an indoor area displayable via the display device of the user device of FIG. 13.
Figure 26:
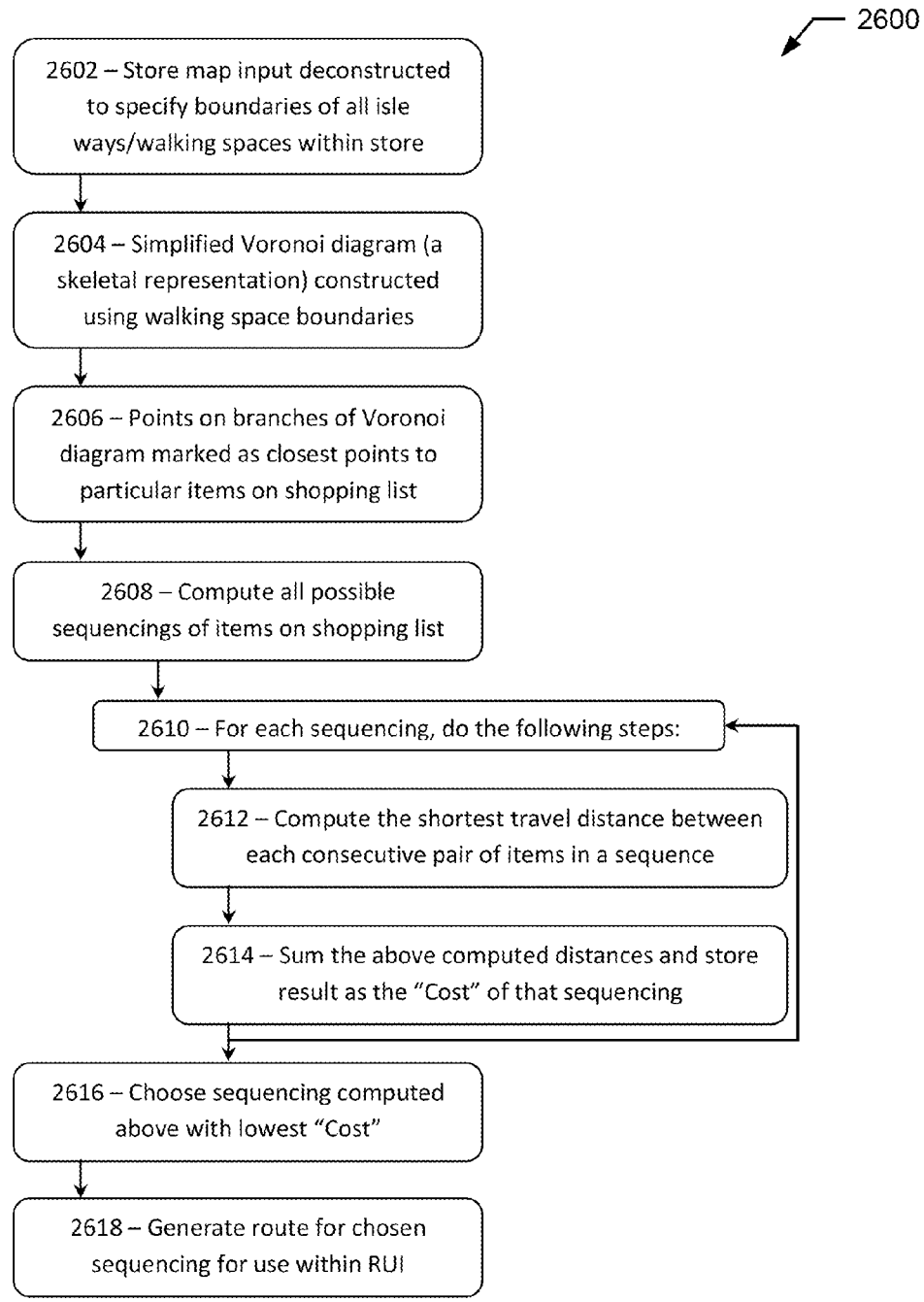
Figure 27:
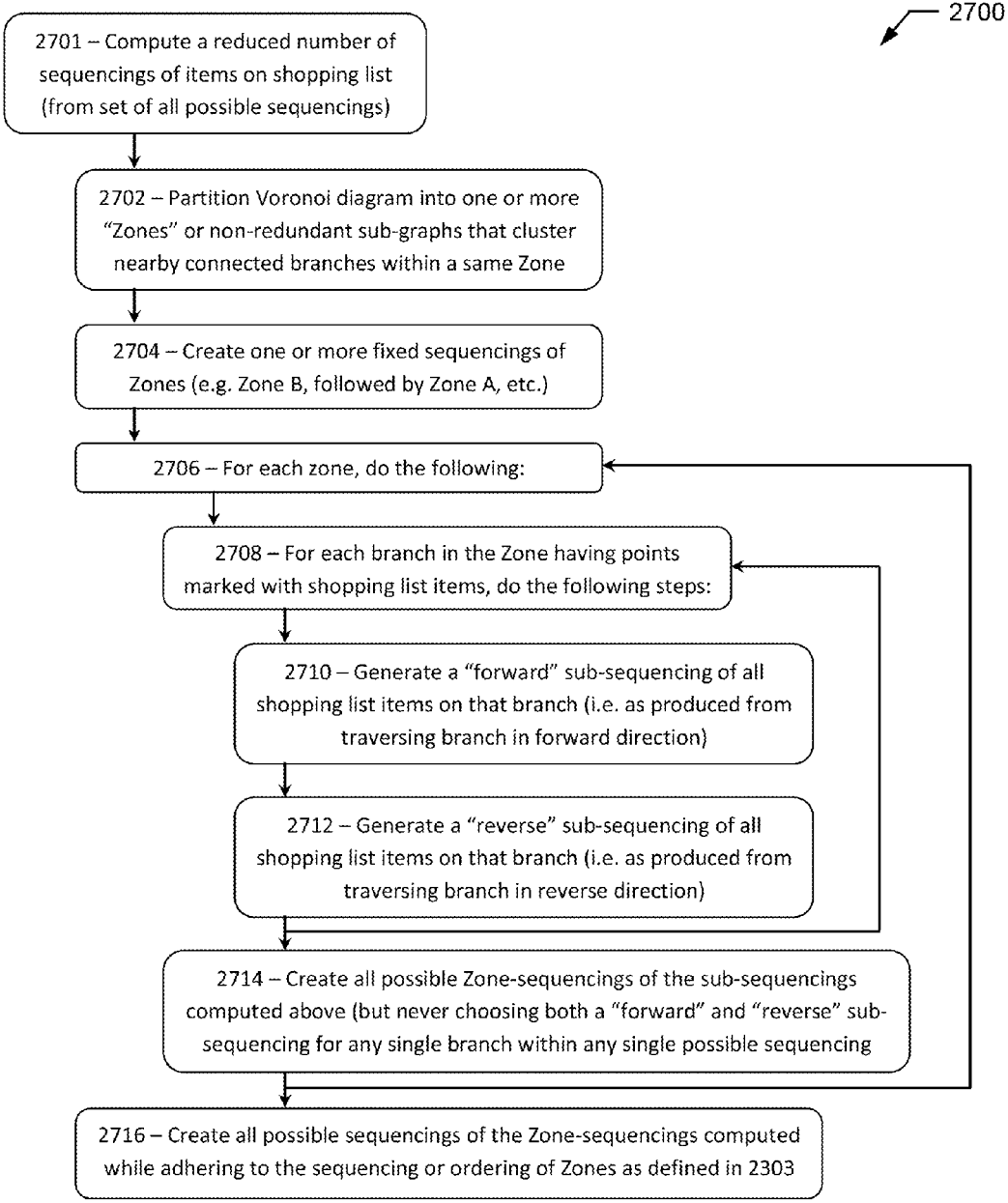

FIG. 24 generally shows the shopping list 2102 of FIG. 21 re-sequenced to create a shopping list 2301 based on the locations of items within the shopping list and the processes described in conjunction with FIGS. 25, 26, and 27. This re-sequencing of shopping list items enables the user to navigate a more continuous and efficient path through the indoor space saving time and energy.

Route Calculation Embodiments

FIGS. 25, 26, and 27 generally show flowcharts of machine readable instructions executable by the user device 106 or the application processor 124 to calculate a route through an indoor area using potential moving routes 2302 described in conjunction with FIGS. 23 and 24. FIG. 25 shows a process 2500 that calculates a shortest distance between two points (such as two different products on a shopping list). The process 2500 begins when the application processor 124 or the user device 106 deconstructs the graphical representation 2004 to specify boundaries of navigational space within an indoor area as indicated by block 2502. The user device 106 or the application processor 124 then creates a simplified Voronoi diagram or another approximate medial-axis transform (such as one generally free of large elongation or bifurcation artifacts) based on such boundaries as indicated by block 2504.

The user device 106 or the application processor 124 then computes a shortest path between the two points in the indoor area as indicated by block 2506. This is done by executing blocks 2507 through 2512 as indicated by their indented presence beneath block 2506. More specifically, the user device 106 or the application processor 124 first labels the simplified Voronoi diagram as a graph with locations where multiple branches connect (labeled as nodes) as indicated by block 2507. The user device 106 or the application processor 124 next determines closest corresponding points that are on the simplified Voronoi diagram (also referred to as the potential moving routes 2302) for both given points A and B and label those points on the related created graph as nodes A and B respectively as indicated by block 2508. Then, as indicated by block 2510, the user device 106 or the application processor 124 then uses the constructed graph to perform a uniform-cost-search starting from node A to determine a shortest path to node B where weights in the graph were previously assigned based on the length of portions of the Voronoi diagram related to portions of the graph. It should be noted that a uniform cost search algorithm is an algorithm commonly known to skilled artisans. Lastly, as indicated by block 2512, the shortest travel distance may then be reported as the sum of the weights in the graph along the path found in block 2510.

FIG. 26 shows a process 2600 that creates a navigational route that yields a shortest travel route for a user by computing walking distance for all possible sequencings of items on a user's list. This process 2600 makes use of the process described in conjunction with FIG. 25, as indicated by block 2612 where the means for computing the shortest travel distance between a pair of items can be the means depicted in FIG. 25. It can also be further clarified that block 2608 computes all possible sequencings by iteratively organizing items in every possible ordering. For example, if a list has three items labeled P, Q, and R, this list would have 6 possible sequencings including: PQR, PRQ, QPR, QRP, RPQ, RQP.

After determining the sequencing with the lowest cost as indicated by blocks 2602 to 2614, the user device 106 may then calculate the preferred route based on that sequencing and the shortest paths between adjacent pairs of items in that sequencing such that an optimal navigation route 2006 may be displayed, for example, as shown in FIG. 24.

FIG. 27 generally shows a flowchart of a process 2700 that is a possible substitution for block 2608 in FIG. 26 that reduces a number of sequences that need to be evaluated. As the list of items becomes larger, for example, if a user has more than 100 items on a list, the number of possible sequencings of that list becomes exponentially larger. Because of this, the practicality of evaluating all possible sequencings of a list to determine an optimal sequence becomes more difficult. To address this issue, potential moving routes 2302 are broken down into zones (see example 2307) and branches (see example 2304). This enables the user device 106 or the location processor 104 to group various items from a list together based on their presence along a same branch and same zone which effectively enables further simplification of the problem of deriving an overall preferred sequence of items.

For example, it may be found that on a user's list of six items, three of the items (e.g. items T, U, and V) are located along a branch 2304. If a user moves along the branch in one direction, the user will encounter the items in the order of UVT and if the user moves along the branch from the opposite direction the user will encounter the items in the order of TVU. In this case, these would be the "forward" and "reverse" sub-sequencings referred to in blocks 2306 and 2307 respectively. Because the user device 106 or the location processor 104 is only dealing with two sub-sequencings of three items the process 2700 has substantially reduced the number of overall sequencings needed to be evaluated. Thus, using this type of partitioning of the potential moving routes 2302 within an indoor space shown in the flowchart of FIG. 27 enables a much smaller number of sequencings to be generated, thereby replacing step 2608 of FIG. 26 such that far fewer sequencings are evaluated more quickly to determine a preferred sequencing with low cost at block 2616.

User Registration Embodiment

Figure 28:
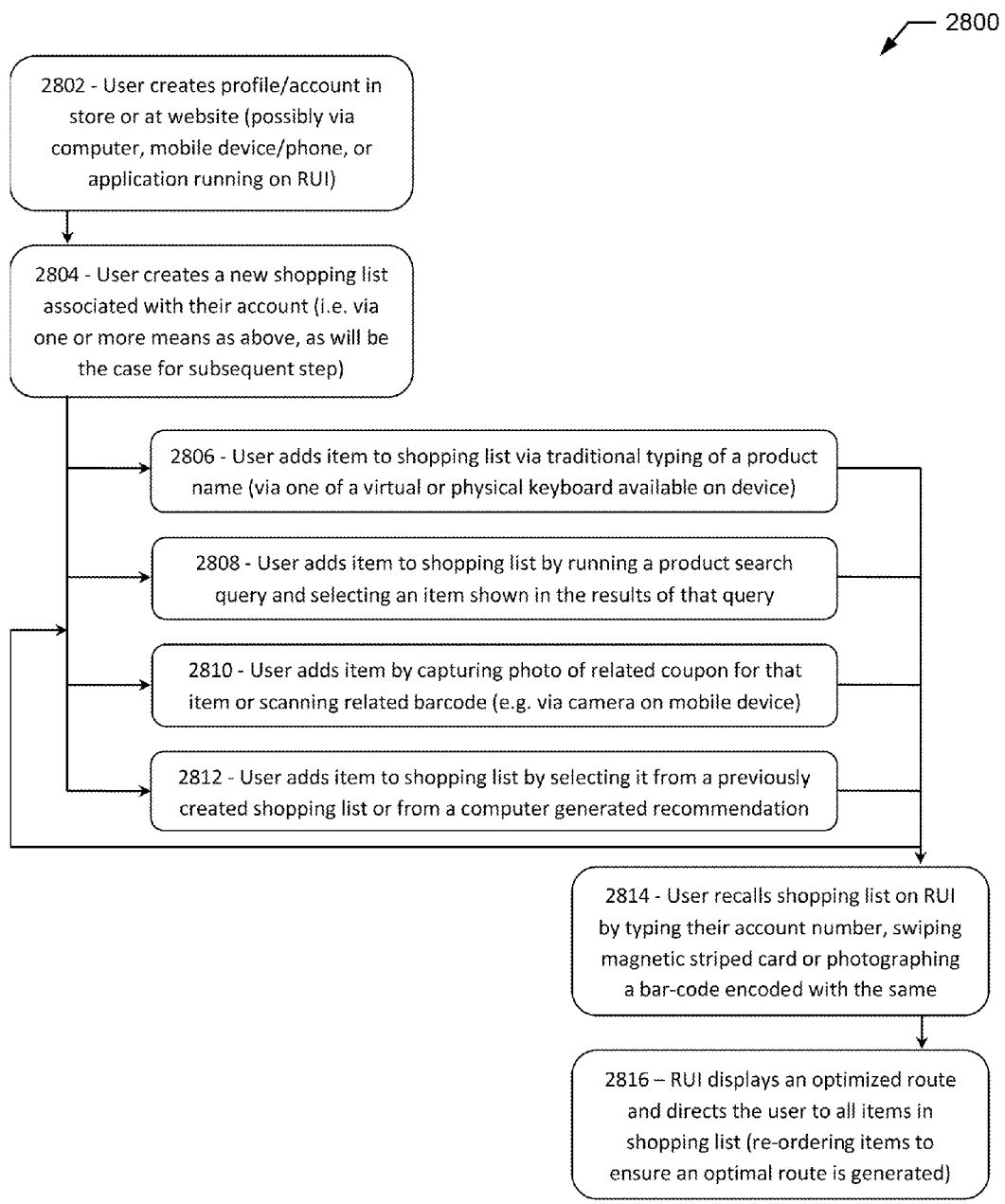
FIG. 28 is a flowchart representative of example machine-accessible instructions, which may be executed to create a user profile and shopping list for use with the indoor navigation system of FIG. 1.

FIG. 28 generally shows a flowchart of a process 2800 for a user to register and use the user device 106, the display device 107, and the input device 112 of FIG. 13. The process 2800 begins when a user creates a profile or account via the user device 106 and the input device 112 as indicated by block 2802. In other embodiments, the user can create an account via a website or at a registration area of an indoor area.

After receiving registration information for a user, the user device 106 receives a shopping list as indicated by block 2804. In one embodiment, the user device 106 receives the shopping list by the user using the virtual keyboard 1402 via the touchscreen 1302. In one instance, the user enters names of desired products into the virtual keyboard 1402 as indicated by block 2806. In another instance the user uses the search box 1404 to search for products and select products returned from the search as indicated by block 2808. In another embodiment, the user uses the scanner 1304 or camera 1306 to record the shopping list as indicated by block 2810. Alternatively, the user uses the scanner 1304 or camera 1306 to scan coupons of desired products.

In another embodiment, the user accesses a shopping history (such as a previous shopping list) stored in the user device 106 or in the location processor 104 as indicated by block 2812. Alternatively, the user device 106 or the location processor 104 can recommend products based on the user's shopping history. In a further embodiment, the user device 106 or the location processor 104 recalls a shopping list after the user enters an account number via the touchscreen 1302 or swipes a membership card along the peripheral device 1308 as indicated by block 2814. After receiving the shopping list, the user device 106 or the location processor 104 determines a route through the indoor area based on a current position of the moveable object as indicated by block 2816. The user device 106 then causes the display device 107 to display the current location 2002, the navigational route 2006, and the turn-by-turn directions 2008 in the graphical representation 2004 of the indoor area. In this manner, the indoor navigation system 100 accurately and precisely displays to a user a current location of the moveable object 102 in an indoor area.

Magnetic Rotary Encoder Embodiment

Figure 29:
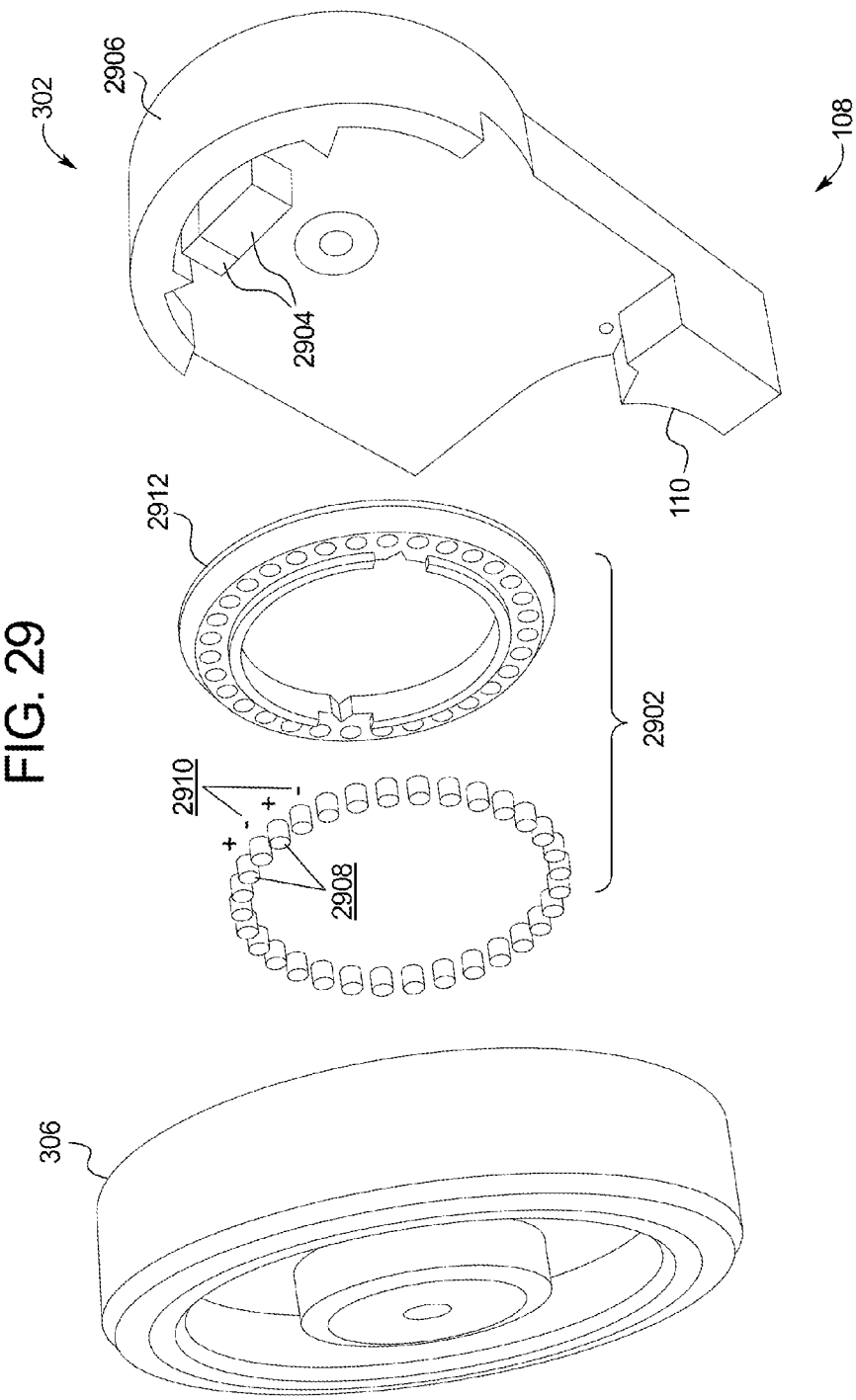
FIGS. 29 and 30 show diagrams of an embodiment of the position sensing apparatus of FIGS. 8 to 10 including a magnetic code wheel and magnetic field sensors.
Figure 30:
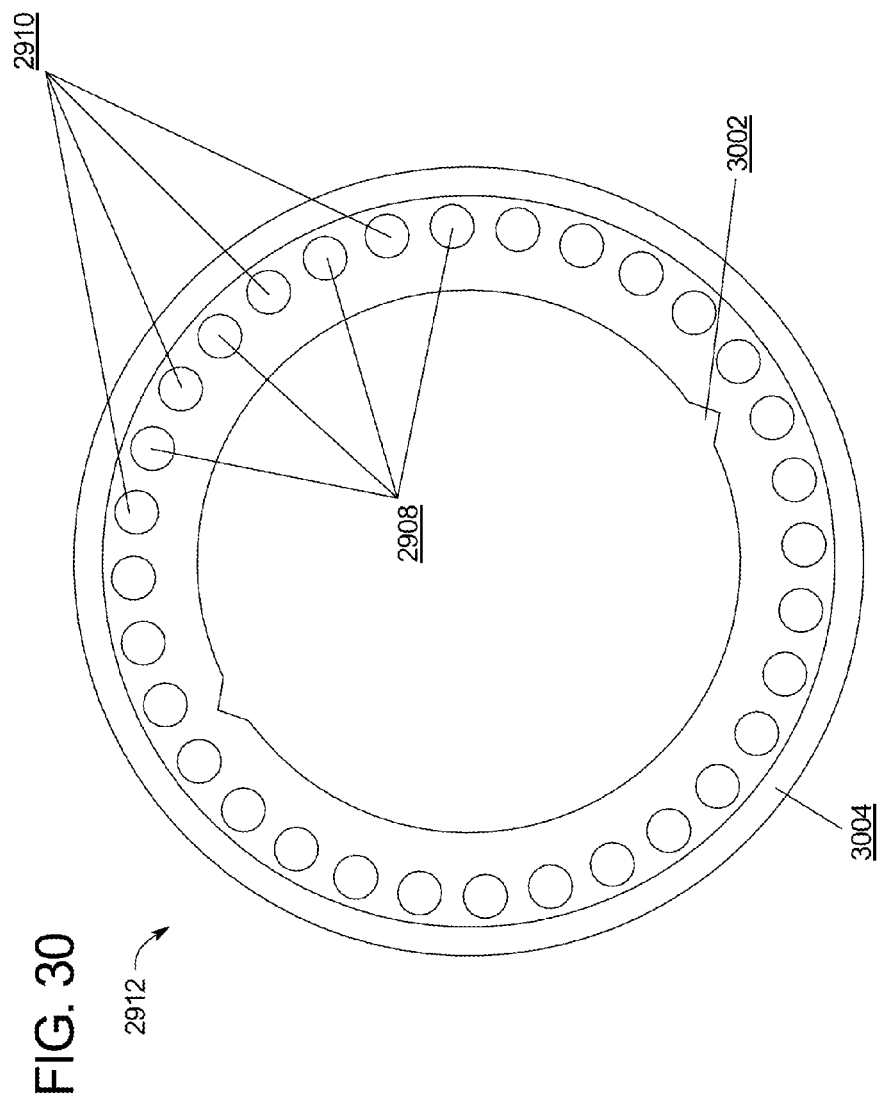

FIGS. 29 and 30 show diagrams of an embodiment of the position sensing apparatus 302 that includes a magnetic code wheel 2902. In this illustrated embodiment, the position sensing apparatus 302 includes at least one magnetic field sensor 2904 communicatively coupled to corresponding encoder circuitry 804 (not shown). The magnetic code wheel 2902, magnetic field sensor(s) 2904, and the encoder circuitry 804 are used in combination to implement a dead reckoning sensor 108 (e.g., a motion sensor) that uses quadrature encoding to determine movement and orientation of the moveable object 102.

As shown in FIG. 29, a cover 2906 (e.g., a case) includes an absolute position sensor 110 and one or more magnetic field sensors 2904. The cover 2906 is configured to attach or integrate with the code wheel 2902. In other embodiments, the code wheel 2902 is dimensioned to fit within or is attached to a wheel hub of the wheel 306. The cover 2906 also includes encoder circuitry 804 and a power supply 812 (not shown). The cover 2906 is attachable to the wheel 306 of the moveable object 102 but does not prevent the wheel 306 from freely rotating.

It should be appreciated that the magnetic field sensor(s) 2904 can be encapsulated or otherwise enclosed within the cover 2906 because the detection is based on magnetic fields. It should also be appreciated that the magnetic field sensor 2904 only has to be positioned in proximity to the magnetic code wheel 2902 instead of within a line-of-sight or have other physical contact with the magnets. Completely sealing the magnetic field sensor(s) 2904 within the cover 2906 prevents water, dust, and/or other debris from impacting operation of these sensors.

Similar to the code wheel 802 described in conjunction with FIGS. 8 and 9, the code wheel 2902 of FIG. 29 rotates in unison with the wheel 306. However, instead of using reflective light sections 906 and 908, the code wheel 2902 instead includes north polarity magnets 2908 and south polarity magnets 2910 attached to an insert tray 2912. The example insert tray 2912 (shown in FIGS. 29 and 30) includes receptacles to position and hold the magnets 2908 and 2910. The spacing of the receptacles ensures that the magnets 2908 and 2910 are evenly spaced around the code wheel 2902. In this embodiment, the north polarity magnets 2908 are alternately positioned/oriented with the south polarity magnets 2910 within the insert tray 2912 to enable the encoder circuitry 804 to detect transitions between north and south magnetic fields as the code wheel 2902 rotates.

In the example embodiment, the magnetic field sensor(s) 2904 (e.g., Hall Effect sensors) detect a magnetic field of the magnets 2908 and 2910 as the magnets pass within proximity or a detection field of the sensor(s). For instance, when a north polarity magnet 2908 passes in proximity to a magnetic field sensor 2904, the sensor transmits a positive voltage (e.g., 5 volts) to the encoder circuitry 804. Similarly, when a south polarity magnet 2910 passes in proximity to the magnetic field sensor 2904, the sensor transmits a negative (e.g., −5 volt) voltage, a lesser magnitude voltage (e.g., 2.5 volts) or a ground potential (e.g., 0 volts) to the encoder circuitry 804. The encoder circuitry 804 then converts the analog voltages into a digital signal such that north polarity corresponds to a logic '1' and south polarity corresponds to a logic '0'.

In other embodiments, the magnetic field sensor 2904 may transmit a voltage that is proportional to the detected magnetic field strength. In yet other embodiments, the magnetic field sensor(s) 2904 may provide a digital output based on the detected polarity (e.g., a logic '1' in response to detecting a magnetic field with a north polarity). In further embodiments, the magnetic field sensor 2904 provides a current representative of a detected magnetic field.

In embodiments where more than one magnetic field sensor 2904 is used, the sensors 2904 are spaced apart at a distance that is proportional to the distance between adjacent magnets 2908 and 2910 in the insert tray 2912. For instance, to enable quadrature encoding to determine direction of movement of the wheel 306, magnetic field sensors 2904 are spaced such that their outputs are approximately 90 degrees out of phase. In other instances, the magnetic field sensors 2904 are spaced such that their outputs are between 15 degrees and 165 degrees out of phase. To achieve these out of phase outputs, the sensors 2904 are positioned in relation to the spacing of the magnets 2909 and 2910 such that when one sensor detects a transition in the polarity of the magnetic field (e.g., a transition between adjacent magnets) the other sensor is aligned with a magnet such that a uniform magnetic field is detected. The distance between the sensors 2904 can correspond, for example, to at least half a distance from a center of magnet 2908 to a center of adjacent magnet 2910.

FIG. 30 shows a diagram of an enlarged view of the insert tray 2912 of FIG. 29. As described above, the insert tray 2912 includes receptacles or recessed portions to uniformly alternatively position north polarity magnets 2908 and south polarity magnets 2910. While FIGS. 29 and 30 show the receptacles and magnets 2908 and 2910 as having a circular shape, in other embodiments, the magnets and indentations could have a rectangular, triangular, etc. shape. The insert tray 2912 also includes one or more notches 3002 to enable the tray 2912 to be rotated during manufacture. The insert tray 2912 further includes a beveled edge 3004 to enable the tray to fit within a hub of the wheel 306. The beveled edge 3004 also enables the insert tray 2912 to be connected to the hub.

Figure 31:
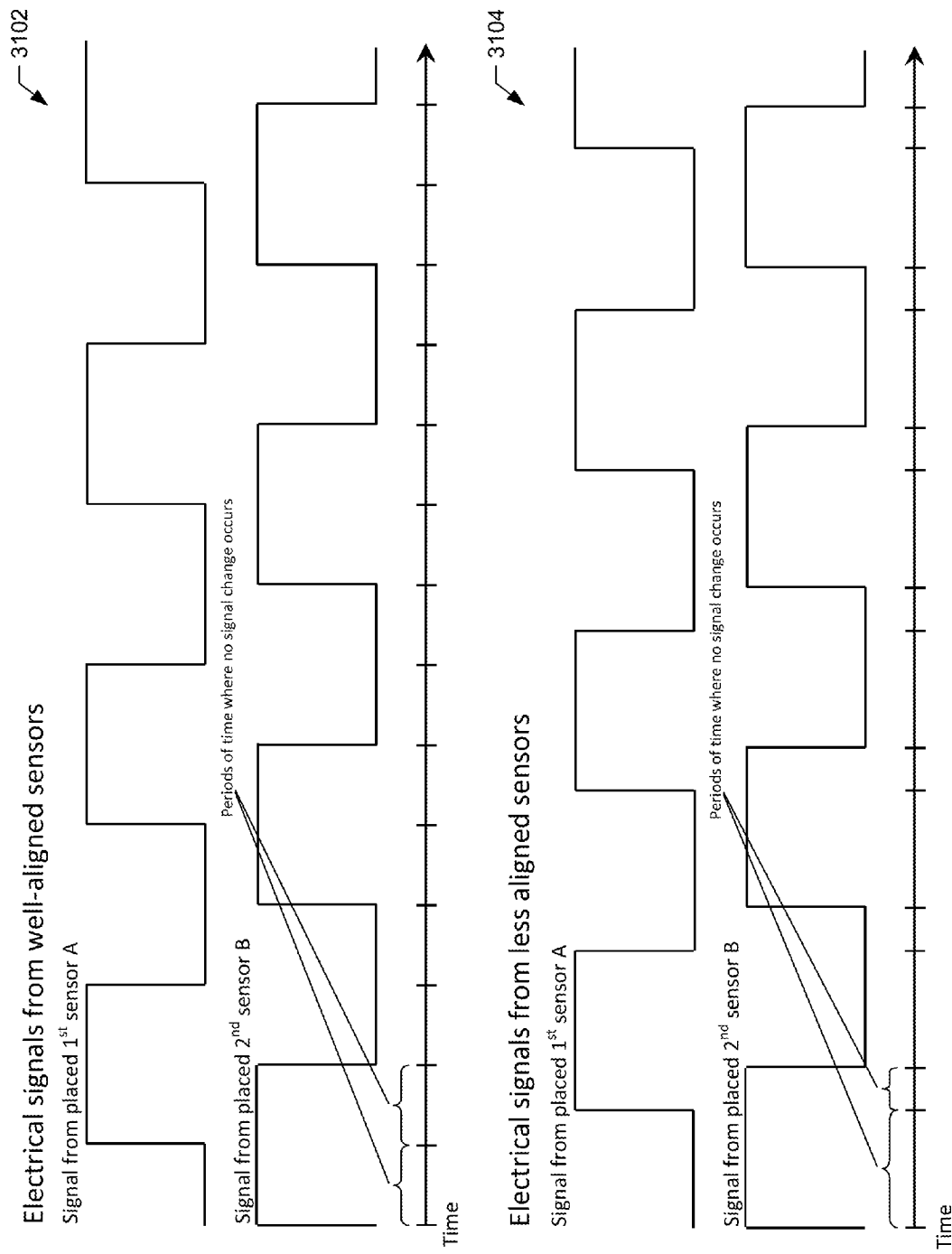
FIG. 31 shows example timing diagrams of outputs from two magnetic field sensors of FIG. 29.

FIG. 31 shows example timing diagrams of outputs from two magnetic field sensors 2904 of FIG. 29. In particular, timing diagram 3102 shows that the outputs from the two magnetic field sensors 2904 (i.e., sensor A and sensor B) are substantially 90 degrees out of phase when the sensors are properly aligned. Timing diagram 3104 shows that the outputs from the two magnetic field sensors 2904 are greater than 90 degrees out of phase when the sensors are misaligned.

In the encoding scheme described in conjunction with FIGS. 29 and 30, the outputs of the magnetic field sensors 2904 shown in FIG. 31 change from a high level to a low level (and vice-versa) as the wheel 306 rotates. The high level corresponds to a logic '1' or a relatively high voltage (e.g., 5 volts) and the low level corresponds to a logic '0' or a relatively low voltage (e.g., 0 volts). Thus, when the wheel 306 rotates at a relatively constant speed, the state of the signals in the timing diagram 3102 change at a stable periodic rate such that the time intervals between state changes are relatively constant/uniform. The encoder circuitry 804 and/or the position calculator 122 uses these outputs to determine a precise distance traveled.

However, the magnetic field sensors 2904 may not always be accurately positioned to generate output waveforms that are precisely 90 degrees out of phase. For example, a wheel 306 may become damaged. For instance a bracket holding the wheel may become bent, thereby causing the orientation of the magnetic field sensors 2904 to change slightly in relation to a wheel hub. This relatively minor change in orientation causes the magnetic field sensors 2904 to detect state changes at slightly different relative intervals. As shown in the timing diagram 3104, time intervals between state changes for a wheel traveling at a constant speed fluctuate with longer intervals interspersed between shorter ones. These uneven intervals cause the encoder circuitry 804 and/or the position calculator 122 to include errors in distance calculations because the basis of such calculations are based on a specific distance that is traveled by the wheel every time a state change is encountered. In other words, the encoder circuitry 804 and/or the position calculator 122 detect only the transitions between high and low states. As a result, long intervals, where the wheel has moved further, get calculated as the same distance traveled as short intervals. This problem is exacerbated further when angular directions are calculated based on such erroneous distances detected from the movement of the two parallel wheels on a cart.

Theoretically, such fluctuations in output waveforms are relatively impossible to detect unless it is known that the wheel is spinning at a constant rate of speed. However, when considering the likely movement of a typical shopping cart and that those movements under such circumstances are not entirely random, it is possible to devise an error correction algorithm that enables distance to be accurately calculated even when magnetic field sensors become misaligned or deviate from their specified positions. Specifically, the algorithm is based on the fact that a known relatively constant speed of a wheel can be determined by looking at intervals in aggregate. Once the algorithm determines that the wheel has spent a portion of time rotating at a relatively constant speed, smaller sub-intervals (contained within that portion of time) can be evaluated to detect improper alignment. Responsive to detecting improper alignment, the algorithm calculates a correction factor to compensate for the misaligned wheels.

Figure 32:
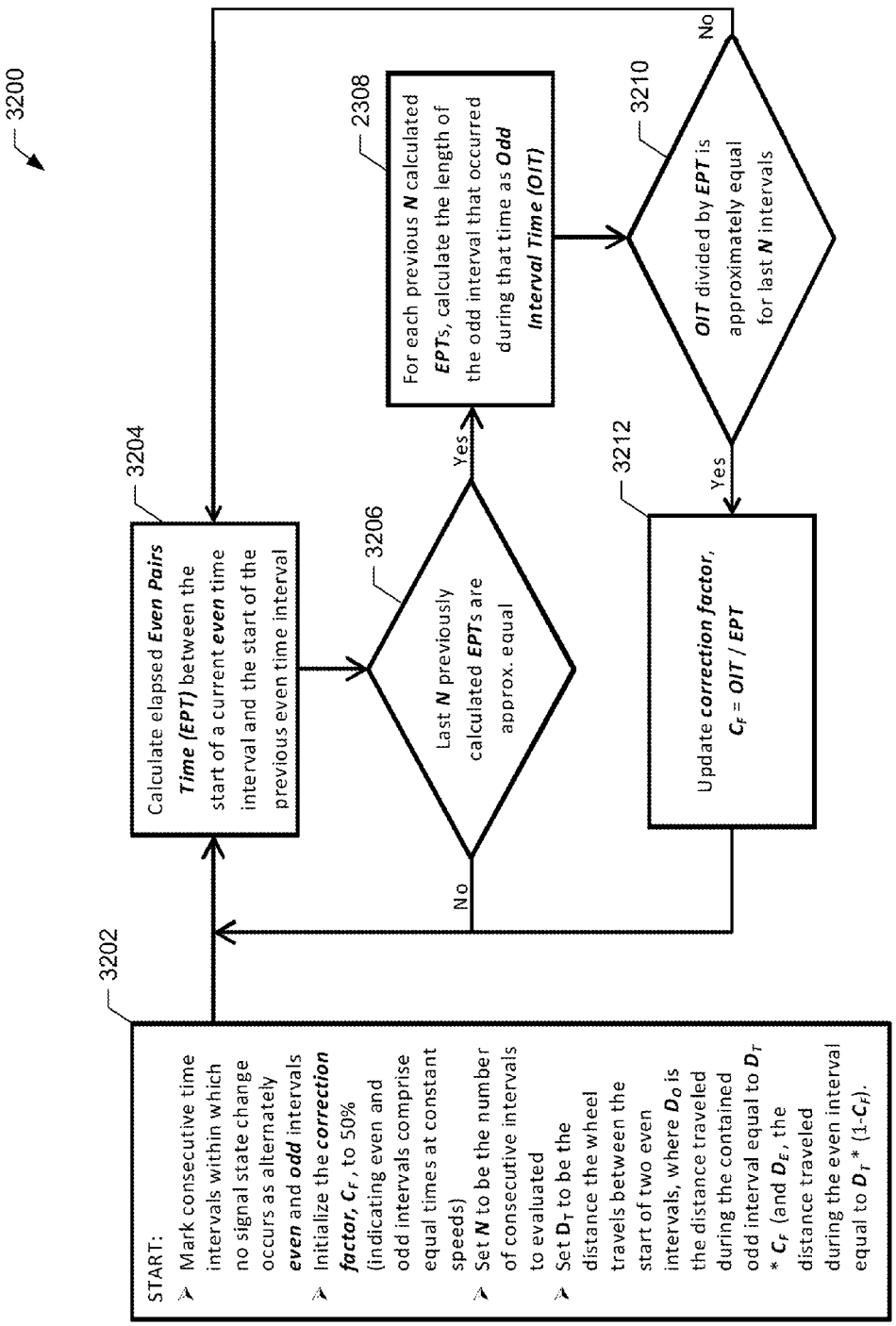
FIG. 32 shows a flowchart of an example process that is implemented by an algorithm to correct for misaligned magnetic field sensors.

FIG. 32 shows a flowchart of an example process 3200 that is implemented by an algorithm to correct for misaligned magnetic field sensors 2904, as described in conjunction with the timing diagram 3104 of FIG. 31. The process 3200 begins in block 3202 by the algorithm receiving output waveforms from the magnetic field sensors 2904 (e.g., the waveforms shown in the timing diagram 3102). The process 3200 determines consecutive time intervals in which no signal state change occurs and labels the first of these intervals as an 'even' interval and the second of these intervals as an 'odd' interval. For example, an 'even' interval corresponds to a logic '1' and a consecutive odd interval corresponds to a logic '0' shown in FIG. 31. The process 3200 also sets a correction factor (e.g., a variable $C_F$) to 50%, indicating that the even and odd intervals comprise equal times at a constant speed.

The example process 3200 in block 3202 also determines a number of consecutive intervals to be evaluated (e.g., a variable N). This number of intervals may be pre-specified (e.g., 10, 20, 30, etc.). Alternatively, the number of consecutive intervals may be based on a duration that a dead reckoning sensor 108 has been in service such that less (or more) intervals are evaluated the longer the sensor has been in service.

The example process 3200 further determines a distance a wheel travels between the start of two even intervals (e.g., a variable $D_T$) and a distance the wheel travels during the odd interval between the two intervals (e.g., a variable $D_O$ that is equal to $D_T$ multiplied by $C_F$). The example process 3200 moreover determines a distance traveled by the wheel during an even interval, which is equal to $D_T$ multiplied by $1-C_F$.

The example process 3200 of FIG. 32 continues in block 3204 by determining an Even Pairs Time ("EPT"), which is a time between a start of a currently detected even time interval and a start of a previous even time interval. The process 3200 then in block 3206 determines whether the previous N calculated EPTs are approximately equal. Responsive to determining that the previous N calculated EPTs are not equal, the example process 3200 returns to block 3204 to calculate a new elapsed EPT. The unequal EPTs may correspond to a wheel changing speeds, starting, or stopping. However, responsive to determining that the previous N calculated EPTs are approximately equal, the example process 3200 in block 3208 calculates, for each of the previous N calculated EPTs, a length of an odd interval that occurred during the EPT as Odd Interval Time ("OIT").

The example process 3200 in block 3210 divides the OIT by the EPT for the previous N intervals and determines if the results are approximately equal. If the results are not equal, the process 3200 returns to block 3204 to calculate an EPT at the start of a new even time interval. However, if the requests are approximately equal, the process 3200 in block 3212 calculates (or amends) the correction factor as the OIT divided by the EPT. The example process 3200 uses this correction factor in conjunction with distances $D_T$ and $D_O$ to determine a distance a cart wheel traveled and returns to block 3204 to calculate an EPT at the start of a new even time interval. In this manner, the example process 3200 updates the correction factor in real time as the wheel rotates. This real-time updating enables the dead reckoning sensor 108 to provide an accurate distance regardless of a misalignment of the magnetic field sensors 2904 from a deteriorating wheel.

User Device Case Embodiment

Figure 33:
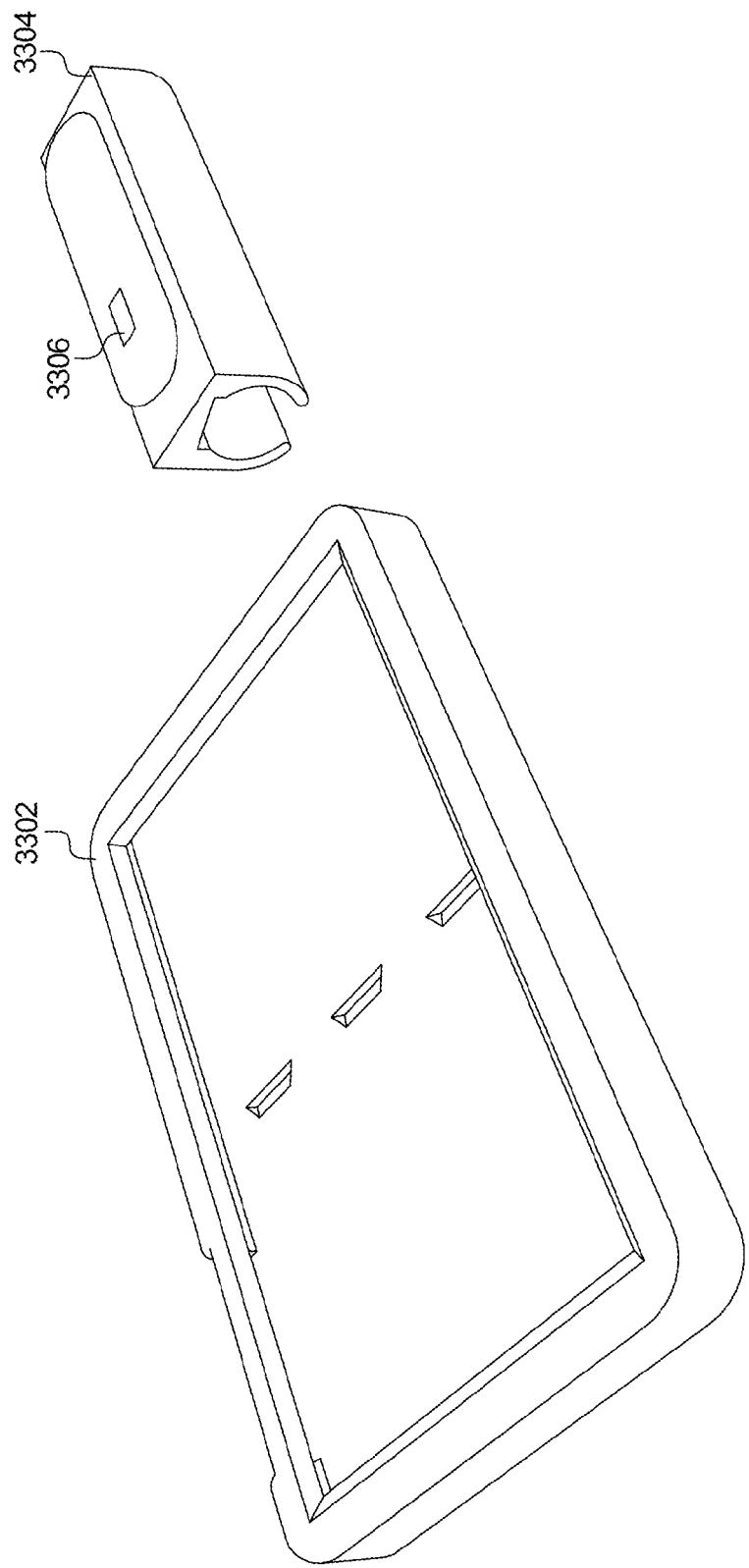
FIGS. 33 and 34 are diagrams showing an example case to connect a user device to a moveable object.
Figure 34:
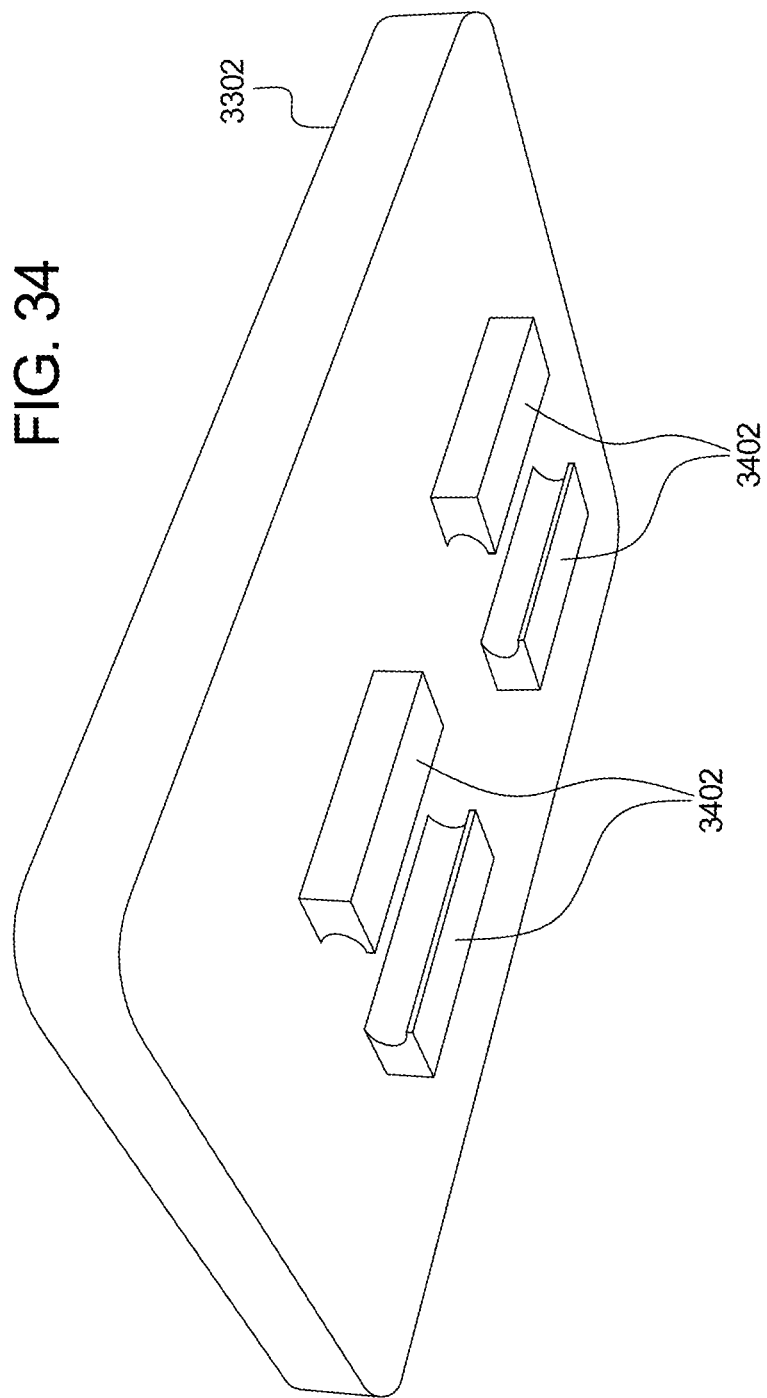

FIGS. 33 and 34 are diagrams showing an example case 3302 to connect a user device 106 to a moveable object 102. In particular, the illustrated case 3302 is dimensioned to accommodate a smartphone, tablet computer, laptop computer, etc. In other embodiments the case 3302 is dimensioned to accommodate any type of device capable of displaying indoor environment information to a user.

While the case 3302 is shown as having fixed dimensions, in other embodiments, the case 3302 may be adjustable. For example, the case 3302 may include slides that enable a user to change the width, length, and/or height to accommodate the user's device 106. This configurability enables the case 3302 to be compatible with virtually any dimensioned user device 106.

The case 3302 connects to a handle of a moveable object 102 (e.g., a shopping cart) via a bracket 3304. The example bracket 3304 is dimensioned to securely connect to a portion of a moveable object 102, such as a handle. In some embodiments, the bracket 3304 may be integrated with (or permanently attached to) the moveable object 102. In other embodiments, the bracket 3304 is removeably connected to the moveable object 102. For example, FIG. 34 shows a bottom view of the case 3302 including guides 3402 configured to removeably couple to the bracket 3304.

The example bracket 3304 includes an embedded tag 3306 that includes a unique identifier. The tag 3306 may be read by any number of means including, but not limited to, radio frequency identification, optical pattern recognition, and/or magnetic field fluctuation. For example, NFC (Near Field Communications) tags often include circuitry printed on an adhesive substrate. In one embodiment, the embedded tag 3306 is an NFC tag.

This unique identifier of the tag 3306 is used by the user device 106 to identify which moveable object 102 is connected. The tag 3306 may also include one or more preset messages that are transmitted to a user device 106. The tag 3306 may transmit these messages after a sensor user device 106 detects the tag. These messages may include a uniform resource locator (e.g., a website address) that is used by the user device 106 to navigate to a website or application associated with an indoor environment. For example, the tag 3306 causes a user device 106, upon being placed into the case 3302, to install an application that includes a map and location of products within an indoor environment without prompting a user for information (or prompting a user to manually pair a user device with a moveable object using identifiers).

In an example, the tag 3306 includes NFC capability and is embedded at a location within the bracket 3304 so as to be aligned with a reader contained within a user device 106 that is connected to the case 3302. In another example, the tag 3306 includes a universal serial bus ("USB") connector that is positioned to connect to a USB port on a user device 106 within the case 3302. It can be appreciated that the tag 3306 may further include any wired and/or wireless capabilities (e.g., a magnetic strip) to communicatively couple to a user device 106.

Absolute Position Sensor Embodiment

Figure 35:
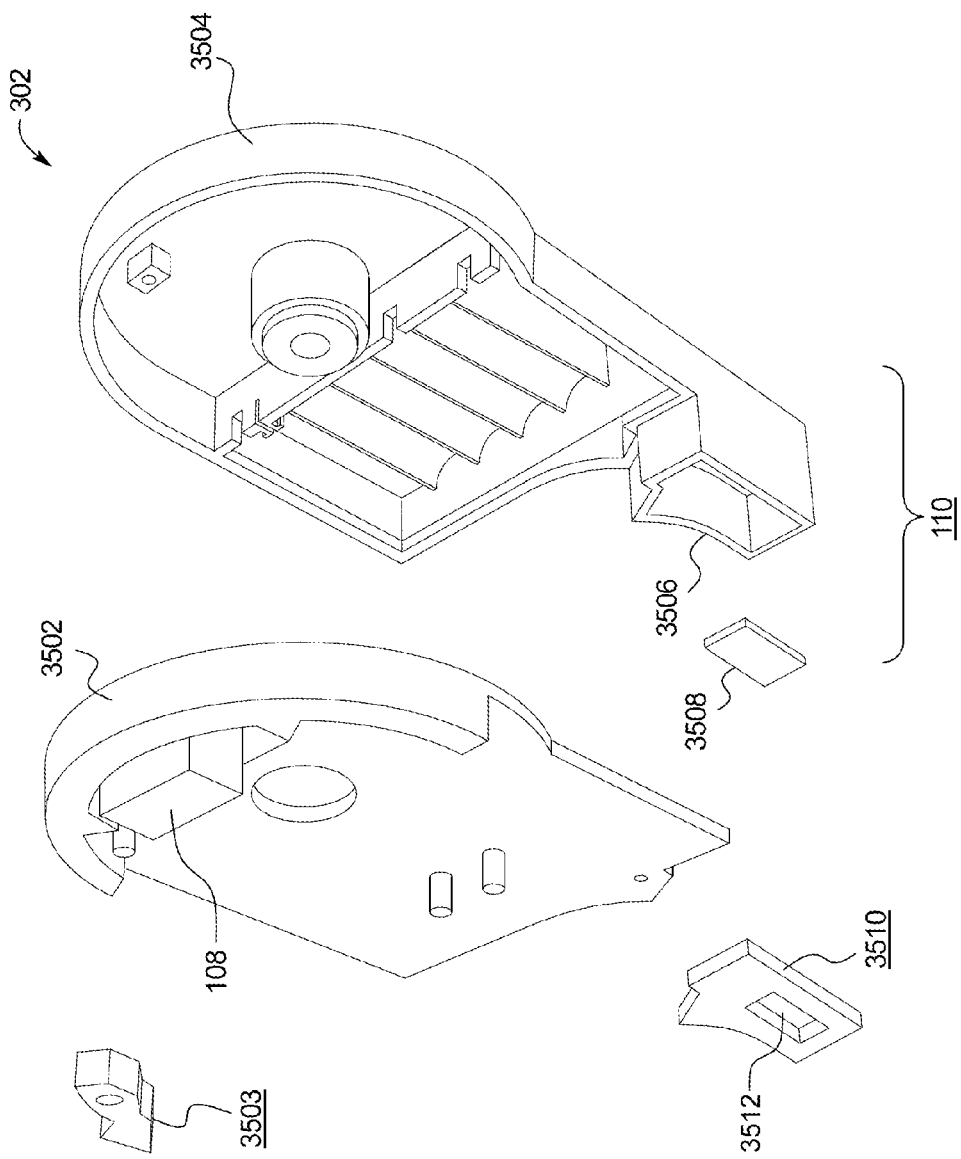
FIGS. 35 to 37 show diagrams of an example embodiment of the absolute position sensor of FIGS. 1, 1A, and 3 to 8
Figure 36:
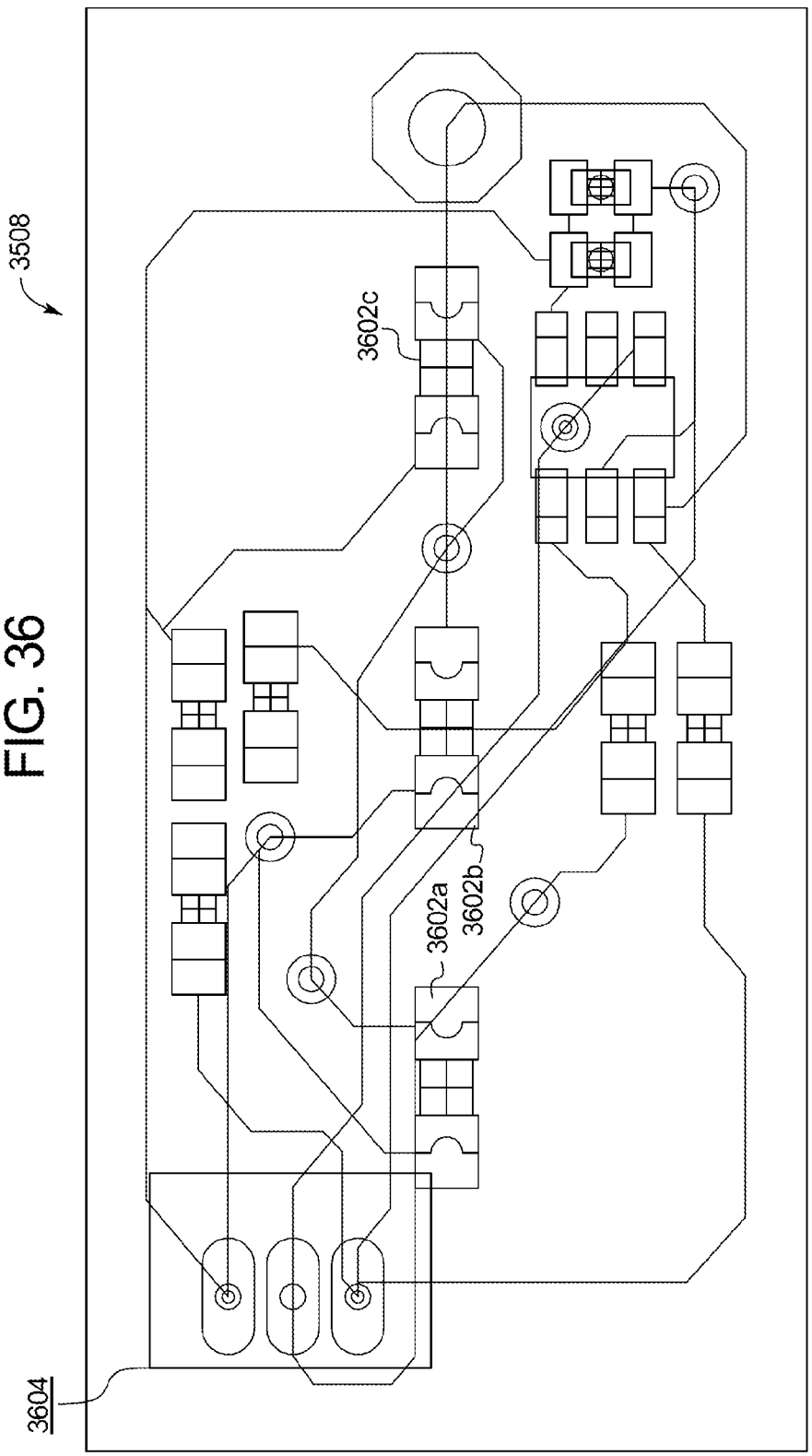
Figure 37:
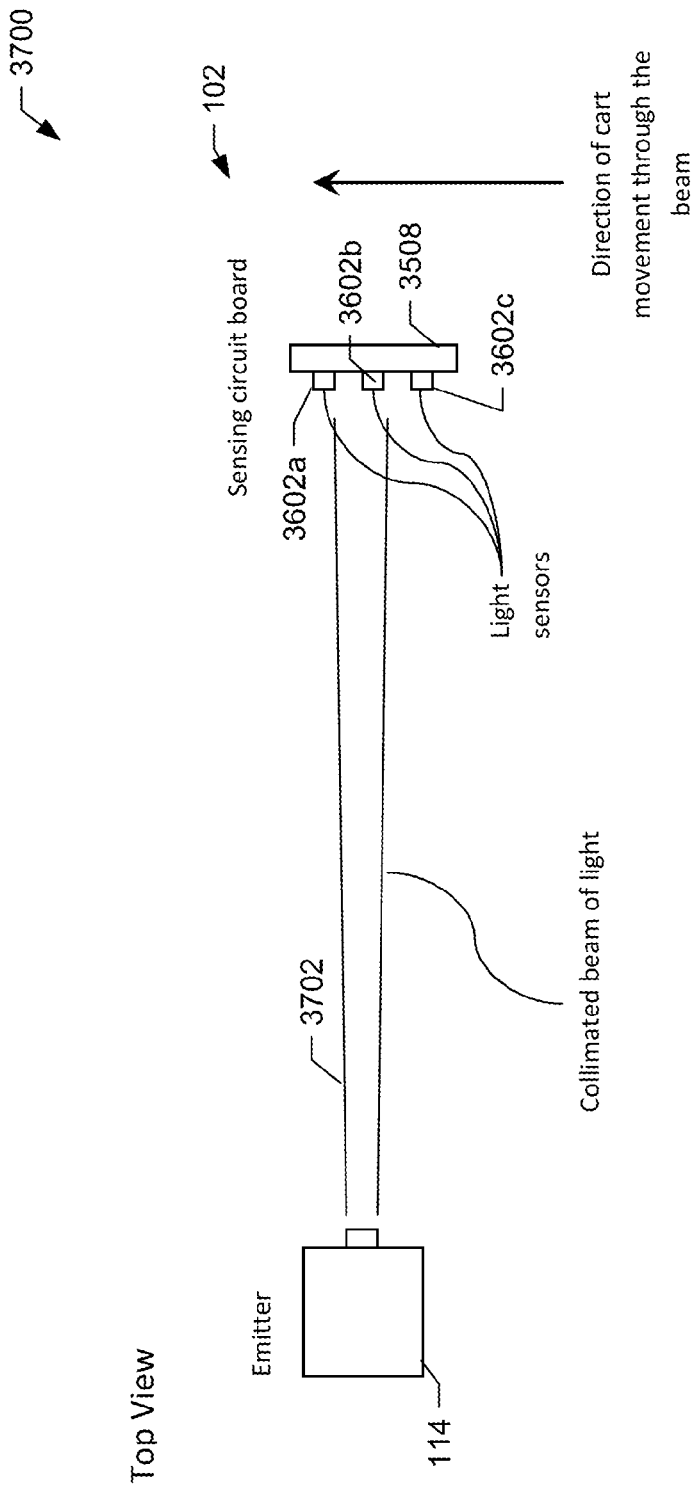

FIGS. 35 to 37 show diagrams of an example embodiment of the absolute position sensor 110 of FIGS. 1, 1A, and 3 to 8. As discussed above, the absolute position sensor 110 is configured to sense uniquely timed pulses of light or signals (e.g., the light pulses 310 and 312 of FIG. 3) transmitted by, for example, transmitters 114. To receive these pulses, FIGS. 35 to 37 show a configuration of an absolute position sensor 110 that provides accurate detection of timed light pulses.

In particular, FIG. 35 shows a diagram of a position sensing apparatus 302 that includes a cover 3502 and a case 3504. The cover 3502 includes one or more dead reckoning sensors 108 and is configured to connect to a wheel of a movable object 102. The cover 3502 is connectable to a spacer block 3503, which is used to provide proper alignment of the cover with a wheel of a moveable object 102.

The example case 3504 includes a compartment 3506 to include components for the absolute position sensor 110 including a circuit board 3508 and a sensor cover 3510. The sensor cover 3510 includes a penetrating window 3512 that enables light to reach the circuit board 3508. The penetrating window 3512 is dimensioned based on a horizontal alignment of one or more photo detection sensors on the circuit board 3508. Further, the penetrating window 3512 may include a filter that only allows light of a certain wavelength to pass to the circuit board 3508. One can appreciate that certain wavelength of the filter corresponds to the wavelength of the uniquely timed pulses of light.

The circuit board 3508 (shown in more detail in FIG. 36) includes three photo detection sensors 3602a to 3602c and a connector 3604. The connector 3604 is configured to provide a power and communication connection to main circuit board that includes the processing circuitry 808 of FIG. 8. It should be noted that the photo detection sensors 3602a to 3602c are aligned in a horizontal line. This horizontal alignment enables the photo detection sensors 3602a to 3602c to detect pulsed light from a transmitter 114 for a longer period of time compared to only using one photo detection sensor.

For example FIG. 37 shows a diagram of top-perspective view of an indoor environment 3700 that includes a transmitter 114 transmitting uniquely timed pulses of light 3702. The transmitter 114 can emit laser light, collimated beams of light, etc. FIG. 37 also shows the circuit board 3508 including the three photo detection sensors 3602a to 3602c. During operation, a user operates a moveable object 102 through the indoor environment 3700, which includes one or more of the transmitters 114. When the moveable object 102 passes in proximity to the transmitter 114, the photo detection sensors 3602a to 3602c are configured to receive the uniquely timed pulses of light. The use of three sensors enables a longer detection time because the photo detection sensors 3602a to 3602c are spaced apart so that at least one of the sensors is receiving the light 3702 for a time period. One can appreciate that this time period is longer than the time period during which only one sensor receives light.

Processing circuitry 808 uses outputs from each of the photo detection sensors 3602a to 3602c to determine an identifier associated with the uniquely timed pulses of light 3702. Alternatively, the processing circuitry 808 aggregates the outputs from each of the photo detection sensors 3602a to 3602c to determine the entire timing sequence of the pulsed light 3702. The processing circuitry 808 then analyzes the entire timing sequence to determine an identifier of the transmitter 114.

Conclusion

It will be appreciated that all of the disclosed processes, methods, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed is:

1. An apparatus comprising:
    a case including a (i) a first compartment configured to connect to a wheel hub of a wheel of a moveable object, and (ii) a second compartment protruding from the first compartment;
    an absolute position sensor located within the second compartment and including:
        a light detecting sensor which detects uniquely timed pulses of light emitted from a light emitting device in proximity to the moveable object; and
        circuitry configured to determine an identity of the light emitting device in proximity to the moveable object based on the sensed uniquely timed pulses of light; and a motion sensor located within the first compartment and including:
- a first magnetic field sensor configured to detect a polarity of a magnet as the magnet passes in proximity to the first magnetic field sensor;
- a code wheel having two or more magnets alternately oriented with north and south polarities facing toward the first magnetic sensor, the code wheel positioned to rotate in unison with the wheel of the moveable object; and
- encoder circuitry configured to determine an amount of rotation of the wheel of the moveable object based on an output of the first magnetic field sensor, wherein the protrusion of the second compartment from the first compartment enables the light detecting sensor to detect the uniquely timed pulses of light.

2. The apparatus of claim 1, wherein the motion sensor is configured to transmit a quadrature encoded signal indicative of the determined amount of movement, and the absolute position sensor is configured to transmit an absolute positioning signal including a unique identifier identifying the specific light emitting device in the proximity of the moveable object.

3. The apparatus of claim 1, further comprising a second motion sensor coupled to a second case attached to the moveable object including:
- a second magnetic field sensor configured to detect a polarity of a magnet as the magnet passes in proximity to the second magnetic field sensor;
- a second code wheel having two or more magnets alternately oriented with north and south polarities facing toward second the second magnetic field sensor, the second code wheel positioned to rotate in unison with a second wheel of the moveable object; and
- second encoder circuitry configured to determine the direction and distance of rotation of the second wheel of the moveable object based on an output of the second magnetic field sensor, wherein the second motion sensor is configured to operate in conjunction with the first motion sensor to detect the direction and amount of rotation of the two wheels of the moveable object.

4. The apparatus of claim 3, wherein a first amount of rotation is used by a processor in conjunction with a second amount of rotation to determine a change in position and orientation of the moveable object.

5. The apparatus of claim 1, wherein the light emitting device is configured to output a collimated beam of light that is detectable by the light detecting sensor as the moveable object passes through the collimated beam.

6. The apparatus of claim 5, wherein one or more light emitting devices are placed throughout an indoor environment and each of the light emitting devices output different, uniquely identifiable timed pulses of light.

7. The apparatus of claim 1, wherein the motion sensor includes a second magnetic field sensor configured to detect the polarity of a magnet as the magnet passes in proximity to the second magnetic field sensor and the encoder circuitry is configured to determine a direction and an amount of movement the moveable object based on the output of the first magnetic field sensor and the second magnetic field sensor.

8. The apparatus of claim 1, wherein the light emitting device includes a vertical cavity surface emitting laser.

9. The apparatus of claim 1, wherein the absolute position sensor is powered off after detecting that a number of magnetic polarity transitions sensed by the first magnetic field sensor is less than a threshold during a predetermined period of time, and wherein the absolute position sensor is powered on after detecting that the code wheel is rotating.

10. The apparatus of claim 1, further comprising a processor communicatively coupled to the absolute position sensor and the motion sensor, the processor configured to determine a location of the moveable object with respect to an indoor area based on data from the absolute position sensor and data from the motion sensor.

11. The apparatus of claim 1, wherein the light detecting sensor is included within the second compartment and the circuitry of the absolute position sensor is included within the first compartment.

12. An apparatus comprising:
- a case including a (i) a first compartment configured to connect to a wheel hub of a wheel of a moveable object, and (ii) a second compartment extending from the first compartment;
- a motion sensor located within the first compartment of the case and including:
  - a first magnetic field sensor configured to detect a polarity of a magnet as the magnet passes in proximity to the first magnetic field sensor;
  - a second magnetic field sensor configured to detect a polarity of a magnet as the magnet passes in proximity to the second magnetic field sensor; and
  - a code wheel having at least two magnets alternately oriented with north and south polarities facing toward the first and second magnetic field sensors, the code wheel positioned to rotate in unison with the wheel of the moveable object; and
- a light detecting sensor located within the second compartment of the case, wherein the locations of the first and second magnetic field sensors are located at positions within the first compartment of the case such that their alignment with the code wheel corresponds to a quadrature encoder output, wherein the motion sensor is configured to cause the light detecting sensor to be operational after detecting that a number of magnetic polarity transitions sensed by at least one of the first magnetic field sensor and the second magnetic field sensor is greater than a threshold during a predetermined period of time, and wherein the extension of the second compartment from the first compartment enables the light detecting sensor to detect at least one pulse of light.

13. The apparatus of claim 12, wherein the moveable object is a shopping cart.

14. The apparatus of claim 9, wherein the quadrature encoder output includes signal changes that are associated with an error-corrected amount of rotation of the wheel.

15. The apparatus of claim 12, wherein the first and second magnetic field sensors include hall-effect sensors.

16. The apparatus of claim 12, wherein the first and second magnetic field sensors are encapsulated within the case.

17. The apparatus of claim 12, wherein the code wheel includes an insert tray configured to position the magnets to be evenly spaced apart from each other.

18. A method of operating an indoor navigation system, the method comprising:
- detecting, in a light detecting sensor located within a first compartment of a case connected to a moveable object, uniquely timed pulses of light emitted from a proximately located emitting device;
- transmitting from the light detecting sensor an absolute positioning signal including an identifier corresponding to the uniquely timed pulses of light enabling an absolute position of the moveable object to be determined;

determining, via a processor, a first movement of a wheel of the moveable object based on detected changes in polarity of magnets alternately orientated with north and south polarities by a first magnetic field sensor located within a second compartment of the case, the second compartment connected to a wheel hub of the wheel of the movable object;

determining, via the processor, a second movement of the wheel of the moveable object based on detected changes in polarity of the magnets by a second magnetic field sensor;

determining, via the processor, an amount of movement and a direction of movement of the moveable object based on the first and second movements; and transmitting, via the processor, a dead-reckoning signal indicative of the determined amount of movement and the direction, wherein the first compartment extends laterally from the second compartment to enable the light detecting sensor to detect the uniquely timed pulses of light.

19. The method of claim 18, further comprising:

detecting, via the processor, an error in the timing between changes in polarity of magnets; and compensating, via the processor, for the error using a correction factor applied to at least one of the amount of movement and the direction.

20. The method of claim 19, wherein the error is based on an amount of misalignment of at least one of the first magnetic field sensor and the first magnetic field sensor with the magnets.

21. The method of claim 19, wherein detecting the error includes:

monitoring a first waveform including changes in polarity detected by the first magnetic sensor for a time period;

monitoring a second waveform including changes in polarity detected by the second magnetic sensor for the time period; and determining that the first waveform is substantially less than or greater than 90 degrees out of phase with the second waveform.

22. The method of claim 21, wherein determining the correction factor for the first and the second waveforms includes:

determining that the moveable object is moving at a constant rate;

determining a first value of a time between positive polarity transitions;

determining a second value of a time of the negative polarity between the positive polarity transitions; and calculating the correction factor as a ratio of the second value divided by the first value.

23. The method of claim 22, wherein compensating for the error using the correction factor includes:

determining a positive polarity distance as a distance the wheel moved between positive polarity transitions as measured by one of the magnetic sensors multiplied by the correction factor;

determining a negative polarity distance as a distance the wheel moved during the negative polarity between the positive polarity transitions as measured by one of the magnetic sensors multiplied by one minus the correction factor; and determining the amount of movement based on the determined positive polarity distance and the negative polarity distance.

* * * * *